(12) United States Patent
Jang et al.

(10) Patent No.: US 12,445,253 B2
(45) Date of Patent: Oct. 14, 2025

(54) METHOD AND APPARATUS OF DYNAMIC SWITCHING AMONG TYPES OF TRANSMISSION AND RECEPTION FOR DATA AND REFERENCE SIGNAL IN WIRELESS COMMUNICATION SYSTEMS

(71) Applicant: SAMSUNG ELECTRONICS CO., LTD., Suwon-si (KR)

(72) Inventors: Youngrok Jang, Suwon-si (KR); Kyungjun Choi, Suwon-si (KR); Ameha Tsegaye Abebe, Suwon-si (KR); Seongmok Lim, Suwon-si (KR); Hyoungju Ji, Suwon-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 357 days.

(21) Appl. No.: 18/307,697

(22) Filed: Apr. 26, 2023

(65) Prior Publication Data

US 2024/0121063 A1    Apr. 11, 2024

(30) Foreign Application Priority Data

Apr. 27, 2022 (KR) .................. 10-2022-0052282
Jan. 19, 2023 (KR) .................. 10-2023-0008169

(51) Int. Cl.
*H04L 5/00* (2006.01)
(52) U.S. Cl.
CPC .................. *H04L 5/0053* (2013.01)
(58) Field of Classification Search
CPC ....... H04L 5/0053; H04L 1/08; H04L 5/0016; H04L 5/0044; H04L 5/0051; H04W 72/232
See application file for complete search history.

(56) References Cited

U.S. PATENT DOCUMENTS

| | | | |
|---|---|---|---|
| 2020/0204314 A1 | 6/2020 | Kang et al. | |
| 2020/0313947 A1 | 10/2020 | Noh et al. | |
| 2023/0026410 A1* | 1/2023 | Manolakos | ............. H04W 8/22 |
| 2025/0047442 A1* | 2/2025 | Ahmadzadeh | ........ H04W 76/20 |

FOREIGN PATENT DOCUMENTS

WO    2022076080 A1    4/2022

OTHER PUBLICATIONS

International Search Report and Written Opinion of the International Searching Authority dated Jul. 28, 2023, in connection with International Application No. PCT/KR2023/005732, 6 pages.
Ericsson, "PDSCH/PUSCH enhancements", R1- 2109438, 3GPP TSG-RAN WG1 Meeting #106-bis-e, e-Meeting, Oct. 2021, 62 pages.
Huawei et al., "PDSCH/PUSCH enhancements for 52-71GHz spectrum", R1-2108771, 3GPP TSG RAN WG1 Meeting #106bis-e, e-Meeting, Oct. 2021, 31 pages.

* cited by examiner

*Primary Examiner* — Kyaw Z Soe

(57) ABSTRACT

A method performed by a terminal in a wireless communication system is provided. The method includes receiving, from a base station, first information indicating at least one DMRS type, via an RRC signaling, receiving, from the base station, second information indicating whether to activate an enhanced DMRS type corresponding to the at least one DMRS type, via a MAC-CE signaling, and in case that the second information indicates activation of the enhanced DMRS type, receiving, from the base station, a PDSCH or transmitting, to the base station, a PUSCH based on the enhanced DMRS type.

20 Claims, 25 Drawing Sheets

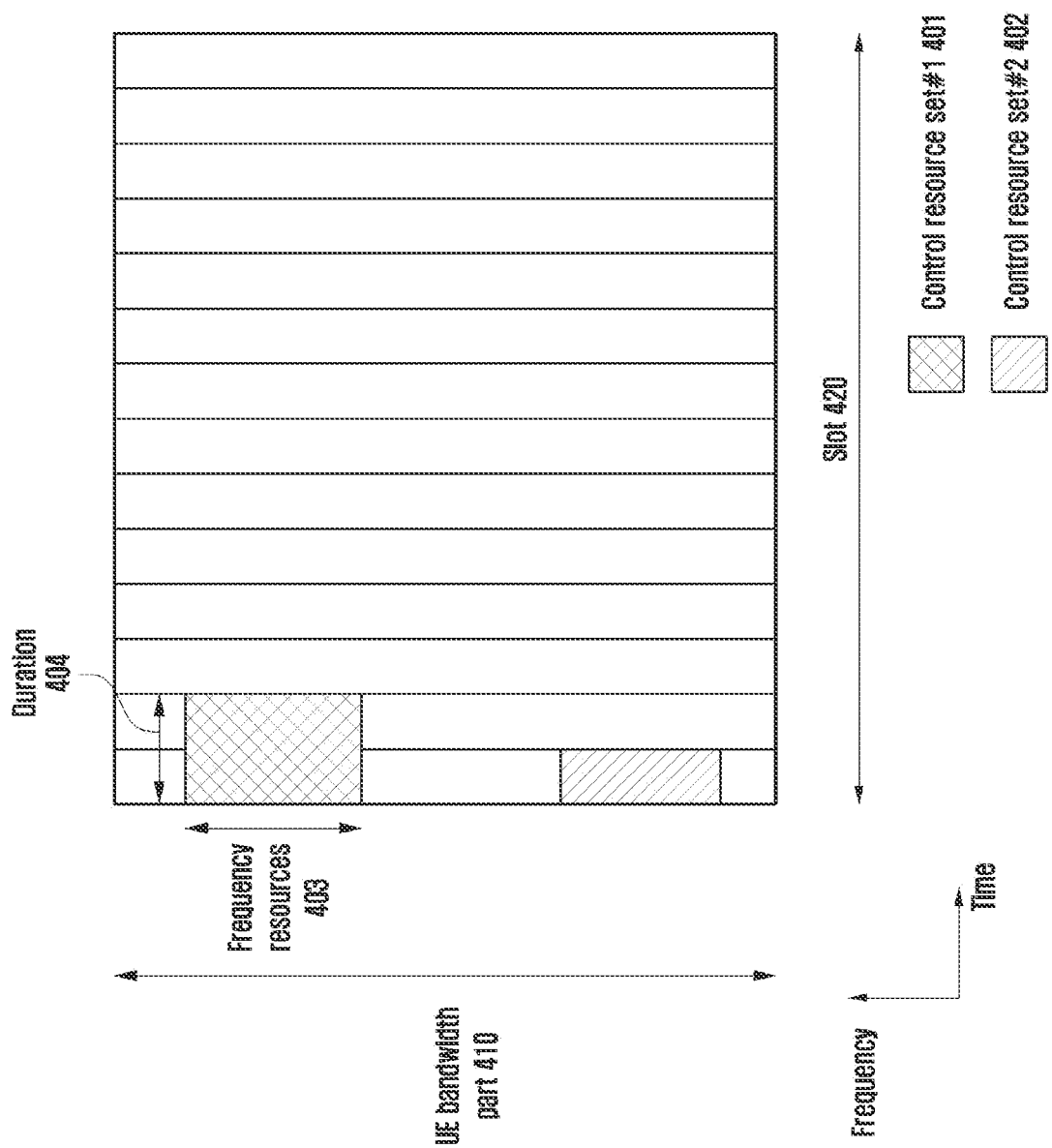

FIG. 16
RRC configured TCI states
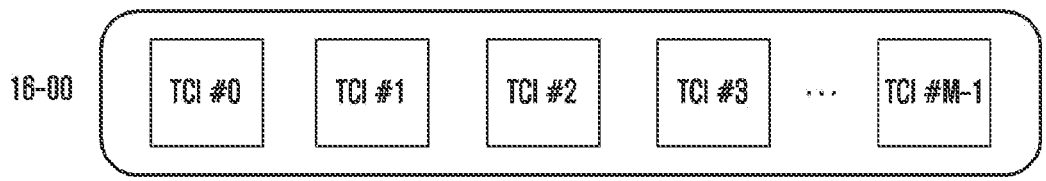
MAC-CE activated TCI states for PDSCH
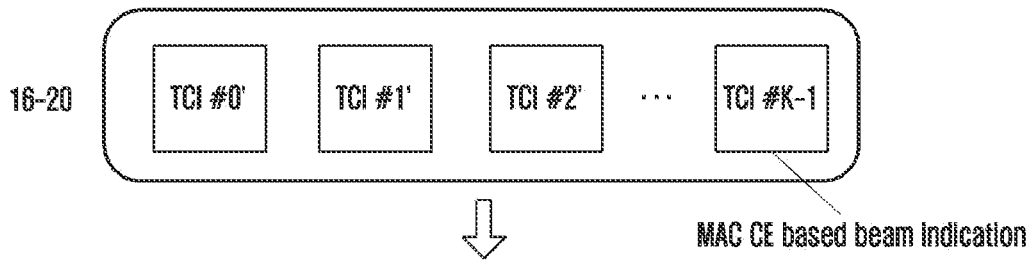
TCI state for PDSCH
MAC-CE structure
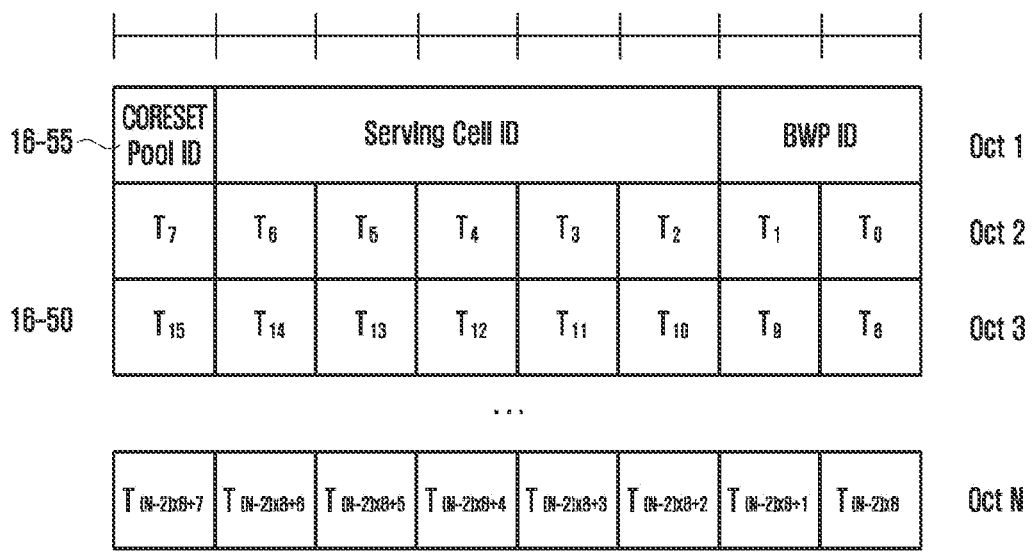

FIG. 20

| R | Serving Cell ID | BWP ID | Oct 1 |
| $C_0$ | TCI state ID$_{0,1}$ | | Oct 2 |
| R | TCI state ID$_{0,2}$ | | Oct 3 (Optional) |

...

| $C_N$ | TCI state ID$_{N,1}$ | Oct M-1 |
| R | TCI state ID$_{N,2}$ | Oct M (Optional) |

METHOD AND APPARATUS OF DYNAMIC SWITCHING AMONG TYPES OF TRANSMISSION AND RECEPTION FOR DATA AND REFERENCE SIGNAL IN WIRELESS COMMUNICATION SYSTEMS

CROSS-REFERENCE TO RELATED APPLICATIONS

This application is based on and claims priority under 35 U.S.C. § 119 to Korean Patent Application Nos. 10-2022-0052282 and 10-2023-0008169, filed on Apr. 27, 2022, and Jan. 19, 2023, in the Korean Intellectual Property Office, the disclosure of which is herein incorporated by reference in its entirety.

BACKGROUND

1. Field

The disclosure relates to an operation of a terminal and a base station in a wireless communication system. Specifically, the disclosure relates to a method of dynamically changing a scheme of transmitting or receiving data and a reference signal in a wireless communication system, and an apparatus capable of performing the same.

2. Description of Related Art

5th generation (5G) mobile communication technologies define broad frequency bands such that high transmission rates and new services are possible, and can be implemented not only in "Sub 6 GHz" bands such as 3.5 GHz, but also in "Above 6 GHz" bands referred to as mmWave including 28 GHz and 39 GHz. In addition, it has been considered to implement 6th generation (6G) mobile communication technologies (referred to as Beyond 5G systems) in terahertz bands (for example, 95 GHz to 3 THz bands) in order to accomplish transmission rates fifty times faster than 5G mobile communication technologies and ultra-low latencies one-tenth of 5G mobile communication technologies.

At the beginning of the development of 5G mobile communication technologies, in order to support services and to satisfy performance requirements in connection with enhanced mobile broadband (eMBB), ultra reliable low latency communications (URLLC), and massive machine-type communications (mMTC), there has been ongoing standardization regarding beamforming and massive multi input multi output (MIMO) for mitigating radio-wave path loss and increasing radio-wave transmission distances in mmWave, supporting numerologies (for example, operating multiple subcarrier spacings) for efficiently utilizing mmWave resources and dynamic operation of slot formats, initial access technologies for supporting multi-beam transmission and broadbands, definition and operation of bandwidth part (BWP), new channel coding methods such as a low density parity check (LDPC) code for large amount of data transmission and a polar code for highly reliable transmission of control information, L2 pre-processing, and network slicing for providing a dedicated network specialized to a specific service.

Currently, there are ongoing discussions regarding improvement and performance enhancement of initial 5G mobile communication technologies in view of services to be supported by 5G mobile communication technologies, and there has been physical layer standardization regarding technologies such as vehicle-to-everything (V2X) for aiding driving determination by autonomous vehicles based on information regarding positions and states of vehicles transmitted by the vehicles and for enhancing user convenience, new radio unlicensed (NR-U) aimed at system operations conforming to various regulation-related requirements in unlicensed bands, NR UE power saving, non-terrestrial network (NTN) which is UE-satellite direct communication for providing coverage in an area in which communication with terrestrial networks is unavailable, and positioning.

Moreover, there has been ongoing standardization in air interface architecture/protocol regarding technologies such as industrial internet of things (IIoT) for supporting new services through interworking and convergence with other industries, integrated access and backhaul (IAB) for providing a node for network service area expansion by supporting a wireless backhaul link and an access link in an integrated manner, mobility enhancement including conditional handover and dual active protocol stack (DAPS) handover, and two-step random access for simplifying random access procedures (2-step RACH for NR). There also has been ongoing standardization in system architecture/service regarding a 5G baseline architecture (for example, service based architecture or service based interface) for combining Network Functions Virtualization (NFV) and Software-Defined Networking (SDN) technologies, and Mobile Edge Computing (MEC) for receiving services based on UE positions.

As 5G mobile communication systems are commercialized, connected devices that have been exponentially increasing will be connected to communication networks, and it is accordingly expected that enhanced functions and performances of 5G mobile communication systems and integrated operations of connected devices will be necessary. To this end, new research is scheduled in connection with eXtended Reality (XR) for efficiently supporting Augmented Reality (AR), Virtual Reality (VR), Mixed Reality (MR) and the like, 5G performance improvement and complexity reduction by utilizing Artificial Intelligence (AI) and Machine Learning (ML), AI service support, metaverse service support, and drone communication.

Furthermore, such development of 5G mobile communication systems will serve as a basis for developing not only new waveforms for providing coverage in terahertz bands of 6G mobile communication technologies, multi-antenna transmission technologies such as Full Dimensional MIMO (FD-MIMO), array antennas and large-scale antennas, meta-material-based lenses and antennas for improving coverage of terahertz band signals, high-dimensional space multiplexing technology using Orbital Angular Momentum (OAM), and Reconfigurable Intelligent Surface (RIS), but also full-duplex technology for increasing frequency efficiency of 6G mobile communication technologies and improving system networks, AI-based communication technology for implementing system optimization by utilizing satellites and AI from the design stage and internalizing end-to-end AI support functions, and next-generation distributed computing technology for implementing services at levels of complexity exceeding the limit of UE operation capability by utilizing ultra-high-performance communication and computing resources.

The above information is presented as background information only to assist with an understanding of the disclosure. No determination has been made, and no assertion is made, as to whether any of the above might be applicable as prior art with regard to the disclosure.

SUMMARY

The disclosure is to provide an apparatus and a method for effectively providing a service in a wireless communication system.

Specifically, the disclosure provides a method and apparatus for applying an enhanced demodulation reference signal (DMRS) type in a wireless communication system.

In addition, the disclosure provides a switching method between an existing DMRS type and an enhanced DMRS type in a wireless communication system.

According to an aspect of the disclosure, a method performed by a terminal in a wireless communication system includes receiving, from a base station, first information indicating at least one demodulation reference signal (DMRS) type, via a radio resource control (RRC) signaling, receiving, from the base station, second information indicating whether to activate an enhanced DMRS type corresponding to the at least one DMRS type, via a medium access control-control element (MAC-CE) signaling, and in case that the second information indicates activation of the enhanced DMRS type, receiving, from the base station, a physical downlink shared channel (PDSCH) or transmitting, to the base station, a physical uplink shared channel (PUSCH) based on the enhanced DMRS type.

According to another aspect of the disclosure, a method performed by a base station in a wireless communication system includes transmitting, to a terminal, first information indicating at least one DMRS type, via an RRC signaling, transmitting, to the terminal, second information indicating whether to activate an enhanced DMRS type corresponding to the at least one DMRS type, via a MAC-CE signaling, and in case that the second information indicates activation of the enhanced DMRS type, transmitting, to the terminal, a PDSCH or receiving, from the terminal, a PUSCH based on the enhanced DMRS type.

According to another aspect of the disclosure, a terminal in a wireless communication system includes a transceiver, and a processor coupled with the transceiver and configured to receive, from a base station, first information indicating at least one DMRS type, via an RRC signaling, receive, from the base station, second information indicating whether to activate an enhanced DMRS type corresponding to the at least one DMRS type, via a MAC-CE signaling, and in case that the second information indicates activation of the enhanced DMRS type, receive, from the base station, a PDSCH or transmit, to the base station, a PUSCH based on the enhanced DMRS type.

According to another aspect of the disclosure, a base station in a wireless communication system includes a transceiver, and a processor coupled with the transceiver and configured to transmit, to a terminal, first information indicating at least one DMRS type, via an RRC signaling, transmit, to the terminal, second information indicating whether to activate an enhanced DMRS type corresponding to the at least one DMRS type, via a MAC-CE signaling, and in case that the second information indicates activation of the enhanced DMRS type, transmit, to the terminal, a PDSCH or receive, from the terminal, a PUSCH based on the enhanced DMRS type.

The technical problems to be achieved in the embodiment of the disclosure are not limited to the technical problems mentioned above, and other technical problems not mentioned herein will be clearly understood from the following description by those skilled in the art to which the disclosure belongs.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

The above and other aspects, features, and advantages of certain embodiments of the disclosure will be more apparent from the following description taken in conjunction with the accompanying drawings, in which:

FIG. 4 illustrates an example of a configuration of a control region of a downlink control channel in a wireless communication system, according to an embodiment of the disclosure;

FIG. 16 illustrates a process for beam configuration and activation of a PDSCH according to an embodiment of the disclosure;

FIG. 20 illustrates a diagram of an enhanced PDSCH TCI state activation/deactivation MAC-CE structure according to an embodiment of the disclosure;

DETAILED DESCRIPTION

Figure 1:
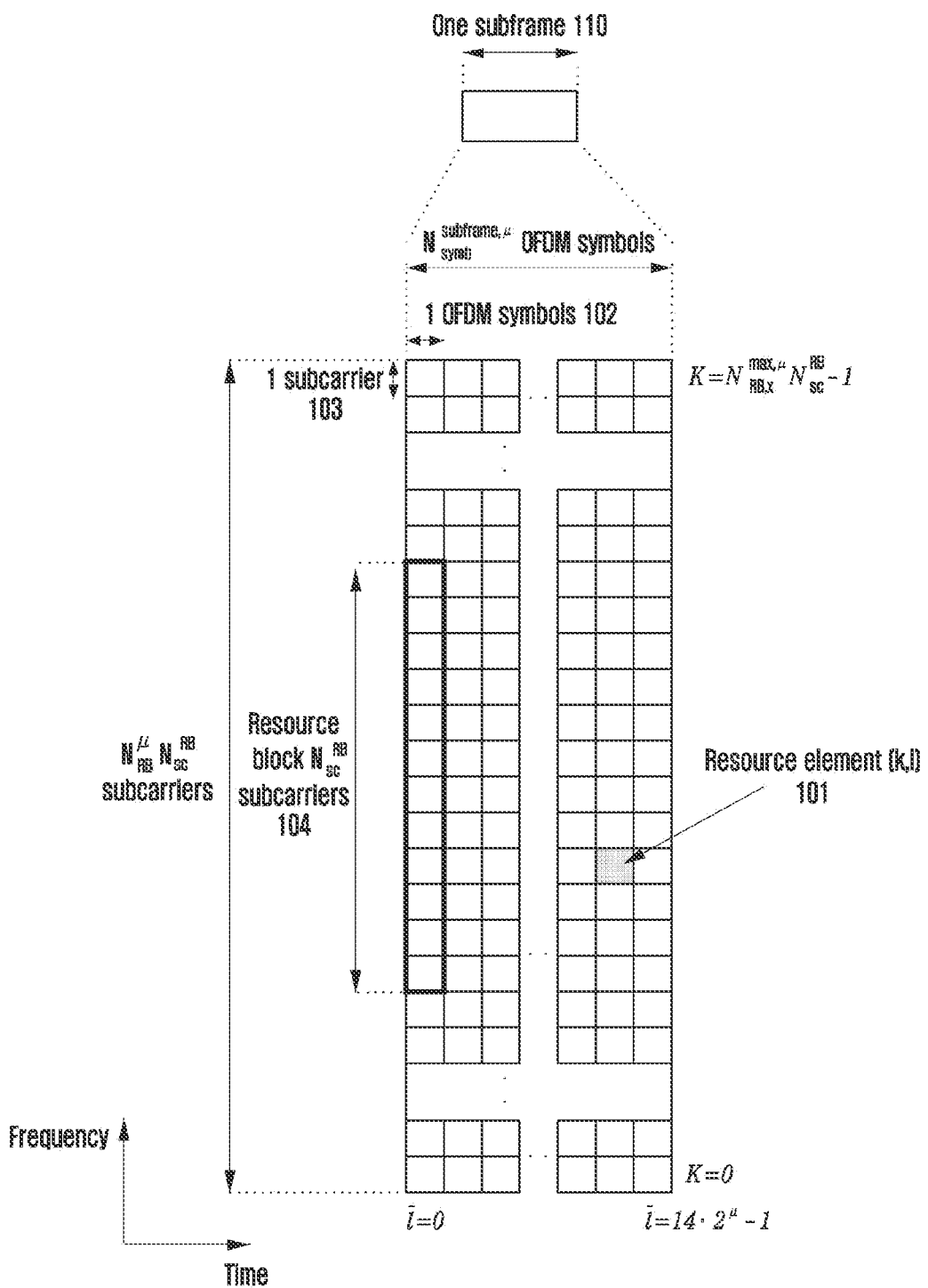
FIG. 1 illustrates a basic structure of a time-frequency domain in a wireless communication system, according to an embodiment of the disclosure.

FIGS. 1 through 24, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Embodiments of the disclosure are described with reference to the accompanying drawings.

In describing embodiments, descriptions related to technical contents which are well-known in the art to which the disclosure pertains, and are not directly associated with the disclosure, will be omitted. Such an omission of unnecessary descriptions is intended to prevent obscuring of the main idea of the disclosure and more clearly convey the main idea.

In the drawings, some elements may be exaggerated, omitted, or schematically illustrated. Further, the size of each element does not completely reflect the actual size. In the drawings, identical or corresponding elements are provided with identical reference numerals.

The advantages and features of the disclosure and ways to achieve them will be apparent by making reference to embodiments as described below in detail in conjunction with the accompanying drawings. However, the disclosure is not limited to the embodiments set forth below, but may be implemented in various different forms. The following embodiments are provided only to completely disclose and inform those skilled in the art of the scope of the disclosure, and the appended claims. Throughout the specification, the same or like reference numerals designate the same or like elements. Further, in describing the disclosure, a detailed description of known functions or configurations incorporated herein will be omitted when it is determined that the description may make the subject matter of the disclosure unnecessarily unclear. The terms which will be described below are terms defined in consideration of the functions in the disclosure, and may be different according to users, intentions of the users, or customs. Therefore, the definitions of the terms should be made based on the contents throughout the specification.

In the following description, a BS is an entity that allocates resources to terminals, and may be at least one of a gNode B, an eNode B, a Node B, a BS, a wireless access unit, a BS controller, and a node on a network. A terminal may include a UE, a mobile station (MS), a cellular phone, a smartphone, a computer, or a multimedia system capable of performing communication functions. In the disclosure, a "downlink" refers to a radio link via which a BS transmits a signal to a terminal, and an "uplink" refers to a radio link via which a terminal transmits a signal to a BS. Further, although the following description may be directed to a long term evolution (LTE) or LTE-A system by way of example, embodiments of the disclosure may also be applied to other communication systems having similar technical backgrounds or channel types to the embodiments of the disclosure. Examples of other communication systems may include 5G new radio (NR) developed beyond LTE-A, and in the following description, "5G" may be a concept that covers exiting LTE, LTE-A, and other similar services. In addition, based on determinations by those skilled in the art, the disclosure may be applied to other communication systems through some modifications without significantly departing from the scope of the disclosure.

Herein, it will be understood that each block of the flowchart illustrations, and combinations of blocks in the flowchart illustrations, can be implemented by computer program instructions. These computer program instructions can be provided to a processor of a general-purpose computer, special purpose computer, or other programmable data processing apparatus to produce a machine, such that the instructions, which execute via the processor of the computer or other programmable data processing apparatus, create a means for implementing the functions specified in the flowchart block or blocks. These computer program instructions may also be stored in a computer usable or computer-readable memory that can direct a computer or other programmable data processing apparatus to function in a particular manner, such that the instructions stored in the computer usable or computer-readable memory produce an article of manufacture including instruction means that implement the function specified in the flowchart block or blocks. The computer program instructions may also be loaded onto a computer or other programmable data processing apparatus to cause a series of operational steps to be performed on the computer or other programmable apparatus to produce a computer implemented process such that the instructions that execute on the computer or other programmable apparatus provide steps for implementing the functions specified in the flowchart block or blocks.

Further, each block of the flowchart illustrations may represent a module, segment, or portion of code, which includes one or more executable instructions for implementing the specified logical function(s). It should also be noted that in some alternative implementations, the functions noted in the blocks may occur out of order. For example, two blocks shown in succession may in fact be executed concurrently or the blocks may sometimes be executed in the reverse order, depending upon the functionality involved.

As used herein, "unit" refers to a software element or a hardware element, such as a field programmable gate array (FPGA) or an application specific integrated circuit (ASIC), which performs a predetermined function. However, the term "unit" does not always have a meaning limited to software or hardware. "Unit" may be constructed either to be stored in an addressable storage medium or to execute one or more processors. Therefore, "unit" includes, for example, software elements, object-oriented software elements, class elements or task elements, processes, functions, properties, procedures, sub-routines, segments of a program code, drivers, firmware, micro-codes, circuits, data, database, data structures, tables, arrays, and parameters. The elements and functions provided by the "unit" may either be combined into a smaller number of elements, or a "unit", or divided into a larger number of elements, or a "unit". Moreover, the elements and "units" may be implemented to reproduce one or more CPUs within a device or a security multimedia card. Further, the term "unit" in the embodiments may include one or more processors.

A wireless communication system has developed into a broadband wireless communication system that provides a high-speed and high-quality packet data service according to communication standards such as high-speed packet access (HSPA) of third generation partnership project (3GPP), LTE or evolved universal terrestrial radio access (E-UTRA), LTE-advanced (LTE-A), LTE-Pro, high rate packet data (HRPD) of 3GPP2, ultra mobile broadband (UMB), and 802.16e of the Institute of Electrical and Electronics Engineers (IEEE) beyond the initially provided voice-based service.

An LTE system, which is a representative example of the broadband wireless communication system, employs an orthogonal frequency division multiplexing (OFDM) scheme for a downlink (DL) (the term "downlink" and the term "DL" are used interchangeably throughout the disclosure), and employs a single carrier frequency division multiple access (SC-FDMA) scheme for an uplink (UL) (the term "uplink" and the term "UL" are used interchangeably throughout the disclosure). The uplink is a radio link through which a UE (or an MS) transmits data or a control signal to a BS (or an eNode B), and the downlink is a radio link through which the BS transmits data or a control signal to the UE. In the multiple access schemes as described above, time-frequency resources for carrying data or control information are allocated and operated in a manner to prevent overlapping of the resources, that is, to establish the orthogonality, between users, so as to identify data or control information of each user.

A post-LTE communication system, that is, a 5G communication system, should be able to freely reflect various requirements of a user and a service provider, and thus it is required to support a service which satisfies the various requirements. Services which are considered for the 5G communication system include enhanced mobile broadband (eMBB), massive machine type communication (mMTC), and ultra reliability low latency communication (URLLC).

The eMBB aims to provide a data transmission rate which is improved so as to surpass the data transmission speed supported by conventional LTE, LTE-A, or LTE-Pro. For example, in the 5G communication system, the eMBB should provide a peak downlink data rate of 20 gigabits per second (Gbps) and a peak uplink data rate of 10 Gbps from the viewpoint of one BS. Further, the 5G communication system should provide not only the peak data rate but also an increased user-perceived data rate. In order to satisfy such requirements, improvement of various transmission/reception technologies, including a further improved multi-input multi-output (MIMO) transmission technology, is needed. Further, while the current LTE system uses transmission bandwidths from a bandwidth of 2 GHz to a maximum bandwidth of 20 megahertz (MHz) to transmit signals, the 5G communication system uses a frequency bandwidth wider than 20 MHz in frequency bands of 3 to 6 GHz or higher than or equal to 6 GHz, whereby the data transmission rate required by the 5G communication system can be satisfied.

Also, in order to support an application service such as the IoT, mMTC is considered in the 5G communication system. The mMTC is required to support access of a multitude of UEs within a cell, improve coverage of the UE, increase a battery lifetime, and reduce the costs of the UE in order to efficiently provide IoT technology. IoT technology is used in conjunction with various sensors and devices to provide communication, and thus should support a large number of UEs (for example, 1,000,000 UEs/kilometer2 (km2)) within the cell. Since the UE supporting the mMTC is highly likely to be located in a shaded area, such as a basement of a building, which a cell cannot cover due to service characteristics, the mMTC may require wider coverage than other services provided by the 5G communication system. The UE supporting the mMTC needs to be produced at low cost and it is difficult to frequently exchange a battery thereof. Thus, a long battery lifetime, for example, 10 to 15 years, may be required.

The URLLC is a cellular-based wireless communication service used for a particular (mission-critical) purpose. For example, services used for remote control of robots or machinery, industrial automation, unmanned aerial vehicles, remote health care, and emergency alerts may be considered. Accordingly, communication provided by the URLLC should provide very low latency and very high reliability. For example, services supporting the URLLC should satisfy a radio access delay time (air interface latency) shorter than 0.5 milliseconds and also have a requirement of a packet error rate equal to or smaller than 10-5. Accordingly, for services supporting the URLLC, the 5G system should provide a transmit time interval (TTI) smaller than that of other systems and also have a design requirement of allocating a wide array of resources in a frequency band in order to guarantee reliability of a communication link.

Three services of 5G, namely eMBB, URLLC, and mMTC, may be multiplexed and transmitted in one system. At this time, in order to meet the different requirements of the respective services, different transmission/reception schemes and transmission/reception parameters may be used for the services. Of course, 5G is not limited to the above-described three services.

[NR Time-Frequency Resources]

Hereinafter, a frame structure of a 5G system is described in more detail with reference to the drawings.

FIG. 1 illustrates a basic structure of a time-frequency domain in a wireless communication system, according to an embodiment of the disclosure.

In FIG. 1, a horizontal axis indicates a time domain and a vertical axis indicates a frequency domain. The basic unit of resources in the time and frequency domain is a resource element (RE) 101 and may be defined as 1 orthogonal frequency division multiplexing (OFDM) symbol 102 in the time axis and 1 subcarrier 103 in the frequency axis. In the frequency domain, $N_{sc}^{RB}$ (for example, 12) successive REs may correspond to one resource block (RB) 104.

Figure 2:
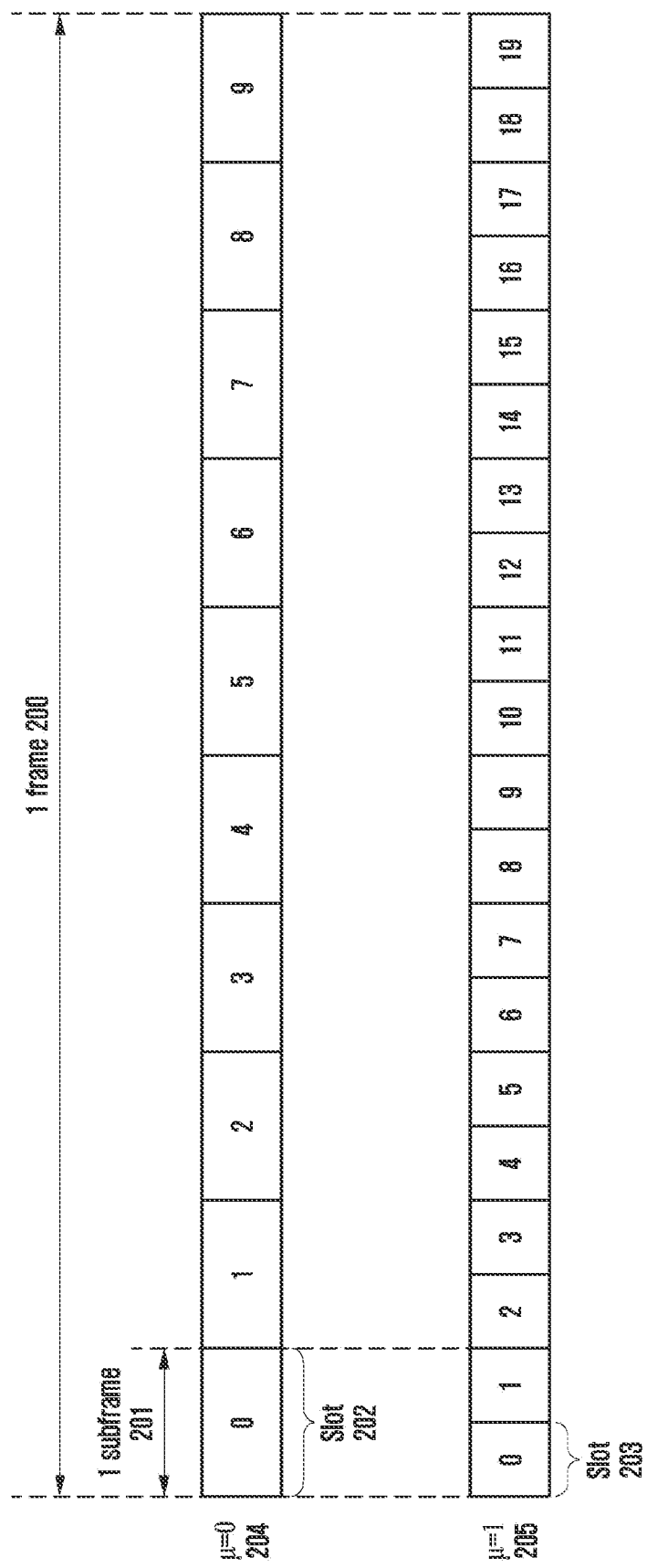
FIG. 2 illustrates frame, subframe, and slot structures in a wireless communication system, according to an embodiment of the disclosure.

FIG. 2 illustrates frame, subframe, and slot structures in a wireless communication system, according to an embodiment of the disclosure.

In FIG. 2, an example of the structure of a frame 200, a subframe 201, and a slot 202 is illustrated. 1 frame 200 may be defined as 10 milliseconds (ms). 1 subframe 201 may be defined as 1 ms, and accordingly one frame 200 may include a total of 10 subframes 201. 1 slot 202 or 203 may be defined as 14 OFDM symbols (that is, the number symbols $N_{symb}^{slot}$ per slot=14). 1 subframe 201 may include one or a plurality of slots 202 and 203, and the number of slots 202 or 203 per subframe 201 may vary depending on a configuration value μ 204 or 205 for subcarrier spacing. FIG. 2 illustrates the case in which the subcarrier spacing configuration value 204 is μ=0 and the case in which the subcarrier spacing configuration value 205 is μ=1. 1 subframe 201 may include one slot 202 in the case of μ=0 204, and 1 subframe 201 may include 2 slots 203 in the case of μ=1 205. That is, the number ($N_{slot}^{subframe,\mu}$) of slots per subframe may vary depending on the configuration value (μ) for subcarrier spacing, and accordingly the number ($N_{slot}^{frame,\mu}$) of slots per frame may vary. The number ($N_{slot}^{subframe,\mu}$) and the number ($N_{slot}^{frame,\mu}$) according to the subcarrier spacing configuration value μ may be defined as shown in Table 1 below.

TABLE 1

| μ | $N_{symb}^{slot}$ | $N_{slot}^{frame,\mu}$ | $N_{slot}^{subframe,\mu}$ |
|---|---|---|---|
| 0 | 14 | 10 | 1 |
| 1 | 14 | 20 | 2 |
| 2 | 14 | 40 | 4 |
| 3 | 14 | 80 | 8 |
| 4 | 14 | 160 | 16 |
| 5 | 14 | 320 | 32 |

[Bandwidth Part (BWP)]

Subsequently, a configuration of a bandwidth part (BWP) in a 5G system is described in detail with reference to the drawings.

Figure 3:
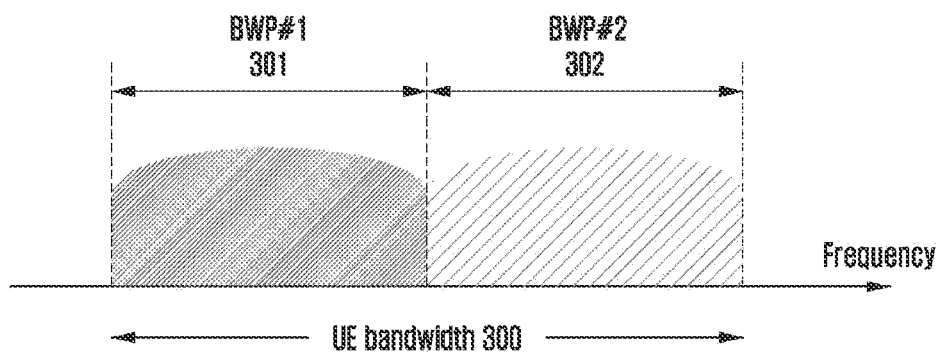
FIG. 3 illustrates an example of a configuration of a bandwidth part in a wireless communication system, according to an embodiment of the disclosure.

FIG. 3 illustrates an example of a configuration of a bandwidth part in a wireless communication system, according to an embodiment of the disclosure.

In FIG. 3, a UE bandwidth 300 is configured as two bandwidth parts, that is, BWP #1 301 and BWP #2 302. The BS may configure one or a plurality of BWPs in the UE, and the following information provided below in Table 2 may be configured to each BWP.

TABLE 2

| BWP ::= | SEQUENCE { |
|---|---|
| bwp-Id | BWP-Id, |
| (bandwidth part identifier) | |
| locationAndBandwidth | INTEGER (1..65536), |
| (bandwidth part location) | |
| subcarrierSpacing | ENUMERATED {n0, n1, n2, n3, n4, n5}, |
| (subcarrier spacing) | |
| cyclicPrefix | ENUMERATED { extended } |
| (cyclic prefix) | |
| } | |

Of course, the disclosure is not limited to the aforementioned example, and various parameters related to a BWP as well as the configuration information may be configured in the UE. The information may be transmitted to the UE from the BS through higher-layer signaling, for example, radio resource control (RRC) signaling. Among one or a plurality of configured BWPs, at least one BSP may be activated. Information indicating whether to activate the configured BWPs may be semi-statically transferred from the BS to the UE through RRC signaling or may be dynamically transferred through DCI.

The UE may receive a configuration of an initial BWP for initial access from the BS through a master information block (MIB) before the RRC connection. More specifically, the UE may receive configuration information for a CORE-SET ("CORESET" and "control resource set" are used interchangeably throughout the disclosure) and a search space (the term "search space" and the term "SS" are used interchangeably throughout the disclosure) in which a PDCCH for receiving system information (remaining system information (RMSI) or system information block 1 (SIB1)) required for initial access through the MIB can be transmitted in an initial access step. The control resource set and the search space configured as the MIB may be considered as an identity (ID) 0. The BS may inform the UE of configuration information such as frequency allocation information for control resource set #0, time allocation information, and numerology, through the MIB. Further, the BS may inform the UE of configuration information for a monitoring period and an occasion of control resource set #0, that is, configuration information for search space #0 through the MIB. The UE may consider a frequency region configured as control resource set #0 acquired from the MIB as an initial bandwidth part for initial access. At this time, the ID of the initial BWP may be considered as 0.

The configuration for the BWP supported by the 5G system may be used for various purposes.

When a bandwidth supported by the UE is narrower than a system bandwidth, it may be supported through the BWP configuration. For example, the BS may configure a frequency location (configuration information 2) of the BWP in the UE, and thus the UE may transmit and receive data at a specific frequency location within the system bandwidth.

Further, in order to support different numerologies, the BS may configure a plurality of BWPs in the UE. For example, in order to support the UE to perform data transmission and reception using both subcarrier spacing of 15 kilohertz (kHz) and subcarrier spacing of 30 kHz, two BWPs may be configured as subcarrier spacings of 15 kHz and 30 kHz, respectively. Different BWPs may be frequency division-multiplexed, and when data is to be transmitted and received at specific subcarrier spacing, BWPs configured at the corresponding subcarrier spacing may be activated.

In order to reduce power consumption of the UE, the BS may configure BWPs having different sizes of bandwidths in the UE. When the UE supports a very large bandwidth, e.g., 100 MHz, but always transmits and receives data through the bandwidth, a very high power consumption may be generated. Particularly, monitoring an unnecessary downlink control channel through a large bandwidth of 100 MHz in the state in which there is no traffic is very inefficient from the aspect of power consumption. In order to reduce power consumption of the UE, the BS may configure a BWP having a relatively narrow bandwidth, e.g., 200 MHz. The UE may perform a monitoring operation in the bandwidth part of 200 MHz in the state in which there is no traffic, and if data is generated, may transmit and receive data through the bandwidth part of 100 MHz according to an instruction from the BS.

In a method of configuring the BWP, UEs before the RRC connection may receive configuration information for an initial bandwidth part through an MIB in an initial access step. More specifically, the UE may receive a configuration of a CORESET for a downlink control channel in which DCI for scheduling an SIB can be transmitted from an MIB of a physical broadcast channel (PBCH). A bandwidth of the control resource set configured as the MIB may be considered as an initial bandwidth part, and the UE may receive a PDSCH, in which the SIB is transmitted, through the configured initial bandwidth part. The initial BWP may be used not only for reception of the SIB but also other system information (OSI), paging, or random access (RA) (the term "random access" and the term "RA" are used interchangeably throughout the disclosure).

[Bwp Change]

When one or more BWPs are configured in the UE, the BS may indicate a change (or switching or transition) in the BWPs to the UE through a BWP indicator field within the DCI. For example, in FIG. 3, when a currently activated BWP of the UE is BWP #1 301, the BS may indicate BWP #2 302 to the UE through a BWP indicator within the DCI and the UE may make a BWP change to BWP #2 302 indicated by the received BWP indicator within the DCI.

As described above, since the DCI-based BWP change may be indicated by the DCI for scheduling the PDSCH or the PUSCH, the UE should be able to receive or transmit the PDSCH or the PUSCH scheduled by the corresponding DCI in the changed BWP without any difficulty if the UE receives a BWP change request. To this end, the standard has defined requirements for a delay time (TBWP) required for the BWP change, and may be defined as shown below in Table 3.

TABLE 3

| μ | NR Slot length (ms) | BWP switch delay $T_{BWP}$ (slots) | |
|---|---|---|---|
| | | Type 1[Note 1] | Type 2[Note 1] |
| 0 | 1 | 1 | 3 |
| 1 | 0.5 | 2 | 5 |
| 2 | 0.25 | 3 | 9 |
| 3 | 0.125 | 6 | 18 |

Note 1:
Depends on UE capability.

Note 2:
If the BWP switch involves changing of SCS, the BWP switch delay is determined by the larger one between the SCS before BWP switch and the SCS after BWP switch.

The requirements for the BWP change delay time may support type 1 or type 2 according to a UE capability. The UE may report a supportable BWP delay time type to the BS.

When the UE receives DCI including a BWP change indicator in slot n according to the requirements for the BWP change delay time, the UE may complete a change to a new BWP indicated by the BWP change indicator at a time point that is not later than slot n+TBWP and transmit and receive a data channel scheduled by the corresponding DCI in the changed new BWP. When the BS desires to schedule a data channel in the new BWP, the BS may determine time domain resource allocation for the data cannel in consideration of the BWP change delay time (TBWP) of the UE. That is, when scheduling the data channel in the new BWP, the BS may schedule the corresponding data channel after the BWP change delay time using a method of determining the time domain resource allocation for the data channel. Accordingly, the UE may not expect that the DCI indicating the BWP change indicates a slot offset (K0 or K2) smaller than the BWP change delay time (TBWP).

If the UE receives DCI indicating the BWP change (for example, DCI format 1_1 or 0_1), the UE may perform no transmission or reception during a time interval from a third symbol of a slot for receiving the PDCCH including the corresponding DCI to a start point of the slot indicated by the slot offset (K0 or K2) indicated through a time domain resource allocation field within the corresponding DCI. For example, when the UE receives DCI indicating the BWP change in slot n and a slot offset value indicated by the corresponding DCI is K, the UE may perform no transmission or reception from the third symbol of slot n to a symbol before slot n+K (that is, the last symbol of slot n+K−1).

[Ss/Pbch Block]

Subsequently, a synchronization signal/PBCH block in a 5G system is described.

The synchronization signal/PBCH block may be a physical layer channel block including a primary synchronization signal (PSS), a secondary synchronization signal (SSS), and a PBCH. A detailed description thereof is made below.

PSS is a signal which is a reference of downlink time/frequency synchronization and provides some pieces of information of a cell ID.

SSS is a reference of downlink time/frequency synchronization and provides the remaining cell ID information which the PSS does not provide. In addition, the SSS serves as a reference signal for demodulation of a PBCH.

PBCH provides necessary system information required for transmitting and receiving a data channel and a control channel by the UE. The necessary system information may include search space-related control information indicating radio resource mapping information of the control channel and scheduling control information for a separate data channel for transmitting system information.

Synchronization signal/PBCH block includes a combination of PSS, SSS, and PBCH. One or a plurality of synchronization signal/PBCH blocks may be transmitted within a time of 5 ms, and each of the transmitted synchronization signal/PBCH blocks may be separated by an index.

The UE may detect the PSS and the SSS in an initial access stage and decode the PBCH. The UE may acquire an MIB from the PBCH and receive a configuration of CORE-SET #0 (corresponding to a control resource set having control resource set index 0) therefrom. The UE may monitor control resource set #0 on the basis of the assumption that the selected SS/PBCH block and a demodulation reference signal (DMRS) transmitted in control resource set #0 are quasi co-located (QCLed). The UE may receive system information through downlink control information transmitted in control resource set #0. The UE may acquire configuration information related to a random access channel (RACH) required for initial access from the received system information. The UE may transmit a physical RACH (PRACH) to the BS in consideration of the selected synchronization signal/PBCH block index, and the BS receiving the PRACH may acquire the synchronization signal/PBCH block index selected by the UE. The BS may know which block is selected by the UE from among the synchronization signal/PBCH blocks and that CORESET #0 related thereto is monitored.

[PDCCH: Related to DCI]

Subsequently, DCI in a 5G system is described in detail.

In the 5G system, scheduling information for uplink data (or a physical uplink data channel (a PUSCH)) or downlink data (or a physical downlink data channel (a PDSCH)) is transmitted from the BS to the UE through DCI. The UE may monitor a fallback DCI format and a non-fallback DCI format for the PUSCH or the PDSCH. The fallback DCI format may include a fixed field predefined between the BS and the UE, and the non-fallback DCI format may include a configurable field.

The DCI may be transmitted through a PDCCH via a channel coding and modulation process. A cyclic redundancy check (CRC) may be added to a DCI message payload and may be scrambled by a radio network temporary identifier (RNTI) corresponding to the identity of the UE. Depending on the purpose of the DCI message, for example, UE-specific data transmission, a power control command, or a random access response, different RNTIs may be used. That is, the RNTI is not explicitly transmitted but is included in a CRC calculation process to be transmitted. If the DCI message transmitted through the PDCCH is received, the UE may identify the CRC through the allocated RNTI, and may recognize that the corresponding message is transmitted to the UE when the CRC is determined to be correct on the basis of the CRC identification result.

For example, DCI for scheduling a PDSCH for system information (SI) may be scrambled by an SI-RNTI. DCI for scheduling a PDSCH for a random access response (RAR) message may be scrambled by an RA-RNTI. DCI for scheduling a PDSCH for a paging message may be scrambled by a P-RNTI. DCI for notifying of a slot format indicator (SFI) may be scrambled by an SFI-RNTI. DCI for notifying of transmit power control (TPC) may be scrambled with a TPC-RNTI. DCI for scheduling a UE-specific PDSCH or PUSCH may be scrambled by a cell RNTI (C-RNTI).

DCI format 0_0 may be used for fallback DCI for scheduling a PUSCH in which case the CRC may be scrambled by a C-RNTI. DCI format 0_0 in which the CRC is scrambled by the C-RNTI may include, for example, the following information shown below in Table 4.

TABLE 4

- Identifier for DCI formats - [1] bit
- Frequency domain resource assignment -[$\lceil \log_2(N_{RB}^{UL, BWP}(N_{RB}^{UL, BWP} +1)/2) \rceil$] bits
- Time domain resource assignment - X bits
- Frequency hopping flag - 1 bit.
- Modulation and coding scheme - 5 bits
- New data indicator - 1 bit
- Redundancy version - 2 bits
- HARQ process number - 4 bits
- Transmit power control (TPC) command for scheduled PUSCH - [2] bits
- UL/supplementary UL (SUL) indicator - 0 or 1 bit DCI format 0_1 may be used for non-fallback DCI for scheduling a PUSCH in which case the CRC may be scrambled by a C-RNTI. DCI format 0_1 in which the CRC is scrambled by the C-RNTI may include, for example, the following information shown below in Table 5.

TABLE 5

Carrier indicator - 0 or 3 bits
UL/SUL indicator - 0 or 1 bit
Identifier for DCI formats - [1] bits
Bandwidth part indicator - 0, 1 or 2 bits
Frequency domain resource assignment
    For resource allocation type 0, $\lceil N_{RB}^{UL,BWP}/P \rceil$ bits
    For resource allocation type 1, $\lceil \log_2(N_{RB}^{UL,BWP}(N_{RB}^{UL,BWP} + 1)/2) \rceil$ bits
Time domain resource assignment -1, 2, 3, or 4 bits
Virtual resource block (VRB)-to-physical resource block (PRB) mapping - 0 or 1 bit, only for resource allocation type 1.
    0 bit if only resource allocation type 0 is configured;
    1 bit otherwise.
Frequency hopping flag - 0 or 1 bit, only for resource allocation type 1.
    0 bit if only resource allocation type 0 is configured;
    1 bit otherwise.
Modulation and coding scheme - 5 bits
New data indicator - 1 bit
Redundancy version - 2 bits
HARQ process number - 4 bits
1st downlink assignment index - 1 or 2 bits
    1 bit for semi-static HARQ-ACK codebook;
    2 bits for dynamic HARQ-ACK codebook with single HARQ-ACK codebook.
2nd downlink assignment index - 0 or 2 bits
    2 bits for dynamic HARQ-ACK codebook with two HARQ-ACK sub-codebooks;
    0 bit otherwise.
TPC command for scheduled PUSCH - 2 bits SRS resource indicator $\left\lceil \log_2\left(\sum_{k=1}^{L_{max}} \binom{N_{SRS}}{k}\right) \right\rceil$ or $\lceil \log_2(N_{SRS}) \rceil$ bits TABLE 5-continued $$\left\lceil \log_2\left(\sum_{k=1}^{L_{max}} \binom{N_{SRS}}{k}\right)\right\rceil \text{ bits for non-codebook based PUSCH}$$

transmission;
$\lceil \log_2(N_{SRS}) \rceil$ bits for codebook based PUSCH transmission.
  Precoding information and number of layers -up to 6 bits
  Antenna ports - up to 5 bits
  SRS request - 2 bits
  Channel state information (CSI) request - 0, 1, 2, 3, 4, 5, or 6 bits
  Code block group (CBG) transmission information - 0, 2, 4, 6, or 8 bits
  Phase tracking reference signal (PTRS)-DMRS association - 0 or 2 bits.
  beta_offset indicator - 0 or 2 bits
  DMRS sequence initialization - 0 or 1 bit DCI format 1_0 may be used for fallback DCI for scheduling a PDSCH in which case the CRC may be scrambled by a C-RNTI. DCI format 1_0 in which the CRC is scrambled by the C-RNTI may include, for example, the following information shown below in Table 6.

TABLE 6

- Identifier for DCI formats - [1] bit
- Frequency domain resource
  assignment -$\lceil \log_2(N_{RB}^{DL,BWP}(N_{RB}^{DL,BWP}+1)/2) \rceil$ bits
- Time domain resource assignment - X bits
- VRB-to-PRB mapping - 1 bit.
- Modulation and coding scheme - 5 bits
- New data indicator - 1 bit
- Redundancy version - 2 bits
- HARQ process number - 4 bits
- Downlink assignment index - 2 bits
- TPC command for scheduled PUCCH - [2] bits
- Physical uplink control channel (PUCCH) resource indicator - 3 bits
- PDSCH-to-HARQ feedback timing indicator - [3] bits DCI format 1_1 may be used for non-fallback DCI for scheduling a PDSCH in which case the CRC may be scrambled by a C-RNTI. DCI format 1_1 in which the CRC is scrambled by the C-RNTI may include, for example, the following information shown below in Table 7.

TABLE 7

- Carrier indicator - 0 or 3 bits
- Identifier for DCI formats - [1] bits
- Bandwidth part indicator - 0, 1 or 2 bits
- Frequency domain resource assignment
  For resource allocation type 0, $\lceil N_{RB}^{DL,BWP} / P \rceil$ bits
  For resource allocation type 1, $\lceil \log_2(N_{RB}^{DL,BWP}(N_{RB}^{DL,BWP}+1)/2) \rceil$ bits
- Time domain resource assignment -1, 2, 3, or 4 bits
- VRB-to-PRB mapping - 0 or 1 bit, only for resource allocation type 1.

TABLE 7-continued 0 bit if only resource allocation type 0 is configured;
  1 bit otherwise.
- PRB bundling size indicator - 0 or 1 bit
- Rate matching indicator - 0, 1, or 2 bits
- Zero power (ZP) CSI-reference signal (RS) trigger - 0, 1, or 2 bits
For transport block 1:
- Modulation and coding scheme - 5 bits
- New data indicator - 1 bit
- Redundancy version - 2 bits
For transport block 2:
- Modulation and coding scheme - 5 bits
- New data indicator - 1 bit
- Redundancy version - 2 bits
- HARQ process number - 4 bits
- Downlink assignment index - 0 or 2 or 4 bits
- TPC command for scheduled PUCCH - 2 bits
- PUCCH resource indicator - 3 bits
- PDSCH-to-HARQ feedback timing indicator - 3 bits
- Antenna ports - 4, 5 or 6 bits
- Transmission configuration indication - 0 or 3 bits
- SRS request - 2 bits
- Code block group (CBG) transmission information - 0, 2, 4, 6, or 8 bits
- CBG flushing out information - 0 or 1 bit
- DMRS sequence initialization - 1 bit

[PDCCH: CORESET, REG, CCE, Search Space]

Subsequently, a downlink control channel in a 5G communication system is described in more detail with reference to the drawings.

FIG. 4 illustrates an example of a configuration of a control region of a downlink control channel in a wireless communication system, according to an embodiment of the disclosure.

FIG. 4 illustrates an example in which a UE bandwidth part 410 is configured in the frequency axis and control resource set #1 401 and control resource set #2 402 are configured within 1 slot 420 in the time axis. The control resource sets 401 and 402 may be configured in specific frequency resources 403 within a total UE BWP 410 in the frequency axis. The control resource set may be configured as one or a plurality of OFDM symbols in the time axis, which may be defined as a control resource set duration 404. Referring to the example illustrated in FIG. 4, control resource set #1 401 may be configured as a control resource set duration of 2 symbols, and control resource set #2 402 may be configured as a control resource set duration of 1 symbol.

The control resource sets in the 5G system may be configured through higher-layer signaling (for example, an SIB, an MIB, or RRC signaling) in the UE by the BS. Configuring the control resource set in the UE may mean providing information such as a control resource set identity, a frequency location of the control resource set, and a symbol length of the control resource set. For example, the following information may be included as shown below in Table 8.

TABLE 8

| | |
|---|---|
| ControlResourceSet ::= | SEQUENCE { |
|   -- Corresponds to L1 parameter 'CORESET-ID' | |
|   controlResourceSetId | |
|   ControlResourceSetId, | |
|   (control resource set identity) | |
|   frequency DomainResources | BIT STRING (SIZE (45)), |
|   (frequency axis resource allocation information) | |
|   duration | INTEGER |
|   (1..maxCoReSetDuration), | |
|   (time axis resource allocation information) | |
|   cce-REG-MappingType | |

TABLE 8-continued

```
  CHOICE {
 (CCE-to-REG mapping scheme)
     interleaved
     SEQUENCE {
        reg-BundleSize
     ENUMERATED {n2, n3, n6},
     (REG bundle size)
        precoderGranularity
     ENUMERATED {sameAsREG-bundle, allContiguousRBs},
        interleaverSize
     ENUMERATED {n2, n3, n6}
        (interleaver size)
        shiftIndex
     INTEGER(0..maxNrofPhysicalResourceBlocks-1)
                                                          OPTIONAL
        (interleaver shift)
 },
   nonInterleaved                                         NULL
 },
   tci-StatesPDCCH
   SEQUENCE(SIZE (1..maxNrofTCI-StatesPDCCH)) OF TCI-StateId
        OPTIONAL,
 (QCL configuration information)
   tci-PresentInDCI                                       ENUMERATED
 {enabled}
 OPTIONAL,                                                -- Need S
 }
```

In Table 8, tci-StatesPDCCH (referred to as a transmission configuration indication (TCI) state) configuration information may include information on one or a plurality of synchronization signal/PBCH block indexes or CSI-RS indexes having the quasi co-located (QCL) relationship with a DMRS transmitted in the corresponding CORESET.

Figure 5A:
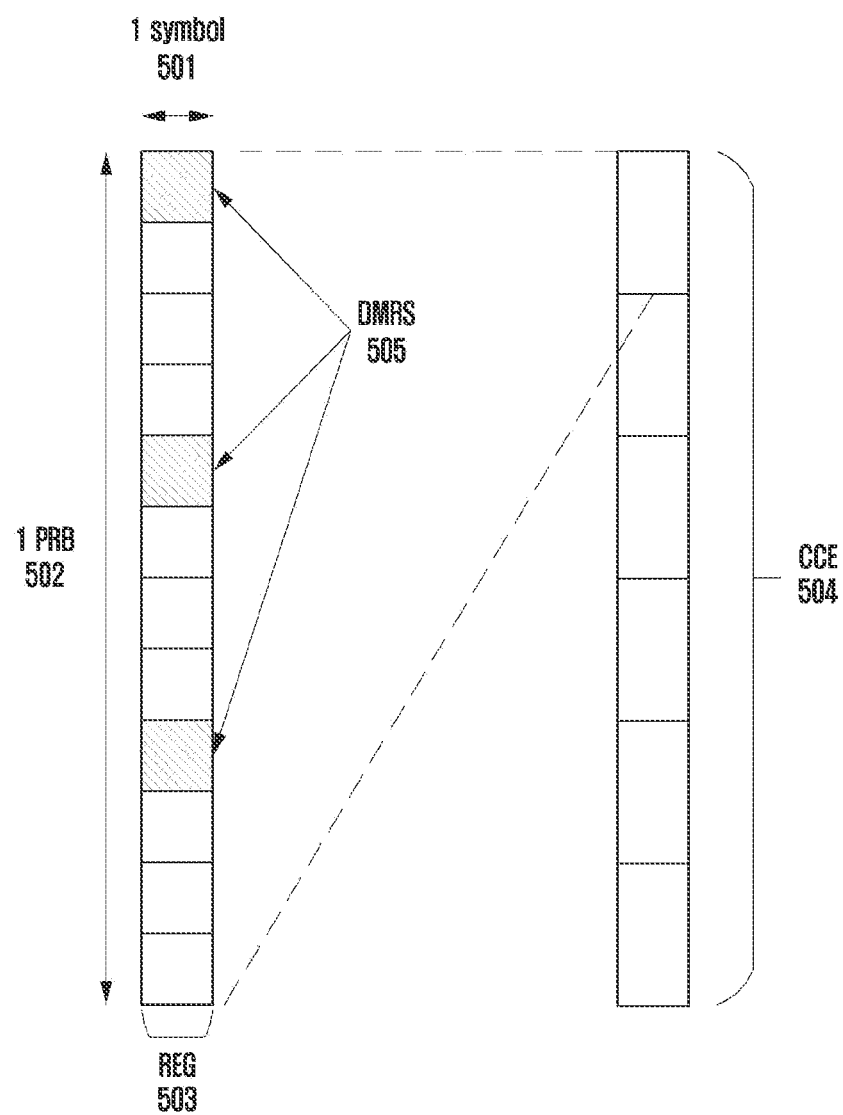
FIG. 5A illustrates a structure of a downlink control channel in a wireless communication system, according to an embodiment of the disclosure.

FIG. 5A illustrates a structure of a downlink control channel in a wireless communication system, according to an embodiment of the disclosure.

Referring to FIG. 5A, the basic unit of time and frequency resources included in the control channel may be a resource element group (REG) 503, and the REG 503 may be defined as 1 OFDM symbol 501 in the time axis and 1 PRB 502 in the frequency axis, that is, as 12 subcarriers. The BS may configure a downlink control channel allocation unit by concatenating the REGs 503.

As illustrated in FIG. 5A, when the basic unit for allocation of the downlink control channel in the 5G system is a control channel eminent (CCE) 504, 1 CCE 504 may include a plurality of REGs 503. In a description of the REG 503 illustrated in FIG. 5A by way of example, the REG 503 may include 12 REs and, when 1 CCE 504 includes 5 REGs 503, 1 CCE 504 may include 72 REs. When a downlink CORESET is configured, the corresponding area may include a plurality of CCEs 504, and a specific downlink control channel may be mapped to one or a plurality of CCEs 504 according to an aggregation level (AL) within the CORESET and then transmitted. CCEs 504 within the CORESET may be distinguished by numbers and the numbers of the CCEs 504 may be assigned according to a logical mapping scheme.

The basic unit of the downlink control channel illustrated in FIG. 5A, that is, the REG 503, may include all of the REs to which the DCI is mapped and the areas to which DMRSs 505, which are reference signals for decoding the REs, are mapped. As illustrated in FIG. 5A, 3 DMRSs 505 may be transmitted in 1 REG 503 The number of CCEs required to transmit the PDCCH may be 1, 2, 4, 8, or 15 according to the aggregation level (AL), and the different number of CCEs may be used to implement link adaptation of the downlink control channel. For example, if AL=L, one downlink control channel may be transmitted through L CCEs. The UE should detect a signal in the state in which the UE does not know information on the downlink control channel, and a search space indicating a set of CCEs is defined to perform blind decoding in a wireless communication system (for example, 5G or NR system). The search space is a set of downlink control channel candidates including CCEs for which the UE should attempt decoding at the given aggregation level, and there are several aggregation levels at which one set of CCEs is configured by 1, 2, 4, 8, and 15 CCEs, so that the UE may have a plurality of search spaces. A search space set may be defined as a set of search spaces at all the configured aggregation levels.

The search space may be classified into a common search space and a UE-specific search space. UEs in a predetermined group or all UEs may search for a common search space of the PDCCH in order to receive cell-common control information such as dynamic scheduling for system information or paging messages. For example, PDSCH scheduling allocation information for transmission of an SIB including information on a service provider of a cell may be received by searching for (monitoring) a common search space of the PDCCH. In the case of the common search space, UEs in a predetermined group or all UEs should receive the PDCCH, so that the common-search space may be defined as a set of pre-arranged CCEs. Scheduling allocation information for the UE-specific PDSCH or PUSCH may be received by searching for a UE-specific search space of the PDCCH. The UE-specific search space may be UE-specifically defined as a UE identity and a function of various system parameters.

A parameter for a search space of a PDCCH in a wireless communication system (for example, a 5G or NR system) may be configured in the UE by the BS through higher-layer signaling (for example, SIB, MIB, or RRC signaling). For example, the BS may configure, in the UE, the number of PDCCH candidates at each aggregation level L, a monitoring period of the search space, a monitoring occasion in units of symbols within the slot for the search space, a search space type, that is, a common search space or a UE-specific search space, a combination of a DCI format and an RNTI to be monitored in the corresponding search space, and a control resource set index for monitoring the search space.

For example, the following information shown below in Table 9 may be included in the information configured by the BS.

TABLE 9

```
SearchSpace ::=                                              SEQUENCE {
      -- Identity of the search space. SearchSpaceId = 0 identifies the SearchSpace
configured via PBCH (MIB) or ServingCellConfigCommon.
      searchSpaceId
      SearchSpaceId,
   (search space identifier)
      controlResourceSetId
      ControlResourceSetId,
   (control resource set identifier)
      monitoringSlotPeriodicity AndOffset                    CHOICE {
   (monitoring slot level period)
         sl1
         NULL,
         sl2
         INTEGER (0..1),
         sl4
         INTEGER (0..3),
         sl5
      INTEGER (0..4),
         sl8
         INTEGER (0..7),
         sl10
      INTEGER (0..9),
         sl16
      INTEGER (0..15),
         sl20
      INTEGER (0..19)
      }
      OPTIONAL,
   duration (monitoring length)                              INTEGER (2..2559)
      monitoringSymbolsWithinSlot                            BIT
STRING (SIZE (14))
                                                             OPTIONAL,
   (monitoring symbol within slot)
      nrofCandidates
      SEQUENCE {
   (number of PDCCH candidates at each aggregation level)
         aggregationLevel1
         ENUMERATED {n0, n1, n2, n3, n4, n5, n6, n8},
         aggregationLevel2
         ENUMERATED {n0, n1, n2, n3, n4, n5, n6, n8},
         aggregationLevel4
         ENUMERATED {n0, n1, n2, n3, n4, n5, n6, n8},
         aggregationLevel8
         ENUMERATED {n0, n1, n2, n3, n4, n5, n6, n8},
         aggregationLevel16
         ENUMERATED {n0, n1, n2, n3, n4, n5, n6, n8}
      },
      search Space Type                                      CHOICE {
      (search space type)
         -- Configures this search space as common search space (CSS) and DCI
formats to monitor.
         common
         SEQUENCE {
      (common search space)
      }
         ue-Specific
         SEQUENCE {
      (UE-specific search space)
            -- Indicates whether the UE monitors in this USS for DCI formats
0-0 and 1-0 or for formats 0-1 and 1-1.
            formats
            ENUMERATED {formats0-0-And-1-0, formats0-1-And-1-1},
            ...
      }
```

The BS may configure one or a plurality of search space sets in the UE according to configuration information. The BS may configure search space set 1 and search space set 2 in the UE, and the configuration may be performed such that DCI format A scrambled by an X-RNTI (e.g., a first RNTI) in search space set 1 is monitored in the common search space and DCI format B scrambled by a Y-RNTI (e.g., a second RNTI) in search space set 2 is monitored in the UE-specific search space.

According to configuration information, one or a plurality of search space sets may exist in the common search space or the UE-specific search space. For example, search space set #1 and search space set #2 may be configured as common search spaces, and search space set #3 and search space set #4 may be configured as UE-specific search spaces.

In the common search space, the following combinations of DCI formats and RNTIs may be monitored. Of course, the disclosure is not limited to the following examples.

DCI format 0_0/1_0 with CRC scrambled by cell-RNTI (C-RNTI), configured scheduling (CS)-RNTI, semi-persistent (SP)-CSI-RNTI, RA-RNTI, temporary cell (TC)-RNTI, paging (P)-RNTI, and system information (SI)-RNTI;

DCI format 2_0 with CRC scrambled by SFI-RNTI;

DCI format 2_1 with CRC scrambled by interruption (INT)-RNTI;

DCI format 2_2 with CRC scrambled by TPC-PUSCH-RNTI and TPC-PUCCH-RNTI; and

DCI format 2_3 with CRC scrambled by TPC-SRS-RNTI.

In the UE-specific search space, the following combinations of DCI formats and RNTIs may be monitored. Of course, the disclosure is not limited to the following examples.

DCI format 0_0/1_0 with CRC scrambled by C-RNTI, CS-RNTI, and TC-RNTI; and

DCI format 1_0/1_1 with CRC scrambled by C-RNTI, CS-RNTI, and TC-RNTI.

The described RNTIs may follow the following definitions and uses.

C-RNTI: used for scheduling UE-specific PDSCH;

TC-RNTI: used for UE-specific PDSCH scheduling;

CS-RNTI: used for semi-statically configured UE-specific PDSCH scheduling;

RA-RNTI: used for PDSCH scheduling at random access stage;

P-RNTI: used for PDSCH scheduling through which paging is transmitted;

SI-RNTI: used for PDSCH scheduling through which system information is transmitted;

INT-RNTI: used for indicating whether puncturing is performed for PDSCH;

TPC for PUSCH RNTI (TPC-PUSCH-RNTI): used for indicating PUSCH power control command;

TPC for PUCCH RNTI (TPC-PUCCH-RNTI): used for indicating PUCCH power control command;

TPC for SRS RNTI (TPC-SRS-RNTI): used for indicating SRS power control command;

The DCI formats may follow the following definition shown below in Table 10.

TABLE 10

| DCI format | Usage |
| --- | --- |
| 0_0 | Scheduling of PUSCH in one cell |
| 0_1 | Scheduling of PUSCH in one cell |

TABLE 10-continued

| DCI format | Usage |
| --- | --- |
| 1_0 | Scheduling of PDSCH in one cell |
| 1_1 | Scheduling of PDSCH in one cell |
| 2_0 | Notifying a group of UEs of the slot format |
| 2_1 | Notifying a group of UEs of the PRB(s) and OFDM symbol(s) where UE may assume no transmission is intended for the UE |
| 2_2 | Transmission of TPC commands for PUCCH and PUSCH |
| 2_3 | Transmission of a group of TPC commands for SRS transmissions by one or more UEs |

A control resource set p and a search space of an aggregation level L in a search space set s in a wireless communication system (for example, a 5G or NR system) may be expressed as shown below in Equation 1.

$$L \cdot \left\{ \left( Y_{p,n_{s,f}^{\mu}} + \left\lfloor \frac{m_{s,n_{CI}} \cdot N_{CCE,p}}{L \cdot M_{s,max}^{(L)}} \right\rfloor + n_{CI} \right) \bmod \left\lfloor \frac{N_{CCE,p}}{L} \right\rfloor \right\} + i \quad \text{[Equation 1]}$$

L: aggregation level
$n_{CI}$: carrier index
$N_{CCE,p}$: total number of CCEs existing within control resource set p
$n_{s,f}^{\mu}$: slot index
$M_{s,max}^{(L)}$: number of PDCCH candidates at aggregation level L
$m_{s,n_{CI}} = 0, \ldots, M_{s,max}^{(L)}-1$: PDCCH candidate index at aggregation level L
$i=0, \ldots, L-1$ $$Y_{p,n_{s,f}^{\mu}} = \left( A_p \cdot Y_{p,n_{s,f}^{\mu}-1} \right) \bmod D,$$

$Y_{p,-1}=n_{RNTI}\neq 0$, $A_p=39827$ for pmod3=0, $A_p=39829$ for pmod3=1, $A_p=39839$ for pmod3=2, D=65537
$n_{RNTI}$: terminal identity
A value $$Y_{p,n_{s,f}^{\mu}}$$

may correspond to 0 in a case of a common search space. The value $$Y_{p,n_{s,f}^{\mu}}$$

may correspond to a value that changes according to an identity of the UE(C-RNTI or ID configured by the base station to the UE) and a time index, in a case of a UE-specific search space.

In a wireless communication system (for example, a 5G or NR system), a set of search space sets monitored by the UE at every time point may vary as a plurality of search space sets can be configured as different parameters (for example, the parameters in Table 9). When search space set #1 is configured on an X-slot period, search space set #2 is configured on a Y-slot period, and X and Y are different from each other. The UE may monitor all of search space set #1 and search space set #2 in a specific slot and monitor one of search space set #1 and search space set #2 in another specific slot.

[PDCCH: Span]

The UE may report a UE capability in the case in which a plurality of PDCCH monitoring locations exist within the slot and, at this time, the concept "span" may be used. The span is consecutive symbols in which the UE can monitor a PDCCH within the slot, and each PDCCH monitoring location may be within 1 span. The span may be expressed by (X,Y), in which X refers to the minimum number of symbols which should be spaced apart between first symbols of two consecutive spans and Y refers to the number of consecutive symbols for monitoring a PDCCH within 1 span. At this time, the UE may monitor the PDCCH in a section within Y symbols from the first symbol of the span within the span.

Figure 5B:
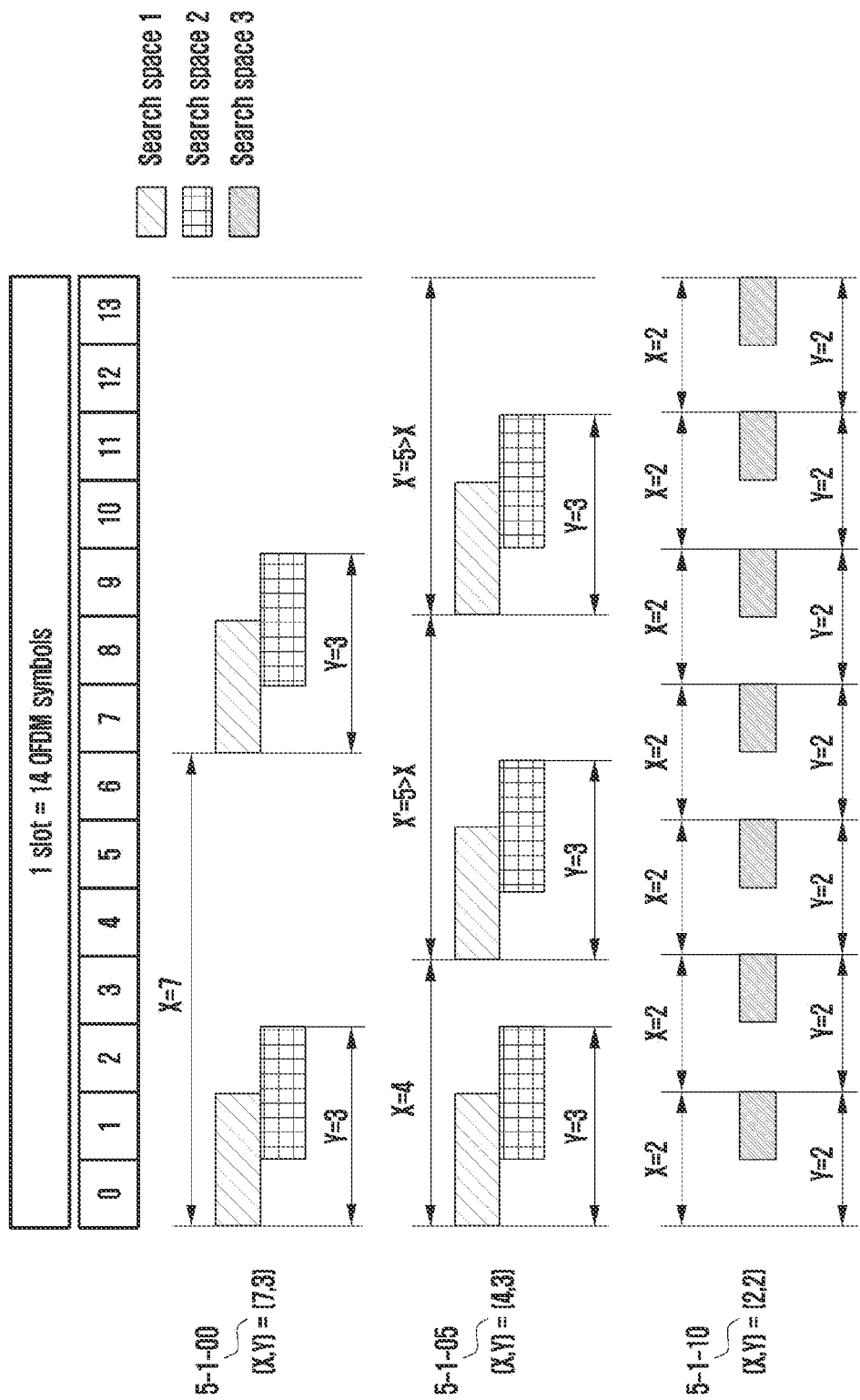
FIG. 5B illustrates a case in which the user equipment (UE) may have a plurality of physical downlink control channel (PDCCH) monitoring locations within a slot through a span in a wireless communication system, according to an embodiment of the disclosure.

FIG. 5B illustrates a case in which the UE may have a plurality of PDCCH monitoring locations within a slot through a span in a wireless communication system, according to an embodiment of the disclosure.

Referring to FIG. 5B, the span is expressed by (X,Y)= (7,3), (4,3), and (2,2), and the three cases are expressed as 5-1-00, 5-1-05, and 5-1-10 in FIG. 5B. For example, 5-1-00 indicates the case in which the number of spans which can be expressed by (7,4) is 2 is in the slot. An interval between first symbols of the two spans is expressed as X=7, a PDCCH monitoring location may exist within a total of Y=3 symbols from the first symbol of each span, and search spaces 1 and 2 exist within Y=3 symbols. In another example, 5-1-05 indicates the case in which a total number of spans which can be expressed by (4,3) is 3 is in the slot, and an interval between a second span and a third span is X'=5 symbols larger than X=4.

[PDCCH: UE Capability Report]

The slot location of the common search space and the UE-specific search space is indicated by a monitoringSymbolsWithinSlot parameter in Table 11-1, shown below, and the symbol location within the slot is indicated by a bitmap through a monitoringSymbolsWithinSlot parameter in Table 9, shown above. Meanwhile, the symbol location within the slot in which the UE can perform search space monitoring may be reported to the BS through the following UE capability.

UE capability 1 (hereinafter, referred to as "FG 3-1") will now be described. When the number of monitoring occasions (MOs) (the term "monitoring occasion" and the term "MO" are used interchangeably throughout the disclosure) for type 1 and type 3 search spaces or the UE-specific search space is 1 within the slot as shown in Table 11-1 below, the UE capability is a capability to monitor the corresponding MO if the corresponding MO is within the first 3 symbols in the slot. The UE capability is a mandatory capability which all UEs supporting NR should support and whether to support the capability is not explicitly reported to the BS.

TABLE 11-1

| Index | Feature group | Components | Field name in TS 38.331 [2] |
|---|---|---|---|
| 3-1 | Basic DL control channel | 1) One configured CORESET per BWP per cell in addition to CORESET0<br>CORESET resource allocation of 6RB bit-map and duration of 1-3 OFDM symbols for FR1<br>For type 1 CSS without dedicated RRC configuration and for type 0, 0A, and 2 CSSs, CORESET resource allocation of 6RB bit-map and duration 1-3 OFDM symbols for FR2<br>For type 1 CSS with dedicated RRC configuration and for type 3 CSS, UE specific SS, CORESET resource allocation of 6RB bit-map and duration 1-2 OFDM symbols for FR2<br>REG-bundle sizes of 2/3 RBs or 6 RBs<br>Interleaved and non-interleaved CCE-to-REG mapping<br>Precoder-granularity of REG-bundle size<br>PDCCH DMRS scrambling determination<br>TCI state(s) for a CORESET configuration<br>2) CSS and UE-SS configurations for unicast PDCCH transmission per BWP per cell<br>PDCCH aggregation levels 1, 2, 4, 8, 16<br>UP to 3 search space sets in a slot for a scheduled SCell per BWP<br>This search space limit is before applying all dropping rules.<br>For type 1 CSS with dedicated RRC configuration, type 3 CSS, and UE-SS, the monitoring occasion is within the first 3 OFDM symbols of a slot<br>For type 1 CSS without dedicated RRC configuration and for type 0, 0A, and 2 CSS, the monitoring occasion can be any OFDM symbol(s) of a slot, with the monitoring occasions for any of Type 1- CSS without dedicated RRC configuration, or Types 0, 0A, or 2 CSS configurations within a single span of three consecutive OFDM symbols within a slot<br>3) Monitoring DCI formats 0_0, 1_0, 0_1, 1_1<br>4) Number of PDCCH blind decodes per slot with a given SCS follows Case 1-1 table | n/a |

TABLE 11-1-continued

| Index | Feature group | Components | Field name in TS 38.331 [2] |
|---|---|---|---|
| | | 5) Processing one unicast DCI scheduling DL and one unicast DCI scheduling UL per slot per scheduled CC for FDD<br>6) Processing one unicast DCI scheduling DL and 2 unicast DCI scheduling UL per slot per scheduled CC for TDD | |

UE capability 2 (hereinafter, referred to as "FG 3-2") will now be described. When the number of MOs for the common search space or the UE-specific search space is one within the slot as shown in Table 11-2 below, the UE capability is a capability to perform monitoring regardless of the start symbol location of the corresponding MO. The UE capability can be optionally supported by the UE, and whether to support the capability is explicitly reported to the BS.

TABLE 11-2

| Index | Feature group | Components | Field name in TS 38.331 [2] |
|---|---|---|---|
| 3-2 | PDCCH monitoring on any span of up to 3 consecutive OFDM symbols of a slot | For a given UE, all search space configurations are within the same span of 3 consecutive OFDM symbols in the slot | pdcchMonitoringSingleOccasion |

UE capability 3 (hereinafter, referred to as "FG 3-5", "FG 3-5a", "FG 3-5b") will now be described. When the number of MOs for the common search space or the UE-specific search space is plural within the slot, as shown in Table 11-3 below, the UE capability indicates a pattern of MOs which the UE can monitor. The pattern includes an interval X between start symbols of different MOs and a maximum symbol length Y of one MO. A combination of (X,Y) supported by the UE may be one or more of {(2,2), (4,3), (7,3)}. The UE capability can be optionally supported by the UE, and whether to support the capability and the combination (X,Y) are explicitly reported to the BS.

TABLE 11-3

| Index | Feature group | Components | Field name in TS 38.331 [2] |
|---|---|---|---|
| 3-5 | For type 1 CSS with dedicated RRC configuration, type 3 CSS, and UE-SS, monitoring occasion can be any OFDM symbol(s) of a slot for Case 2 | For type 1 CSS with dedicated RRC configuration, type 3 CSS, and UE-SS, monitoring occasion can be any OFDM symbol(s) of a slot for Case 2 | pdcch-MonitoringAnyOccasions {<br>3-5. withoutDCI-Gap<br>3-5a. withDCI-Gap<br>} |
| 3-5a | For type 1 CSS with dedicated RRC configuration, type 3 CSS, and UE-SS, monitoring occasion can be any OFDM symbol(s) of a slot for Case 2 with a DCI gap | For type 1 CSS with dedicated RRC configuration, type 3 CSS and UE-SS, monitoring occasion can be any OFDM symbol(s) of a slot for Case 2, with minimum time separation (including the cross-slot boundary case) between two DL unicast DCIs, between two UL unicast DCIs, or between a DL and an UL unicast DCI in different monitoring occasions where at least one of them is not the monitoring occasions of FG-3-1, for a same UE as<br>2OFDM symbols for 15 kHz<br>4OFDM symbols for 30 kHz<br>7OFDM symbols for 60 kHz with NCP<br>11OFDM symbols for 120 kHz<br>Up to one unicast DL DCI and up to one unicast UL DCI in a monitoring occasion except for the monitoring occasions of FG 3-1. | |

TABLE 11-3-continued

| Index | Feature group | Components | Field name in TS 38.331 [2] |
|---|---|---|---|
|  |  | In addition for TDD the minimum separation between the first two UL unicast DCIs within the first 3 OFDM symbols of a slot can be zero OFDM symbols. |  |
| 3-5b | All PDCCH monitoring occasion can be any OFDM symbol(s) of a slot for Case 2 with a span gap | PDCCH monitoring occasions of FG-3-1, plus additional PDCCH monitoring occasion(s) can be any OFDM symbol(s) of a slot for Case 2, and for any two PDCCH monitoring occasions belonging to different spans, where at least one of them is not the monitoring occasions of FG-3-1, in same or different search spaces, there is a minimum time separation of X OFDM symbols (including the cross-slot boundary case) between the start of two spans, where each span is of length up to Y consecutive OFDM symbols of a slot. Spans do not overlap. Every span is contained in a single slot. The same span pattern repeats in every slot. The separation between consecutive spans within and across slots may be unequal but the same (X, Y) limit must be satisfied by all spans. Every monitoring occasion is fully contained in one span. In order to determine a suitable span pattern, first a bitmap b(l), 0 <= l <= 13 is generated, where b(l) = 1 if symbol l of any slot is part of a monitoring occasion, b(l) = 0 otherwise. The first span in the span pattern begins at the smallest l for which b(l) = 1. The next span in the span pattern begins at the smallest l not included in the previous span(s) for which b(l) = 1. The span duration is max{maximum value of all CORESET durations, minimum value of Y in the UE reported candidate value} except possibly the last span in a slot which can be of shorter duration. A particular PDCCH monitoring configuration meets the UE capability limitation if the span arrangement satisfies the gap separation for at least one (X, Y) in the UE reported candidate value set in every slot, including cross slot boundary. For the set of monitoring occasions which are within the same span: Processing one unicast DCI scheduling DL and one unicast DCI scheduling UL per scheduled CC across this set of monitoring occasions for FDD Processing one unicast DCI scheduling DL and two unicast DCI scheduling UL per scheduled CC across this set of monitoring occasions for TDD Processing two unicast DCI scheduling DL and one unicast DCI scheduling UL per scheduled CC across this set of monitoring occasions for TDD The number of different start symbol indices of spans for all PDCCH monitoring occasions per slot, including PDCCH monitoring occasions of FG-3-1, is no more than floor(14/X) (X is minimum among values reported by UE). |  |

TABLE 11-3-continued

| Index | Feature group | Components | Field name in TS 38.331 [2] |
|---|---|---|---|
| | | The number of different start symbol indices of PDCCH monitoring occasions per slot including PDCCH monitoring occasions of FG-3-1, is no more than 7. The number of different start symbol indices of PDCCH monitoring occasions per half-slot including PDCCH monitoring occasions of FG-3-1 is no more than 4 in SCell. | |

The UE may report whether to support UE capability 2 and/or UE capability 3 and a relevant parameter to the BS. The BS may allocate time axis resources for the common search space and the UE-specific search space on the basis of the UE capability. In the resource allocation, the BS may not place the MO at the location at which the UE cannot perform monitoring.

[PDCCH: BD/CCE Limit]

If a plurality of search space sets are configured in the UE, a method of determining a search space set which the UE should monitor may be based on "condition 1" and "condition 2".

If the UE receives a configuration of a value of monitoringCapabilityConfig-r16 which is higher-layer signaling as r15monitoringcapability, the UE defines the number of PDCCH candidates which can be monitored and a maximum value for the number of CCEs included in entire search spaces (indicating a set of entire CCE sets corresponding to a union area of a plurality of search space sets). When the UE receives a configuration of a value of monitoringCapabilityConfig-r16 as r16monitoringcapability, the UE may define the number of PDCCH candidates which can be monitored and a maximum value for the number of CCEs included in entire search spaces (indicating entire CCE sets corresponding to a union area of a plurality of search space sets) for each span.

[Condition 1: Limits on a Maximum Number of PDCCH Candidates]

In a cell in which subcarrier spacing is configured as $15 \cdot 2^{\mu}$ kHz, the maximum number $M\mu$ of PDCCH candidates which the UE can monitor according to the configuration value of higher-layer signaling, as described above, follows Table 12-1, shown below, when the maximum number of PDCCH candidates Mp is defined on the basis of a slot or follows Table 12-2, shown below, when the maximum number Mp of PDCCH candidates is defined on the basis of a span.

TABLE 12-1

| $\mu$ | Maximum number of PDCCH candidates per slot and per serving cell ($M^{\mu}$) |
|---|---|
| 0 | 44 |
| 1 | 36 |
| 2 | 22 |
| 3 | 20 |

TABLE 12-2

| | Maximum number $M^{\mu}$ of monitored PDCCH candidates per span for combination (X, Y) and per serving cell | | |
|---|---|---|---|
| $\mu$ | (2, 2) | (4, 3) | (7, 3) |
| 0 | 14 | 28 | 44 |
| 1 | 12 | 24 | 36 |

[Condition 2: Limits on a Maximum Number of CCEs]

In a cell in which subcarrier spacing is configured as $15 \cdot 2^{\mu}$ kHz, the maximum number $C^{\mu}$ of CCEs included in the entire search spaces (indicating a set of entire CCE sets corresponding to a union area of a plurality of search space sets) according to the configuration value of higher-layer signaling, as described above, follows Table 12-3 when the maximum number $C^{\mu}$ of CCEs is defined on the basis of a slot or follows Table 12-4, shown below, when the maximum number $C^{\mu}$ of CCEs is defined on the basis of a span.

TABLE 12-3

| $\mu$ | Maximum number of non-overlapped CCEs per slot and per serving cell ($C^{\mu}$) |
|---|---|
| 0 | 56 |
| 1 | 56 |
| 2 | 48 |
| 3 | 32 |

TABLE 12-4

| | Maximum number $C^{\mu}$ of non-overlapped CCEs per span for combination (X, Y) and per serving cell | | |
|---|---|---|---|
| $\mu$ | (2, 2) | (4, 3) | (7, 3) |
| 0 | 18 | 36 | 56 |
| 1 | 18 | 36 | 56 |

For convenience of description, a situation satisfying both conditions 1 and 2 at a specific time point is defined as "condition A". Accordingly, not satisfying condition A may mean that at least one of conditions 1 and 2 is not satisfied.

[PDCCH: Overbooking]

Condition A may not be satisfied at a specific time point according to a configuration of search space sets by the BS. If condition A is not satisfied at a specific time point, the UE may select and monitor only some of the search space sets configured to satisfy condition A at the corresponding time point, and the BS may transmit the PDCCH through the selected search space sets.

The following method may be applied as a method of selecting some of the configured search space sets.

If condition A for the PDCCH is not satisfied at a specific time point (slot), the UE (or the BS) may select a search space set of which a search space type is configured as a common-search space among search space sets existing at the corresponding time point in preference to a search space set of which a search space type is configured as a UE-specific search space.

If search space sets configured as the common-search space are all selected (that is, if condition A is satisfied even after all search spaces configured as the common-search space are selected), the UE (or BS) may select search space sets configured as the UE-specific search space. At this time, if the number of search space sets configured as the UE-specific search space is plural, a search space set having a lower search space set index may have a higher priority. UE-specific search space sets may be selected within a range in which condition A is satisfied in consideration of the priority.

[Discontinuous Reception (DRX)]

Figure 6:
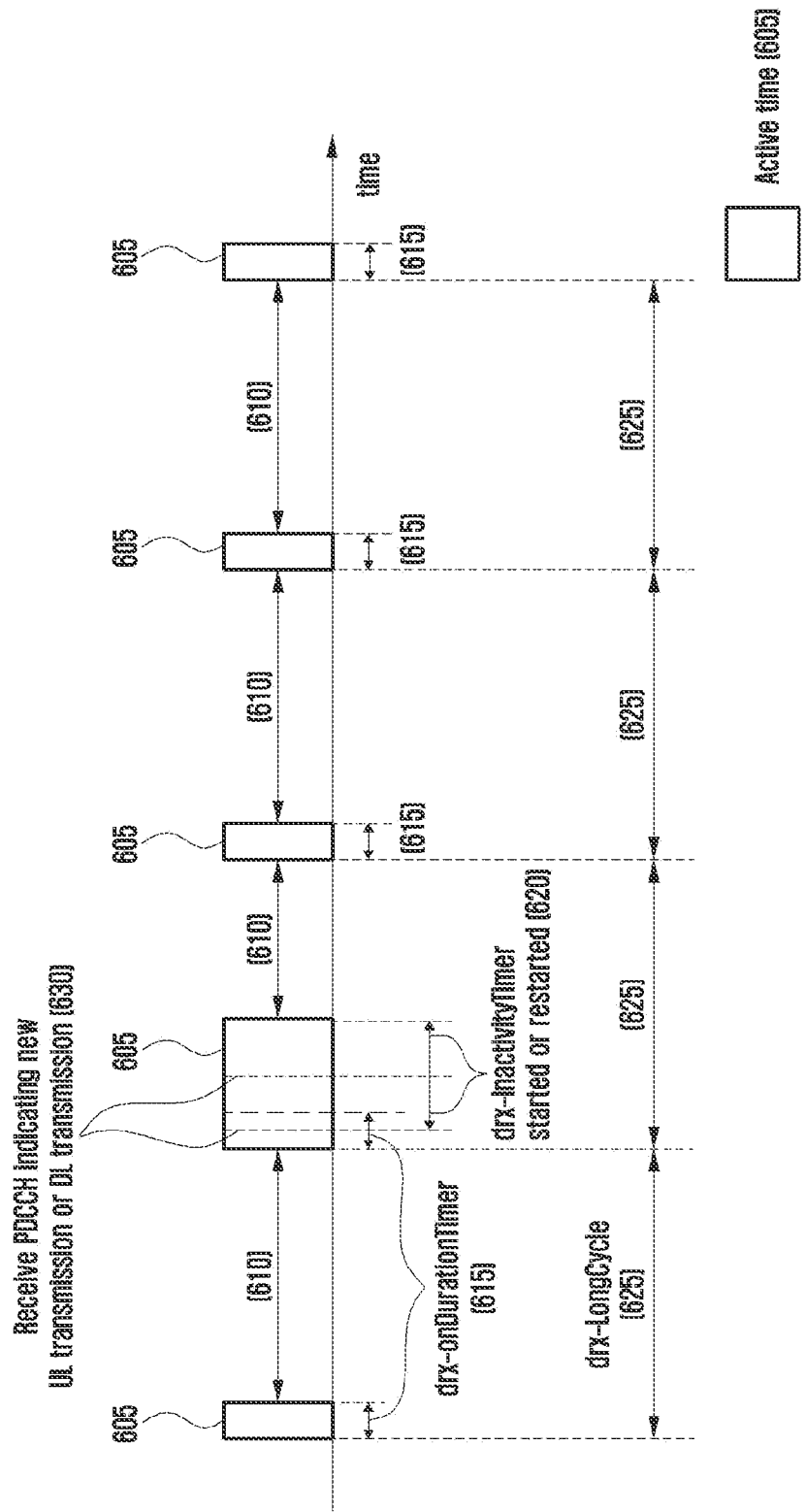
FIG. 6 illustrates an example of a discontinuous reception (DRX) operation in a wireless communication system, according to an embodiment of the disclosure.

FIG. 6 illustrates an example of a DRX operation in a wireless communication system, according to an embodiment of the disclosure.

DRX is an operation in which the UE using a service discontinuously receives data in an RRC-connected state in which a radio link is established between the BS and the UE. When DRX is applied, the UE may turn on a receiver at a specific time point and monitor a control channel, and when there is no data received for a predetermined period, turn off the receiver to reduce power consumption of the UE. The DRX operation may be controlled by a MAC layer device on the basis of various parameters and a timer.

Referring to FIG. 6, an active time 605 is a time during which the UE wakes up every DRX cycle and monitors a PDCCH. The active time 605 may be defined as follows:

drx-onDurationTimer or drx-InactivityTimer or drx-RetransmissionTimerDL or drx-RetransmissionTimerUL or ra-ContentionResolutionTimer is running;

a Scheduling Request is sent on a PUCCH and is pending; or a PDCCH indicating a new transmission addressed to the C-RNTI of the MAC entity has not been received after successful reception of a random access response for the random access preamble not selected by the MAC entity among the contention-based random access preamble.

drx-onDurationTimer, drx-InactivityTimer, drx-RetransmissionTimerDL, drx-RetransmissionTimerUL, and ra-ContentionResolutionTimer, are timers of which values are configured by the BS, and have functions configured to monitor a PDCCH by the UE in the state in which a predetermined condition is satisfied.

The drx-onDurationTimer 615 is a parameter for configuring a minimum time during which the UE is awake in a DRX cycle. The drx-InactivityTimer 620 is a parameter for configuring a time during which the UE is additionally awake when a PDCCH indicating new uplink transmission or downlink transmission is received as indicated by reference numeral 630. The drx-RetransmissionTimerDL is a parameter for configuring a maximum time during which the UE is awake in order to receive downlink retransmission in a downlink hybrid automatic repeat request (HARQ) procedure. The drx-RetransmissionTimerUL is a parameter for configuring a maximum time during which the UE is awake in order to receive a grant of uplink retransmission in an uplink HARQ procedure. The drx-onDurationTimer, drx-InactivityTimer, drx-RetransmissionTimerDL, and drx-RetransmissionTimerUL may be configured as, for example, a time, the number of subframes, and the number of slots. The ra-ContentionResolutionTimer is a parameter for monitoring a PDCCH in a random access procedure.

An inactive time 610 is a time in which no PDCCH monitoring is performed or a time in which no PDCCH reception is performed during the DRX operation, and the remaining time except for the active time 605 in the entire time in which the DRX operation is performed. When the PDCCH is not monitored during the active time 605, the UE may enter a sleep or inactive state and reduce power consumption.

The DRX cycle refers to a cycle on which the UE wakes up and monitors a PDCCH. That is, the DRX cycle is a time interval or a cycle of a duration from monitoring of the PDCCH to monitoring of the next PDCCH by the UE. The DRX cycle has two types such as a short DRX cycle and a long DRX cycle. The short DRX cycle may be optionally applied.

The long DRX cycle 625 is a longer cycle among the two DRX cycles configured in the UE. The UE starts the drx-onDurationTimer 615 at a time point at which the long DRX cycle 625 passes after a start point (for example, a start symbol) of the drx-onDurationTimer 615 while the long DRX cycle operates. In the operation of the long DRX cycle 625, the UE may start the drx-onDurationTimer 615 in a slot after drx-SlotOffset in a subframe that satisfies Equation (2), below. Here, the drx-SlotOffset is a delay before the drx-onDurationTimer 615 starts. The drx-SlotOffset may be configured as, for example, a time, or the number of slots.

$$[(SFN \times 10)+\text{subframe number}] \text{ modulo } (drx\text{-Long-Cycle})=drx\text{-StartOffset} \quad \text{[Equation 2]}$$

SFN refers to a "single frequency network". The drx-LongCycleStartOffset and drx-StartOffset may be used to define a subframe for starting the long DRX cycle 625. The drx-LongCycleStartOffset may be configured as, for example, a time, the number of subframes, or the number of slots.

[QCL, TCI State]

In the wireless communication system, one or more different antenna ports (or one or more channels, signals, and combinations thereof, but commonly referred to as different antenna ports for convenience of description) may be associated by a QCL configuration shown in Table 13, below. The TCI state is to inform of a QCL relation between a PDCCH (or a PDCCH DMRS) and another RS or channel, and a reference antenna port A (e.g., reference RS #A) and another purpose antenna port B (e.g., target RS #B) which are QCLed means that the UE is allowed to apply some or all of large-scale channel parameters estimated in the antenna port A to channel measurement from the antenna port B. The QCL is required to associate different parameters according to conditions, such as time tracking influenced by average delay and delay spread, frequency tracking influenced by Doppler shift and Doppler spread, radio resource management (RRM) influenced by an average gain, and beam management (BM) influenced by a spatial parameter. Accordingly, NR supports four types of QCL relations shown in Table 13, below.

TABLE 13

| QCL type | Large-scale characteristics |
| --- | --- |
| A | Doppler shift, Doppler spread, average delay, delay spread |
| B | Doppler shift, Doppler spread |

TABLE 13-continued

| QCL type | Large-scale characteristics |
|---|---|
| C | Doppler shift, average delay |
| D | Spatial Rx parameter |

A spatial Rx parameter may refer to some or all of an angle of arrival (AoA), a power angular spectrum (PAS) of AoA, an angle of departure (AoD), a PAS of AoD, a transmission/reception channel correlation, transmission/reception beamforming, and a spatial channel correlation.

The QCL relation can be configured in the UE through RRC parameter TCI-state and QCL-Info as shown in Table 14, below. Referring to Table 14 below, the BS may configure one or more TCI states in the UE and inform the UE of a maximum of two QCL relations (QCL-Type 1 and QCL-Type 2) for an RS referring to an ID of the TCI state, that is, a target RS. At this time, each piece of the QCL information (QCL-Info) included in the TCI state includes a serving cell index and a BWP index of a reference RS indicated by the corresponding QCL information, a type and an ID of the reference RS, and the QCL type as shown in Table 13, above.

TABLE 14

```
TCI-State ::=                    SEQUENCE {
    tci-StateId                  TCI-StateId,
    (ID of corresponding TCI state)
    qcl-Type 1                   QCL-Info,
    (QCL information of first reference RS of RS (target RS) referring to corresponding
TCI state ID)
    qcl-Type2                    QCL-Info
                                 OPTIONAL, -- Need R
    (QCL information of second reference RS of RS (target RS) referring to corresponding
TCI state ID)
    ...
}
QCL-Info ::=                     SEQUENCE {
    cell
    ServCellIndex                OPTIONAL, -- Need R
    (serving cell index of reference RS indicated by corresponding QCL information)
    bwp-Id                       BWP-Id
                                 OPTIONAL, -- Cond CSI-RS-Indicated
    (BWP index of reference RS indicated by corresponding QCL information)
    referenceSignal              CHOICE {
        csi-rs
    NZP-CSI-RS-ResourceId,
        ssb
    SSB-Index
        (one of CSI-RSI ID or SSB ID indicated by corresponding QCL information)
    },
    qcl-Type                     ENUMERATED
{typeA, typeB, typeC, typeD},
    ...
}
```

Figure 7:
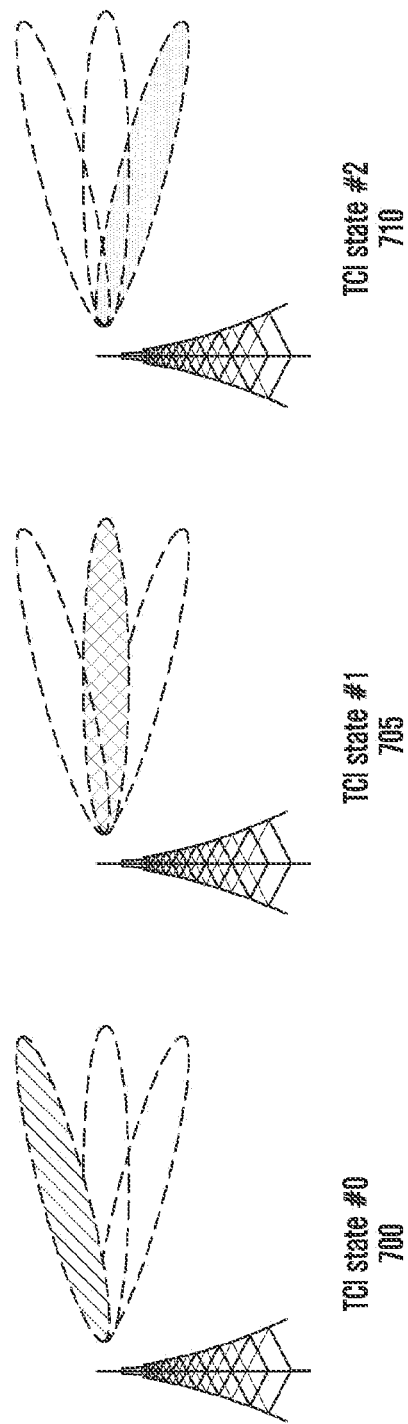
FIG. 7 illustrates an example of base station (BS) beam allocation according to a transmission configuration indication (TCI) state configuration in a wireless communication system, according to an embodiment of the disclosure.

FIG. 7 illustrates an example of BS beam allocation according to a TCI state configuration in a wireless communication system, according to an embodiment of the disclosure.

Referring to FIG. 7, the BS may transmit information on N different beams to the UE through N different TCI states. The N represents the number of beams or the number of TCI states. For example, when N=3 as illustrated in FIG. 7, the BS may notify that a qcl-Type 2 parameter included in three TCI states 700, 705, and 710 is associated with a CSI-RS or SSB corresponding to different beams to be configured as QCL type D and antenna ports referring to the different TCI states 700, 705, and 710 are associated with different spatial Rx parameters, that is, different beams.

Table 15-1 to Table 15-5, below, show valid TCI state configurations according to the target antenna port type.

Table 15-1 shows valid TCI state configurations when the target antenna port is a CSI-RS for tracking (TRS). The TRS is an NZP CSI-RS for which a repetition parameter is not configured and trs-Info is configured as true among CSI-RSs. The third configuration in Table 15-1 may be used for an aperiodic TRS.

TABLE 15-1

| Valid TCI state Configuration | DL RS 1 | qcl-Type 1 | DL RS 2 (if configured) | qcl-Type 2 (if configured) |
|---|---|---|---|---|
| 1 | SSB | QCL-TypeC | SSB | QCL-TypeD |
| 2 | SSB | QCL-TypeC | CSI-RS (BM) | QCL-TypeD |
| 3 | TRS (periodic) | QCL-TypeA | TRS (same as DL RS 1) | QCL-TypeD |

Table 15-2 shows valid TCI state configurations when the target antenna port is a CSI-RS for CSI. The CSI-RS for CSI is an NZP CSI-RS for which a parameter (for example, a repetition parameter) indicating repetition is not configured and trs-Info is not configured as true among the CSI-RSs.

TABLE 15-2

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | SSB | QCL-TypeD |
| 2 | TRS | QCL-TypeA | CSI-RS for BM | QCL-TypeD |
| 3 | TRS | QCL-TypeA | TRS (same as DL RS 1) | QCL-TypeD |
| 4 | TRS | QCL-TypeB | | |

Table 15-3 shows valid TCI state configurations when the target antenna port is a CSI-RS for BM (that is, the same meaning as a CSI-RS for L1 RSRP reporting). The CSI-RS for BM is an NZP CSI-RS for which a repetition parameter is configured to have a value of on or off and trs-Info is not configured as true.

TABLE 15-3

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | SS/PBCH | QCL-TypeC | SS/PBCH block | QCL-TypeD |

Table 15-4 shows valid TCI state configurations when the target antenna port is a PDCCH DMRS.

TABLE 15-4

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS (same as DL RS 1) | QCL-TypeD |
| 2 | TRS | QCL-TypeA | CSI-RS (BM) | QCL-TypeD |
| 3 | CSI-RS (CSI) | QCL-TypeA | CSI-RS (same as DL RS 1) | QCL-TypeD |

Table 15-5 shows valid TCI state configurations when the target antenna port is a PDCCH DMRS.

TABLE 15-5

| Valid TCI state Configuration | DL RS 1 | qcl-Type 1 | DL RS 2 (if configured) | qcl-Type 2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | CSI-RS (CSI) | QCL-TypeD |

In a representative QCL configuration method by Table 15-1 to Table 15-5, the target antenna port and the reference antenna port for each step are configured and operated as "SSB"→"TRS"→"CSI-RS for CSI, CSI-RS for BM, PDCCH DMRS, or PDSCH DMRS". In a representative QCL configuration method by Table 20 to Table 24, the target antenna port and the reference antenna port for each step are configured and operated as "SSB"→"TRS"→"CSI-RS for CSI, CSI-RS for BM, PDCCH DMRS, or PDSCH DMRS".

[PDCCH: Related to TCI State]

TCI state combinations which can be applied to the PDCCH DMRS antenna port may be as shown in Table 16, below. In Table 16, a fourth row is a combination assumed by the UE before the RRC configuration, and configurations after RRC are impossible.

TABLE 16

| Valid TCI state Configuration | DL RS 1 | qcl-Type1 | DL RS 2 (if configured) | qcl-Type2 (if configured) |
|---|---|---|---|---|
| 1 | TRS | QCL-TypeA | TRS | QCL-TypeD |
| 2 | TRS | QCL-TypeA | CSI-RS (BM) | QCL-TypeD |
| 3 | CSI-RS (CSI) | QCL-TypeA | | |
| 4 | SS/PBCH Block | QCL-TypeA | SS/PBCH Block | QCL-TypeD |

Figure 8:
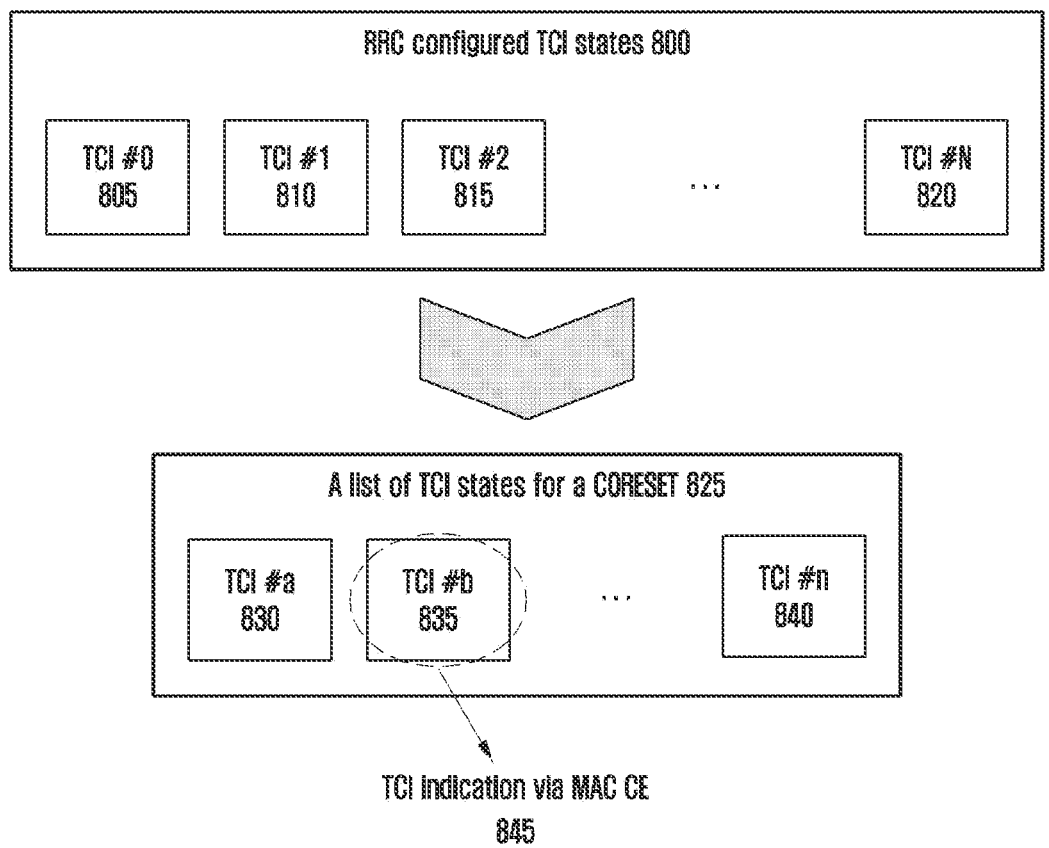
FIG. 8 illustrates an example of a method of allocating TCI states for a PDCCH in a wireless communication system, according to an embodiment of the disclosure.

In a wireless communication system (for example, a 5G system or NR system), a hierarchical signaling method as illustrated in FIG. 8 is supported for dynamic allocation for a PDCCH beam.

FIG. 8 illustrates an example of a method of allocating TCI states for a PDCCH in a wireless communication system, according to an embodiment of the disclosure.

Referring to FIG. 8, the BS may configure N TCI states 805, 810, 815 . . . , 820 in the UE through RRC signaling 800 and configure some thereof as TCI states for the CORESET as indicated by reference numeral 825. Thereafter, the BS may indicate one of the TCI states 830, 835, and 840 for the CORESET to the UE through MAC CE signaling as indicated by reference numeral 845. Subsequently, the UE may receive a PDCCH on the basis of beam information included in the TCI states indicated by the MAC CE signaling.

Figure 9:
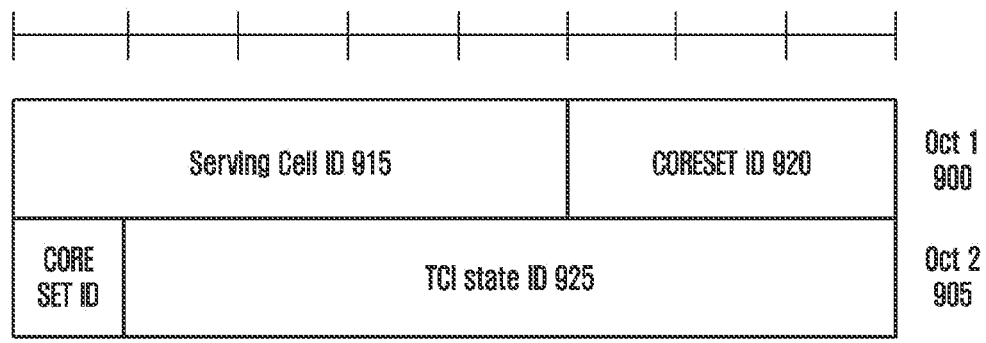
FIG. 9 illustrates a TCI indication medium access control (MAC) control element (CE) signaling structure for a PDCCH demodulation reference signal (DMRS) in a wireless communication system, according to an embodiment of the disclosure.

FIG. 9 illustrates a TCI indication MAC CE indication signaling structure for a PDCCH DMRS in a wireless communication system, according to an embodiment of the disclosure.

Referring to FIG. 9, TCI indication MAC CE signaling for the PDCCH DMRS may consist of 2 bytes (16 bits), and may include a serving cell ID 915 of 5 bits, a CORESET ID 920 of 4 bits, and a TCI state ID 925 of 7 bits.

Figure 10:
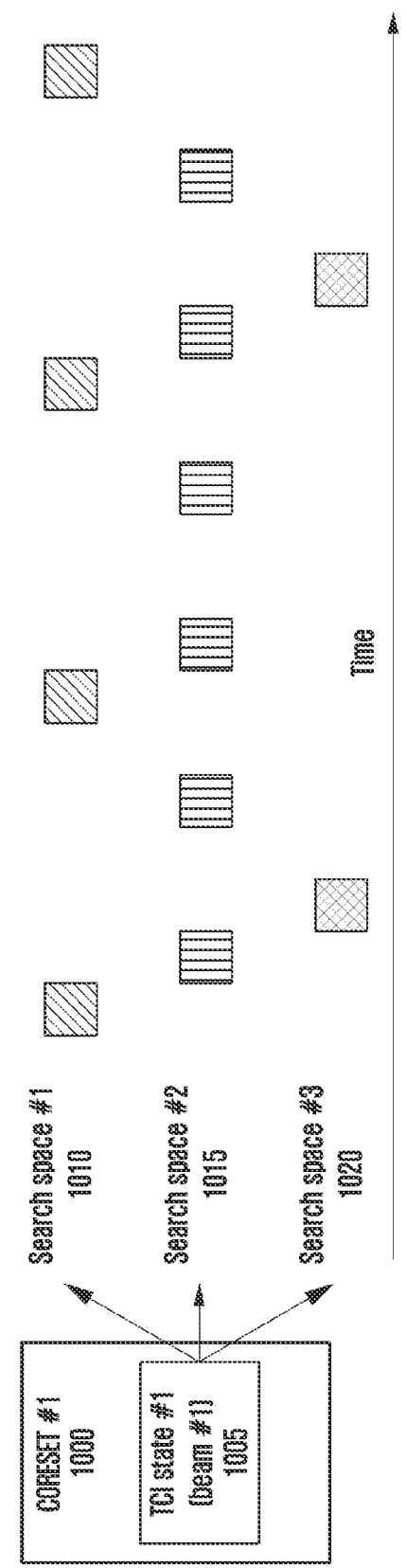
FIG. 10 illustrates an example of a beam configuration of a control resource set (CORESET) and a search space in a wireless communication system, according to an embodiment of the disclosure.

FIG. 10 illustrates an example of a CORESET and search space beam configuration in a wireless communication system, according to an embodiment of the disclosure.

Referring to FIG. 10, the BS may indicate one of the TCI state list included in the configuration of a CORESET 1000 through MAC CE signaling as indicated by reference numeral 1005. Thereafter, before another TCI state is indicated to the corresponding CORESET through different MAC CE signaling, the UE may consider that the same QCL information (beam #1) 1005 is applied to one or more search spaces 1010, 1015, and 1050 associated with the CORESET. The PDCCH beam allocation method has difficulty indicating a beam change earlier than a MAC CE signaling delay and has a disadvantage of applying the same beam to all CORESETs regardless of a search space characteristic, and thus causes flexible PDCCH beam operation to be difficult. Hereinafter, embodiments of the disclosure provide a more flexible PDCCH beam configuration and operation method. In the following embodiments of the disclosure, some distinguished examples are provided for convenience of description, but they are not exclusive and can be applied through a proper combination thereof according to circumstances.

The BS may configure one or a plurality of TCI states for a specific CORESET in the UE and activate one of the configured TCI states through a MAC CE activation command. For example, {TCI state #0, TCI state #1, TCI state #2} are configured in CORESET #1 as the TCI states, and the BS may transmit a command for activating TCI state #0 assumed as the TCI state for CORESET #1 to the UE through the MAC CE. The UE may correctly receive a DMRS of the corresponding CORESET on the basis of QCL information within the activated TCI state by means of the activation command for the TCI state received through the MAC CE.

When the UE does not receive the MAC CE activation command for the TCI state of CORESET #0 for the CORESET having an index of 0, the UE may assume that a DMRS transmitted in CORESET #0 is QCLed with an SS/PBCH block identified in an initial access process or a non-contention-based random access process which is not triggered by a PDCCH command.

When the UE does not receive a configuration of the TCI state for CORESET #X or the UE receives the configuration of one or more TCI states but does not receive a MAC CE activation command for activating one thereof, the UE may assume that a DMRS transmitted in CORESET #X is QCLed with an SS/PBCH block identified in an initial access process.

[PDCCH: Related to QCL Prioritization Rule]

In the following description, an operation of determining a QCL priority of a PDCCH will be described in detail.

When multiple control resource sets operating by carrier aggregation in a single cell or band and existing in an activated bandwidth part in a single or multiple cells overlap with each other in the time domain while having the same or different QCL-TypeD characteristics in a particular PDCCH monitoring interval, a terminal may select a particular control resource set according to a QCL priority determination operation, and monitor control resource sets having the same QCL-TypeD characteristic as that of the selected control resource set. That is, when multiple control resource sets overlap with each other in the time domain, the terminal may receive only one QCL-TypeD characteristic. A criterion of determining a QCL priority may be as follows.

Criterion 1. A control resource set connected to a common search interval having the lowest index in a cell corresponding to the lowest index among cells including common search intervals Criterion 2. A control resource set connected to a terminal-specific search interval having the lowest index in a cell corresponding to the lowest index among cells including terminal-specific search intervals As described above, if each criterion is not satisfied, the next criterion is applied. For example, in a case where control resource sets overlap with each other in the time domain in a particular PDCCH monitoring interval, if all the control resource sets are connected to terminal-specific search intervals rather than common search intervals, that is, if criterion 1 is not satisfied, a terminal may omit application of criterion 1 and apply criterion 2.

When a control resource set is selected by the above criteria, the terminal may additionally consider two items below for QCL information configured in the control resource set. First, if control resource set 1 has CSI-RS 1 as a reference signal having a relation of QCL-TypeD, a reference signal having a relation of QCL-TypeD with CSI-RS 1 is SSB 1, and a reference signal having a relation of QCL-TypeD with control resource set 2 that is another control resource set is SSB 1, the terminal may consider that two control resource sets 1 and 2 have different QCL-TypeD characteristics. Second, if control resource set 1 has CSI-RS 1 configured in cell 1 as a reference signal having a relation of QCL-TypeD, a reference signal having a relation of QCL-TypeD with CSI-RS 1 is SSB 1, control resource set 2 has CSI-RS 2 configured in cell 2 as a reference signal having a relation of QCL-TypeD, and a reference signal having a relation of QCL-TypeD with CSI-RS 2 is SSB 1, the terminal may consider that the two control resource sets have the same QCL-TypeD characteristic.

Figure 12:
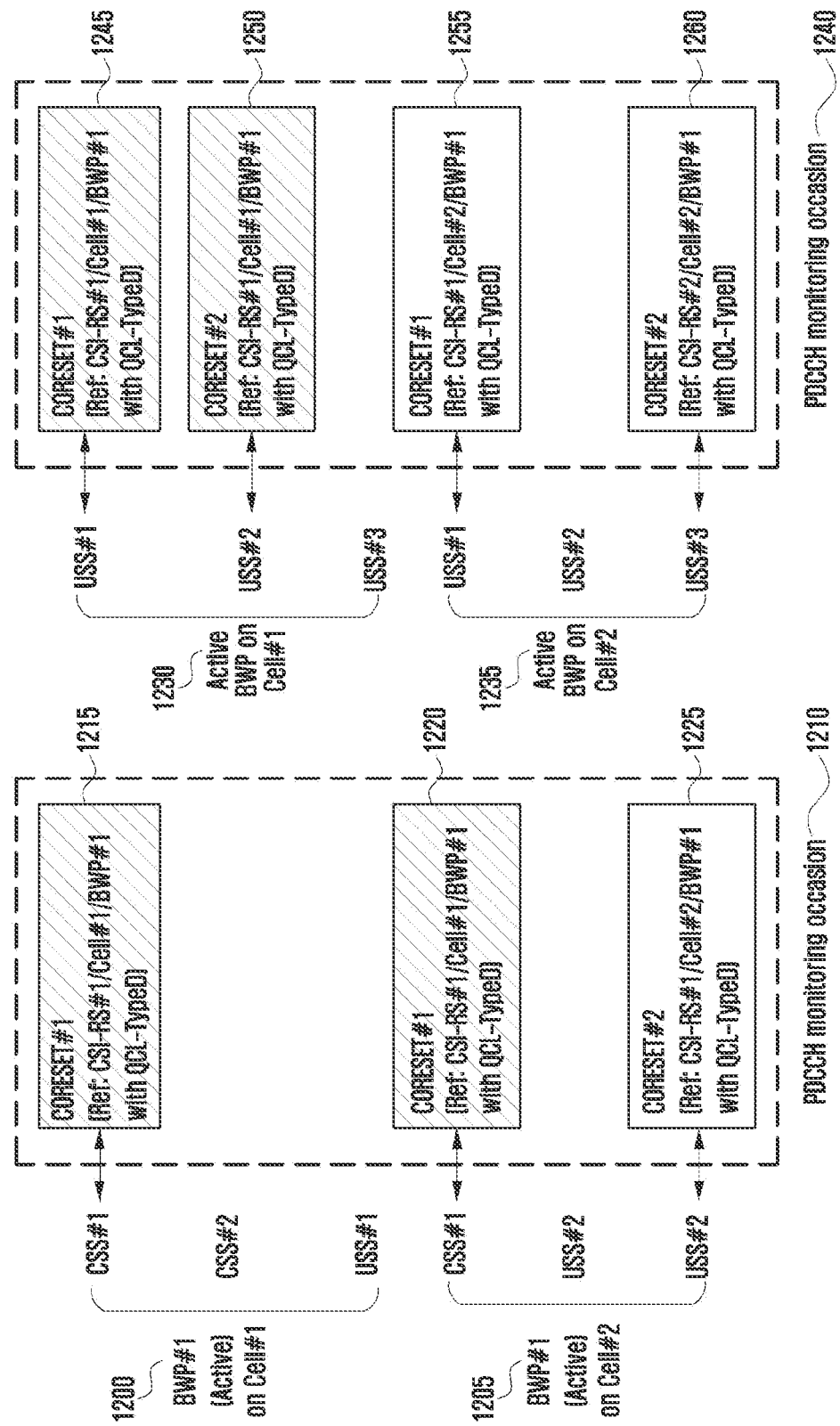
FIG. 12 illustrates a diagram of a method of selecting a receivable control resource set in consideration of priority when a terminal receives a downlink control channel in a wireless communication system according to an embodiment of the disclosure.

FIG. 12 illustrates a diagram of a method of selecting a receivable control resource set in consideration of priority when a terminal receives a downlink control channel in a wireless communication system according to an embodiment of the disclosure.

Referring to FIG. 12, a terminal may be configured to receive multiple control resource sets overlapping with each other in the time domain in a particular PDCCH monitoring interval 1210, and each of the multiple control resource sets may be connected to a common search space or a terminal-specific search space with respect to multiple cells. In the PDCCH monitoring interval, control resource set #1 1215 connected to common search interval #1 may exist in bandwidth part #1 1200 of cell #1, and control resource set #1 1220 connected to common search interval #1 and control resource set #2 1225 connected to terminal-specific search interval #2 may exist in bandwidth part #1 1205 of cell #2. The control resource sets 1215 and 1220 may have a relation of QCL-TypeD with CSI-RS resource #1 configured in bandwidth part #1 of cell #1, and the control resource set 1225 may have a relation of QCL-TypeD with CSI-RS resource #1 configured in bandwidth part #1 of cell #2. Therefore, if criterion 1 is applied to the PDCCH monitoring interval 1210, all the other control resource sets having a reference signal in the same QCL-TypeD as control resource set #1 1215 may be received. Therefore, the terminal may receive the control resource sets 1215 and 1220 in the PDCCH monitoring interval 1210. As another example, a terminal may be configured to receive multiple control resource sets overlapping with each other in the time domain in a particular PDCCH monitoring interval 1240, and each of the multiple control resource sets may be connected to a common search space or a terminal-specific search space with respect to multiple cells. In the PDCCH monitoring interval, control resource set #1 1245 connected to terminal-specific search interval #1 and control resource set #2 1250 connected to terminal-specific search interval #2 may exist in bandwidth part #1 1230 of cell #1, and control resource set #1 1255 connected to terminal-specific search interval #1 and control resource set #2 1260 connected to terminal-specific search interval #3 may exist in bandwidth part #1 1235 of cell #2. The control resource sets 1245 and 1250 may have a relation of QCL-TypeD with CSI-RS resource #1 configured in bandwidth part #1 of cell #1, the control resource set 1255 may have a relation of QCL-TypeD with CSI-RS resource #1 configured in bandwidth part #1 of cell #2, and the control resource set 1260 may have a relation of QCL-TypeD with CSI-RS resource #2 configured in bandwidth part #1 of cell #2. However, if criterion 1 is applied to the PDCCH monitoring interval 1240, there is no common search interval, and thus criterion 2 which is the next criterion may be applied. If criterion 2 is applied to the PDCCH monitoring interval 1240, all the other control resource sets having a reference signal in the same QCL-TypeD as the control resource set 1245 may be received. Therefore, the terminal may receive the control resource sets 1245 and 1250 in the PDCCH monitoring interval 1240.

[Related to Rate Matching/Puncturing]

Hereinafter, a rate matching operation and a puncturing operation will be described in detail.

If time and frequency resource A in which random symbol sequence A is to be transmitted overlaps with random time and frequency resource B, a rate matching or puncturing operation may be considered as an operation of transmitting or receiving channel A in consideration of resource C which is an area in which resource A and resource B overlap with each other. A detailed operation may follow the contents below.

Rate Matching Operation

A base station may transmit channel A after mapping same to only a remaining resource area of entire resource A in which the base station is to transmit symbol sequence A to a terminal, the remaining resource area being obtained by excluding resource C corresponding to an area overlapping with resource B. For example, in a case where symbol sequence A is configured by {symbol #1, symbol #2, symbol #3, symbol #4}, resource A is {resource #1, resource #2, resource #3, resource #4}, and resource B is {resource #3, resource #5}, the base station may transmit symbol sequence A after sequentially mapping same to the remaining resource {resource #1, resource #2, resource #4} obtained by excluding {resource #3} corresponding to resource C from resource A. Consequently, the base station may transmit the symbol sequence {symbol #1, symbol #2, symbol #3} after mapping same to {resource #1, resource #2, resource #4}, respectively.

The terminal may determine resource A and resource B from scheduling information on symbol sequence A from the base station, and may determine resource C that is an area in which resource A and resource B overlap with each other, through the scheduling information. The terminal may receive symbol sequence A under the assumption that symbol sequence A has been transmitted after being mapped to the remaining area obtained by excluding resource C from entire resource A. For example, in a case where symbol sequence A is configured by {symbol #1, symbol #2, symbol #3, symbol #4}, resource A is {resource #1, resource #2, resource #3, resource #4}, and resource B is {resource #3, resource #5}, the terminal may receive symbol sequence A under the assumption that same has been sequentially mapped to the remaining resource {resource #1, resource #2, resource #4} obtained by excluding (resource #3) corresponding to resource C from resource A. Consequently, the terminal may assume that the symbol sequence {symbol #1, symbol #2, symbol #3} has been transmitted after being mapped to (resource #1, resource #2, resource #4), respectively, and may perform a series of reception operations thereafter.

Puncturing Operation

If resource C corresponding to an area overlapping with resource B exists in entire resource A in which a base station is to transmit symbol sequence A to a terminal, the base station may map symbol sequence A to the entirety of resource A, may not perform transmission in a resource area corresponding to resource C, and may perform transmission only in a remaining resource area obtained by excluding resource C from resource A. For example, in a case where symbol sequence A is configured by {symbol #1, symbol #2, symbol #3, symbol #4}, resource A is (resource #1, resource #2, resource #3, resource #4), and resource B is {resource #3, resource #5}, the base station may map symbol sequence A {symbol #1, symbol #2, symbol #3, symbol #4} to resource A {resource #1, resource #2, resource #3, resource #4}, respectively, may only transmit a symbol sequence {symbol #1, symbol #2, symbol #4} corresponding to a remaining resource {resource #1, resource #2, resource #4} obtained by excluding (resource #3) corresponding to resource C from resource A, and may not transmit (symbol #3) mapped to (resource #3) corresponding to resource C. Consequently, the base station may transmit the symbol sequence {symbol #1, symbol #2, symbol #4} after mapping same to {resource #1, resource #2, resource #4}, respectively.

The terminal may determine resource A and resource B from scheduling information on symbol sequence A from the base station, and may determine resource C that is an area in which resource A and resource B overlap with each other, through the scheduling information. The terminal may receive symbol sequence A under the assumption that symbol sequence A has been mapped to entire resource A, but has been transmitted only in a remaining area obtained by excluding resource C from resource area A. For example, in a case where symbol sequence A is configured by {symbol #1, symbol #2, symbol #3, symbol #4}, resource A is {resource #1, resource #2, resource #3, resource #4}, and resource B is {resource #3, resource #5}, the terminal may assume that symbol sequence A {symbol #1, symbol #2, symbol #3, symbol #4} is mapped to resource A {resource #1, resource #2, resource #3, resource #4}, respectively, but {symbol #3} mapped to {resource #3} corresponding to resource C is not transmitted, and may perform reception under the assumption that a symbol sequence {symbol #1, symbol #2, symbol #4} corresponding to a remaining resource (resource #1, resource #2, resource #4) obtained by excluding {resource #3} corresponding to resource C from resource A has been mapped and transmitted. Consequently, the terminal may assume that the symbol sequence {symbol #1, symbol #2, symbol #4} has been transmitted after being mapped to {resource #1, resource #2, resource #4}, respectively, and may perform a series of reception operations thereafter.

Hereinafter, a method of configuring a rate matching resource will be described for rate matching of a 5G communication system. Rate matching means that the size of a signal is adjusted in consideration of the amount of resources available for transmission of the signal. For example, rate matching of a data channel may imply that a data channel is not transmitted after being mapped to a particular time and frequency resource area and the size of data is adjusted accordingly.

Figure 11:
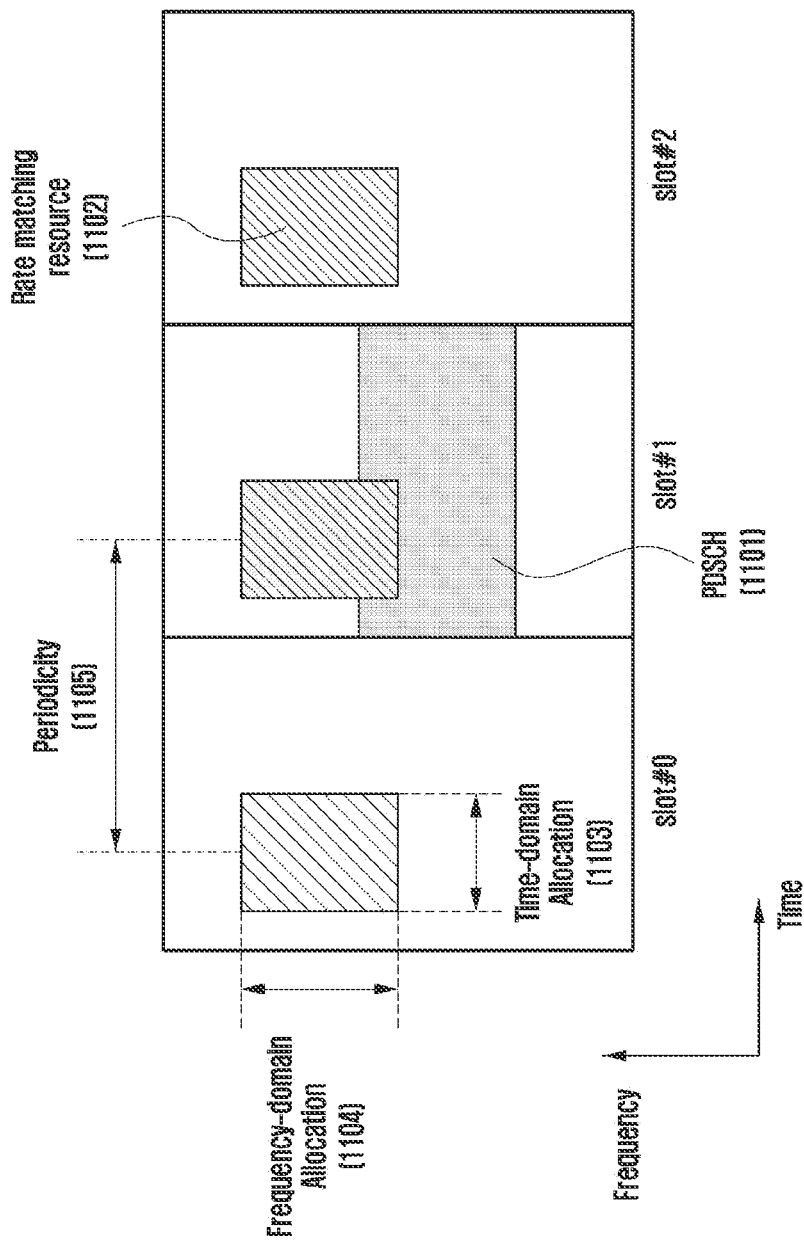
FIG. 11 illustrates a diagram of a method of transmitting or receiving data in consideration of a downlink data channel and a rate matching resource by a base station and a terminal in a wireless communication system according to an embodiment of the disclosure.

FIG. 11 illustrates a diagram of a method of transmitting or receiving data in consideration of a downlink data channel and a rate matching resource by a base station and a terminal.

FIG. 11 illustrates a downlink data channel (PDSCH) 1101 and a rate matching resource 1102. A base station may configure, for a terminal, one or multiple rate matching resources 1102 through higher layer signaling (e.g., RRC signaling). Configuration information on the rate matching resource 1102 may include time-domain resource allocation information 1103, frequency-domain resource allocation information 1104, and period information 1105. In the following description, a bitmap corresponding to the frequency-domain resource allocation information 1104 is named a "first bitmap", a bitmap corresponding to the time-domain resource allocation information 1103 is named a "second bitmap", and a bitmap corresponding to the period information 1105 is named a "third bitmap". If the entirety or a part of a time and frequency resource of the scheduled data channel 1101 overlaps with a configured rate matching resource 1102, the base station may perform rate matching of the data channel 1101 in the part of the rate matching resource 1102 and transmit same, and the terminal may perform reception and decoding after assuming that the data channel 1101 has been rate-matched in the part of the rate matching resource 1102.

The base station may dynamically notify the terminal of whether to perform rate matching of a data channel in the configured rate matching resource part, through DCI by means of an additional configuration (this corresponds to a "rate matching indicator" in a DCI format described above). Specifically, the base station may select some of the configured rate matching resources and group the selected resources into a rate matching resource group, and may indicate whether a data channel is rate-matched for each rate matching resource group, to the terminal through DCI by using a bitmap scheme. For example, if four rate matching resources of RMR #1, RMR #2, RMR #3, and RMR #4 are configured, the base station may configure RMG #1={RMR #1, RMR #2} and RMG #2={RMR #3, RMR #4} as rate matching groups, and indicate whether rate matching is performed in RMG #1 and RMG #2, to the terminal through a bitmap by using two bits in a DCI field, respectively. For example, if rate matching is needed, "1" may be indicated, and if rate matching is required not to be performed, "0" may be indicated.

5G support granularity of a "RB symbol level" and a "RE level" as a method of configuring a rate matching resource for a terminal described above. More specifically, a configuration method below may be followed.

RB Symbol Level

A maximum of four RateMatchPatterns for each bandwidth part may be configured for a terminal through higher layer signaling, and one RateMatchPattern may include the following contents.

As a reserved resource in a bandwidth part, a resource in which a time and frequency resource area of the reserved resource is configured by a combination of a bitmap having an RB level in the frequency domain and a bitmap having a symbol level may be included. The reserved resource may be spanned over one or two slots. A time domain pattern (periodicityAndPattern) in which a time and frequency area configured by each pair of RB level and symbol level bitmaps is repeated may be additionally configured.

A time and frequency domain resource area configured by a control resource set in a bandwidth part, and a resource area corresponding a time domain pattern configured by configuring a search space in which the corresponding resource area is repeated may be included.

RE Level

The following contents may be configured for a terminal through higher layer signaling.

Configuration information (lte-CRS-ToMatchAround) on a RE corresponding to an LTE cell-specific reference signal or common reference signal (CRS) pattern may include the number (nrofCRS-Ports) of ports of an LTE CRS and the value (v-shift) of LTE-CRS-vshift(s), information (carrierFreqDL) on the position of a center subcarrier of an LTE carrier from a frequency point (e.g., reference point A) serving as a criterion, information (carrierBandwidthDL) on a bandwidth size of an LTE carrier, and subframe configuration information (mbsfn-SubframConfigList) corresponding to a multicast-broadcast single-frequency network (MBSFN). The terminal may determine the position of a CRS in an NR slot corresponding to an LTE subframe, based on the pieces of information described above.

Configuration information on a resource set corresponding to one or multiple zero power (ZP) CSI-RSs in a bandwidth part may be included.

[Related to LTE CRS Rate Matching]

Next, a process of rate-matching an LTE CRS described above will be described in detail. For coexistence between long term evolution (LTE) and new RAT (NR), NR provides a function of configuring a pattern of a cell-specific reference signal of LTE to an NR terminal. More specifically, the CRS pattern may be provided by RRC signaling including at least one parameter in a ServingCellConfig information element (IE) or a ServingCellConfigCommon IE. For example, the parameter may be lte-CRS-ToMatchAround, lte-CRS-PatternList1-r16, lte-CRS-PatternList2-r16, or crs-RateMatch-PerCORESETPoolIndex-r16.

Rel-15 NR provides a function of configuring one CRS pattern per serving cell through the lte-CRS-ToMatchAround parameter. Rel-16 NR expands the function so that configuration of multiple CRS patterns per serving cell is possible. More specifically, one CRS pattern per LTE carrier may be configured for a single-transmission and reception point (TRP) configuration terminal, and two CRS patterns per LTE carrier may be configured for a multi-TRP configuration terminal. For example, a maximum of three CRS patterns per serving cell may be configured for a single-TRP configuration terminal through the lte-CRS-PatternList1-r16 parameter. As another example, a CRS for each TRP may be configured for a multi-TRP configuration terminal. That is, a CRS pattern for TRP1 may be configured for the lte-CRS-PatternList1-r16 parameter, and a CRS pattern for TRP2 may be configured through the lte-CRS-PatternList2-r16 parameter. In a case where two TRPs is configured as described above, whether the CRS patterns of TRP1 and TRP2 are both applied to a particular physical downlink shared channel (PDSCH) or only the CRS pattern of one TRP is applied is determined through the crs-RateMatch-PerCORESETPoolIndex-r16 parameter. When the crs-RateMatch-PerCORESETPoolIndex-r16 is configured to be enabled, only the CRS pattern of one TRP is applied, and otherwise, the CRS patterns of the two TRPs are both applied.

Table 17 shows a ServingCellConfig IE including the CRS pattern, and Table 18 shows a RateMatchPatternLTE-CRS IE including at least one parameter for a CRS pattern.

TABLE 17

| | |
|---|---|
| ServingCellConfig ::= | SEQUENCE { |
| tdd-UL-DL-ConfigurationDedicated | TDD-UL-DL-ConfigDedicated |
| OPTIONAL, -- Cond TDD | |
| initialDownlinkBWP | BWP-DownlinkDedicated |
| OPTIONAL, -- Need M | |
| downlinkBWP-ToReleaseList | SEQUENCE (SIZE |
| (1..maxNrofBWPs)) OF BWP-Id | OPTIONAL, -- |
| Need N | |
| downlinkBWP-ToAddModList | SEQUENCE (SIZE |
| (1..maxNrofBWPs)) OF BWP-Downlink | OPTIONAL, -- |
| Need N | |
| firstActiveDownlinkBWP-Id | BWP-Id |
| OPTIONAL, -- Cond SyncAndCellAdd | |
| bwp-Inactivity Timer | ENUMERATED {ms2, ms3, ms4, |

TABLE 17-continued ms5, ms6, ms8, ms10, ms20, ms30,
ms40, ms50, ms60, ms80, ms100, ms200, ms300, ms500, ms750, ms1280, ms1920, ms2560, spare10, spare9, spare8, spare7, spare6, spare5, spare4, spare3, spare2, spare1 } OPTIONAL, --Need R
    defaultDownlinkBWP-Id    BWP-Id OPTIONAL, -- Need S
    uplinkConfig    UplinkConfig OPTIONAL, -- Need M
    supplementaryUplink    UplinkConfig OPTIONAL, -- Need M
    pdcch-ServingCellConfig    SetupRelease { PDCCH-ServingCellConfig } OPTIONAL, -- Need M
    pdsch-ServingCellConfig    SetupRelease { PDSCH-ServingCellConfig } OPTIONAL, -- Need M
    csi-MeasConfig    SetupRelease { CSI-MeasConfig } OPTIONAL, -- Need M
    sCellDeactivationTimer    ENUMERATED {ms20, ms40, ms80, ms160, ms200, ms240, ms320, ms400, ms480, ms520, ms640, ms720, ms840, ms1280, spare2,spare1} OPTIONAL, -- Cond ServingCell WithoutPUCCH
    crossCarrierSchedulingConfig    CrossCarrierSchedulingConfig OPTIONAL, -- Need M
    tag-Id    TAG-Id,
    dummy    ENUMERATED {enabled} OPTIONAL, -- Need R
    pathlossReferenceLinking    ENUMERATED {spCell, sCell} OPTIONAL, -- Cond SCellOnly
    servingCellMO    MeasObjectId OPTIONAL, -- Cond MeasObject
    ...,
    [[
    lte-CRS-ToMatchAround    SetupRelease { RateMatchPatternLTE-CRS } OPTIONAL, -- Need M
    rateMatchPatternToAddModList    SEQUENCE (SIZE (1..maxNrofRateMatchPatterns)) OF RateMatchPattern OPTIONAL, -- Need N
    rateMatchPatternToReleaseList    SEQUENCE (SIZE (1..maxNrofRateMatchPatterns)) OF RateMatchPatternId OPTIONAL, -- Need N
    downlinkChannelBW-PerSCS-List    SEQUENCE (SIZE (1..maxSCSs)) OF SCS-SpecificCarrier OPTIONAL -- Need S
    ]],
    [[
    supplementaryUplinkRelease    ENUMERATED {true} OPTIONAL, -- Need N
    tdd-UL-DL-ConfigurationDedicated-IAB-MT-r16    TDD-UL-DL-ConfigDedicated-IAB-MT-r16 OPTIONAL, -- Cond TDD_IAB
    dormantBWP-Config-r16    SetupRelease { DormantBWP-Config-r16 } OPTIONAL, -- Need M
    ca-SlotOffset-r16    CHOICE {
        refSCS15kHz    INTEGER (−2..2),
        refSCS30KHz    INTEGER (−5..5),
        refSCS60KHz    INTEGER (−10..10),
        refSCS120KHz    INTEGER (−20..20)
    }
OPTIONAL, -- Cond AsyncCA
    channelAccessConfig-r16    SetupRelease { ChannelAccessConfig-r16 } OPTIONAL, -- Need M
    intraCellGuardBandsDL-List-r16    SEQUENCE (SIZE (1..maxSCSs)) OF IntraCellGuardBandsPerSCS-r16 OPTIONAL, -- Need S
    intraCellGuardBandsUL-List-r16    SEQUENCE (SIZE (1..maxSCSs)) OF IntraCellGuardBandsPerSCS-r16 OPTIONAL, -- Need S
    csi-RS-ValidationWith-DCI-r16    ENUMERATED {enabled} OPTIONAL, -- Need R
    lte-CRS-PatternList1-r16    SetupRelease { LTE-CRS-PatternList-r16 } OPTIONAL, -- Need M
    lte-CRS-PatternList2-r16    SetupRelease { LTE-CRS-PatternList-r16 } OPTIONAL, -- Need M
    crs-RateMatch-PerCORESETPoolIndex-r16    ENUMERATED {enabled} OPTIONAL, -- Need R
    enableTwoDefaultTCI-States-r16    ENUMERATED {enabled} OPTIONAL, -- Need R
    enableDefaultTCI-StatePerCoresetPoolIndex-r16    ENUMERATED {enabled}

TABLE 17-continued

| | |
|---|---|
| OPTIONAL, -- Need R | |
| enableBeam Switch Timing-r16 | ENUMERATED {true} |
| OPTIONAL, -- Need R | |
| cbg-TxDiffTBsProcessingType1-r16 | ENUMERATED {enabled} |
| OPTIONAL, -- Need R | |
| cbg-TxDiffTBsProcessingType2-r16 | ENUMERATED {enabled} |
| OPTIONAL -- Need R | |
| ]] | |
| } | |

TABLE 18

-RateMatchPatternLTE-CRS
  The IE RateMatchPatternLTE-CRS is used to configure a pattern to rate match around
LTE CRS. See TS 38.214 [19], clause 5.1.4.2.
  RateMatchPatternLTE-CRS information element
  -- ASN1START
  - TAG-RATEMATCHPATTERNLTE-CRS-START
    RateMatchPatternLTE-CRS ::=           SEQUENCE {
      carrierFreqDL                       INTEGER (0..16383),
      carrierBandwidthDL                  ENUMERATED {n6, n15, n25, n50,
n75, n100, spare2, spare1},
      mbsfn-SubframeConfigList            EUTRA-MBSFN-
SubframeConfigList                        OPTIONAL, --
Need M
      nrofCRS-Ports                       ENUMERATED {n1, n2, n4},
      v-Shift                             ENUMERATED {n0, n1, n2, n3, n4,
n5}
    }
    LTE-CRS-PatternList-r16 ::=           SEQUENCE (SIZE (1..maxLTE-CRS-
Patterns-r16)) OF RateMatchPatternLTE-CRS
  -- TAG-RATEMATCHPATTERNLTE-CRS-STOP
  -- ASN1STOP
    RateMatch PatternLTE-CRS field descriptions
    carrierBandwidthDL
    BW of the LTE carrier in number of PRBs (see TS 38.214 [19], clause 5.1.4.2).
    carrierFreqDL
    Center of the LTE carrier (see TS 38.214 [19], clause 5.1.4.2).
    mbsfn-SubframeConfigList
    LTE MBSFN subframe configuration (see TS 38.214 [19], clause 5.1.4.2).
    nrofCRS-Ports
    Number of LTE CRS antenna port to rate-match around (see TS 38.214 [19], clause
5.1.4.2).
    v-Shift
    Shifting value v-shift in LTE to rate match around LTE CRS (see TS 38.214 [19],
clause 5.1.4.2).

PDSCH: Related to Frequency Resource Allocation]

Figure 13:
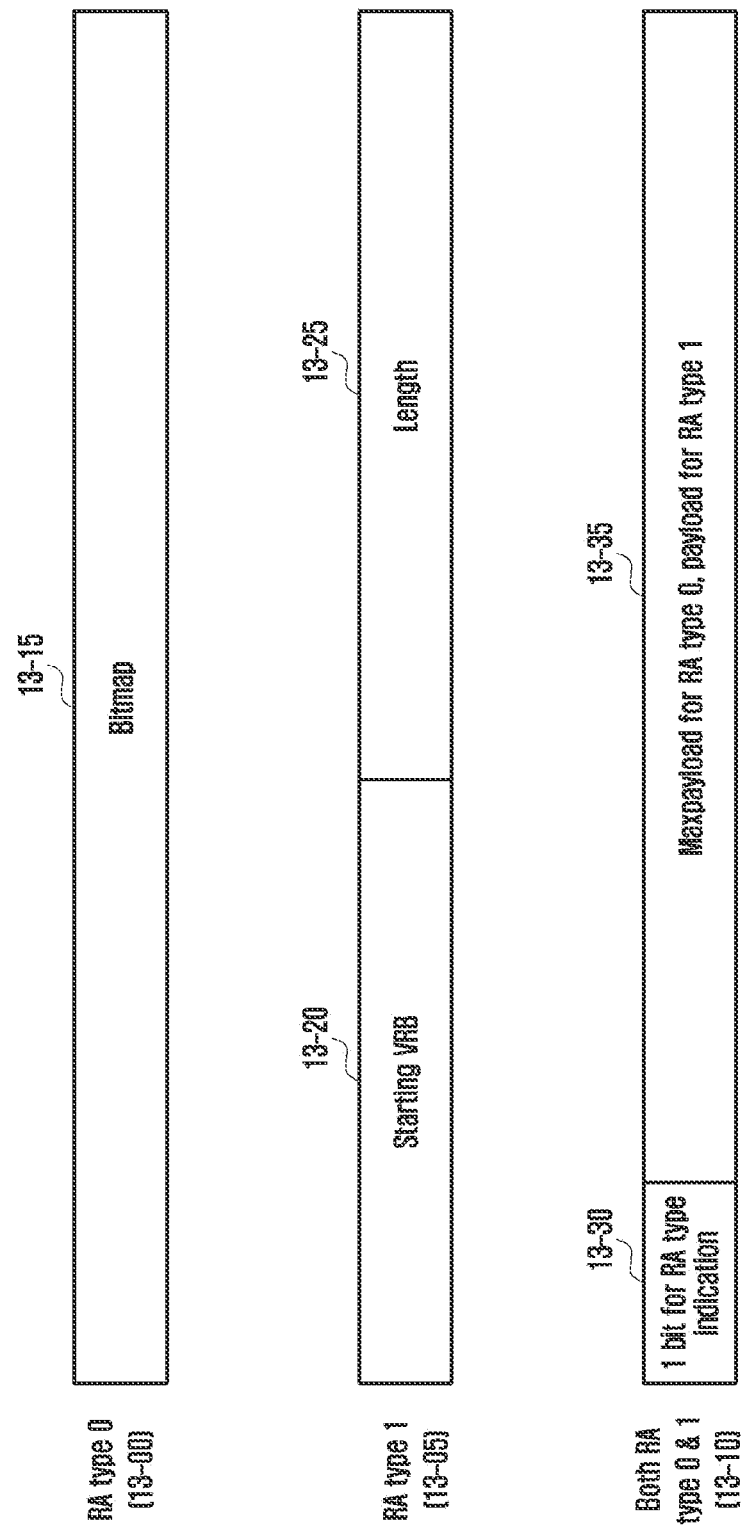
FIG. 13 illustrates an example of frequency axis resource allocation of a physical downlink shared channel (PDSCH) in a wireless communication system, according to an embodiment of the disclosure.

FIG. 13 illustrates an example of frequency axis resource allocation of a PDSCH in a wireless communication system, according to an embodiment of the disclosure.

FIG. 13 illustrates three frequency axis resource allocation methods of type 0 13-00, type 1 13-05, and dynamic switch 13-10 which can be configured through a higher layer in the wireless communication system (for example, a 5G system or NR system).

Referring to FIG. 13, when the UE is configured to use only resource type 0 through higher-layer signaling as indicated by reference numeral 13-00, some pieces of DCI for allocating the PDSCH to the corresponding UE includes a bitmap of NRBG bits. A condition therefor is described later. At this time, NRBG is the number of RBGs, determined as shown in Table 19, below, according to a BWP size allocated by a BWP indicator and a higher-layer parameter rbg-Size, and data is transmitted in an RBG indicated as 1 by the bitmap.

TABLE 19

| Bandwidth Part Size | Configuration 1 | Configuration 2 |
|---|---|---|
| 1-36 | 2 | 4 |
| 37-72 | 4 | 8 |
| 73-144 | 8 | 16 |
| 145-275 | 16 | 16 |

When the UE is configured to use only resource type 1 through higher-layer signaling as indicated by reference numeral 13-05, some pieces of DCI for allocating the PDSCH to the corresponding UE includes frequency axis resource allocation information of $\lceil \log_2(N_{RB}^{DL,BWP}(N_{RB}^{DL,BWP}+1)/2) \rceil$ bits. A condition therefor is described later again. The BS may configure a starting virtual RB (VRB) 13-20 and a length 13-25 of frequency axis resources allocated successively therefrom.

When the UE is configured to use both resource type 0 and resource type 1 through higher-layer signaling as indicated by reference numeral 13-10, some pieces of DCI for allocating the PDSCH to the corresponding UE includes frequency axis resource allocation information of bits of a larger value 13-35 among payload 13-15 for configuring resource type 0 and payload 13-20 and 13-25 for configuring resource type 1. A condition therefor is described later again. At this time, one bit may be added to the first part (e.g., a most significant bit (MSB)) of the frequency axis resource allocation information within the DCI, and the use of resource type 0 may be indicated when the corresponding bit is "0" and the use of resource type 1 may be indicated when the corresponding bit is "1".

[PDSCH/PUSCH: Related to Time Resource Allocation]

Hereinafter, a method of allocating time domain resources for a data channel in a wireless communication system (for example, a 5G or NR system) is described.

The BS may configure a table for time domain resource allocation information for a downlink data channel (e.g., a PDSCH) and an uplink data channel (e.g., a PUSCH) in the UE through higher-layer signaling (for example, RRC signaling). A table including a maximum of maxNrofDL-Allocations=16 entries may be configured for the PDSCH, and a table including a maximum of maxNrofUL-Allocations=16 entries may be configured for the PUSCH. The time domain resource allocation information may include PDCCH-to-PDSCH slot timing (corresponding to a time interval in units of slots between a time point at which a PDCCH is received and a time point at which a PDSCH scheduled by the received PDCCH is transmitted, and indicated by K0 in Table 20) or PDCCH-to-PUSCH slot timing (corresponding to a time interval in units of slots between a time point at which a PDCCH is received and a time point at which a PUSCH scheduled by the received PDCCH is transmitted, and indicated by K2 in Table 21), a location and a length of a start symbol in which a PDSCH or a PUSCH is scheduled within the slot, and a mapping type of a PDSCH or a PUSCH. For example, information shown in Table 20 or Table 21, below, may be transmitted from the BS to the UE.

The BS may inform the UE of one of the entries in the table for the time domain resource allocation information through L1 signaling (for example, DCI indicating a time domain resource allocation field). The UE may acquire time domain resource allocation information for a PDSCH or a PUSCH on the basis of the DCI received from the BS.

Figure 14:
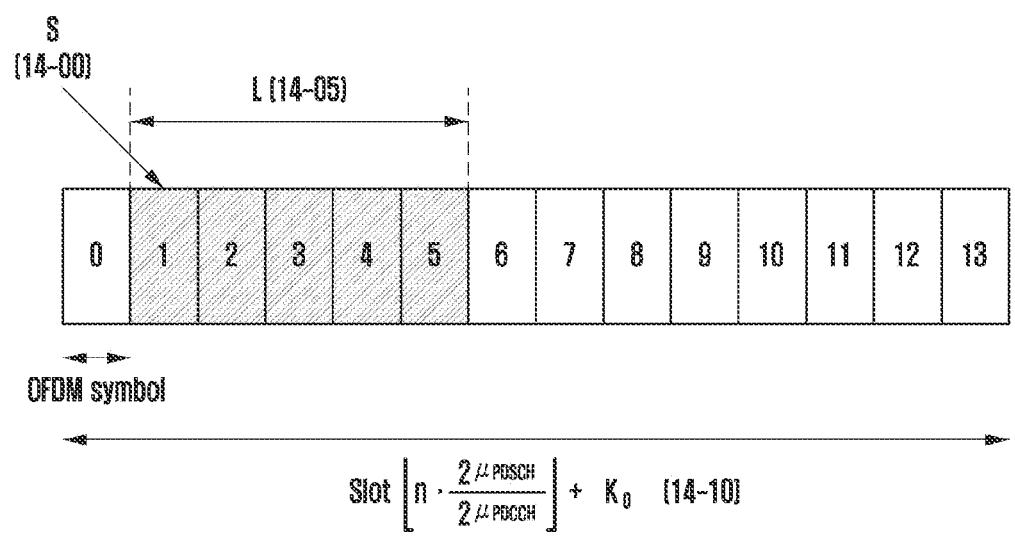
FIG. 14 illustrates an example of allocation of time axis resources of a PDSCH in a wireless communication system, according to an embodiment of the disclosure.

FIG. 14 illustrates an example of allocation of time axis resources of a PDSCH in a wireless communication system, according to an embodiment of the disclosure.

Referring to FIG. 14, the BS may indicate a time axis location of PDSCH resources according to SCS (μPDSCH, μPDCCH) of a data channel and a control channel configured using a higher layer, a scheduling offset (K0) value, and an OFDM symbol start location 14-00 and length 14-05 within one slot dynamically indicated through the DCI.

Figure 15:
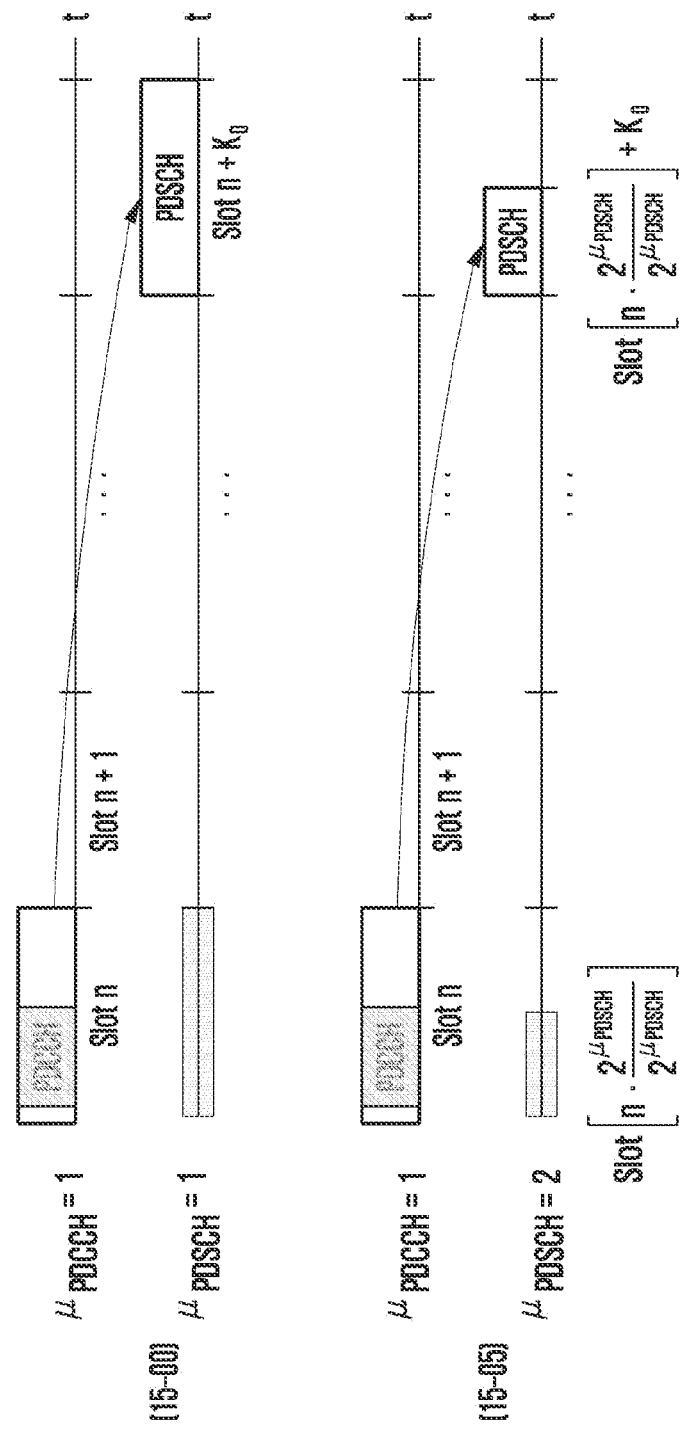
FIG. 15 illustrates an example of allocation of time-axis resources according to subcarrier spacing of a data channel and a control channel in a wireless communication system, according to an embodiment of the disclosure.

FIG. 15 illustrates an example of allocation of time-axis resources according to subcarrier spacing of a data channel and a control channel in a wireless communication system, according to an embodiment of the disclosure.

Referring to FIG. 15, when subcarrier spacings of a data channel and a control channel are the same as each other (PDSCH=μPDCCH) as indicated by reference numeral 15-00, slot numbers for the data and the control are the same as each other, and thus the BS and the UE may generate a scheduling offset according to a predetermined slot offset K0. On the other hand, when subcarrier spacings of a data channel and a control channel are different from each other (PDSCH #pPDCCH) as indicated by reference numeral 15-05, slot numbers for the data and the control are different from each other, and thus the BS and the UE may generate a scheduling offset according to a predetermined slot offset K0 on the basis of subcarrier spacing of the PDCCH.

[PDSCH: TCI State Activation MAC-CE]

Next, a beam configuration method for a PDSCH is described. FIG. 16 illustrates a process for beam configuration and activation of a PDSCH. A list of TCI states for a

TABLE 20

PDSCH-TimeDomain Resource AllocationList information element

PDSCH-TimeDomainResourceAllocationList ::= SEQUENCE (SIZE(1.. maxNrofDL-
Allocations)) OF PDSCH-TimeDomainResourceAllocation
PDSCH-TimeDomainResourceAllocation ::= SEQUENCE {
   k0 INTEGER (0..32)
   OPTIONAL, --Need S
   (PDCCH-to-PDSCH timing, slot units)
   mapping type ENUMERATED {typeA, typeB},
   (PDSCH mapping type)
   startSymbol AndLength INTEGER (0..127)
   (Start symbol and length of PDSCH)
}

TABLE 21

PUSCH-TimeDomain ResourceAllocationList information element

PUSCH-TimeDomainResourceAllocationList ::= SEQUENCE (SIZE(1.. maxNrofUL-
Allocations)) OF PUSCH-TimeDomainResourceAllocation
PUSCH-TimeDomainResourceAllocation ::= SEQUENCE {
   k2 INTEGER (0..32)
   OPTIONAL, --Need S
   (PDCCH-to-PUSCH timing, slot units)
   mapping type ENUMERATED {typeA, typeB},
   (PUSCH mapping type)
   startSymbolAndLength INTEGER (0..127)
   (Start symbol and length of PUSCH)
}

PDSCH may be indicated through a higher layer list such as RRC (as indicated by reference numeral 16-00). The list of TCI states may be indicated by, for example, tci-States-ToAddModList and/or tci-StatesToReleaseList in a BWP-specific PDSCH-Config IE. Next, a part of the list of TCI states may be activated through an MAC CE (as indicated by reference numeral 16-20). A maximum number of activated TCI states may be determined according to capability reported by a terminal. Reference numeral 16-50 indicates an example of a MAC-CE structure for PDSCH TCI state activation/deactivation.

The meaning of each field in the MAC CE and a value available in each field may be shown as in Table 22.

Configured grant Type 1 PUSCH transmission may be semi-statically configured through reception of configuredGrantConfig including rrc-ConfiguredUplinkGrant shown in Table 23 through higher signaling without reception of a UL grant in the DCI. Configured grant Type 2 PUSCH transmission may be semi-persistently scheduled by an UL grant in the DCI after reception of configuredGrantConfig not including rrc-ConfiguredUplinkGrant shown in Table 23 through higher signaling. In a case where a PUSCH transmission is operated by a configured grant, parameters applied to the PUSCH transmission may be applied through configuredGrantConfig, which is higher signaling in Table

TABLE 22

Serving cell identifier (serving cell ID): This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;

Bandwidth part identifier (BWP ID): This field indicates a DL BWP for which the MAC CE applies as the codepoint of the DCI bandwidth part indicator field as specified in TS 38.212 [9]. The length of the BWP ID field is 2 bits. This field is ignored if this MAC CE applies to a set of Serving Cells;

TCI state identifier ($T_i$): If there is a TCI state with TCI-StateId i as specified in TS 38.331 [5], this field indicates the activation/deactivation status of the TCI state with TCI-StateId i, otherwise MAC entity shall ignore the Ti field. The Ti field is set to 1 to indicate that the TCI state with TCI-StateId i shall be activated and mapped to the codepoint of the DCI Transmission Configuration Indication field, as specified in TS 38.214 [7]. The Ti field is set to 0 to indicate that the TCI state with TCI-StateId i shall be deactivated and is not mapped to the codepoint of the DCI Transmission Configuration Indication field. The codepoint to which the TCI State is mapped is determined by its ordinal position among all the TCI States with Ti field set to 1, i.e. the first TCI State with $T_i$ field set to 1 shall be mapped to the codepoint value 0, second TCI State with Ti field set to 1 shall be mapped to the codepoint value 1 and so on. The maximum number of activated TCI states is 8;

CORESET pool ID identifier (CORESET pool ID): This field indicates that mapping between the activated TCI states and the codepoint of the DCI Transmission Configuration Indication set by field Ti is specific to the ControlResourceSetId configured with CORESET Pool ID as specified in TS 38.331 [5]. This field set to 1 indicates that this MAC CE shall be applied for the DL transmission scheduled by CORESET with the CORESET pool ID equal to 1, otherwise, this MAC CE shall be applied for the DL transmission scheduled by CORESET pool ID equal to 0. If the coresetPoolIndex is not configured for any CORESET, MAC entity shall ignore the CORESET Pool ID field in this MAC CE when receiving the MAC CE. If the Serving Cell in the MAC CE is configured in a cell list that contains more than one Serving Cell, the CORESET Pool ID field shall be ignored when receiving the MAC CE.

[PUSCH: Related to Transmission Scheme]

Next, a scheme of scheduling PUSCH transmission will be described.

PUSCH transmission may be dynamically scheduled by a UL grant in the DCI, or may be operated by configured grant Type 1 or Type 2. Dynamic scheduling indication for PUSCH transmission may be performed by DCI format 0_0 or 0_1.

23, except for dataScramblingIdentityPUSCH, txConfig, codebookSubset, maxRank, and scaling of UCI-OnPUSCH provided by pusch-Config shown in Table 24, which is higher signaling. When transformPrecoder in configuredGrantConfig, which is higher signaling in Table 23, is provided to the terminal, the terminal applies tp-pi2BPSK in pusch-Config of Table 24 for PUSCH transmission operated by a configured rant.

TABLE 23

```
ConfiguredGrantConfig ::=            SEQUENCE {
   frequency Hopping                    ENUMERATED {intraSlot,
interSlot}                              OPTIONAL, -- Need
S,
   cg-DMRS-Configuration             DMRS-UplinkConfig,
   mcs-Table                            ENUMERATED {qam256,
qam64LowSE}                             OPTIONAL, -
- Need S
   mcs-Table TransformPrecoder         ENUMERATED {qam256,
qam64LowSE}                             OPTIONAL, -
- Need S
   uci-OnPUSCH                         SetupRelease { CG-UCI-
OnPUSCH }                               OPTIONAL, --
Need M
   resourceAllocation                                 ENUMERATED
{ resourceAllocationType0, resource AllocationType1, dynamicSwitch },
   rbg-Size                             ENUMERATED {config2}
OPTIONAL, -- Need S
   powerControlLoopToUse             ENUMERATED {n0, n1},
   p0-PUSCH-Alpha                    P0-PUSCH-AlphaSetId,
   transformPrecoder                 ENUMERATED {enabled, disabled}
OPTIONAL, -- Need S
   nrofHARQ-Processes                INTEGER(1.. 16),
   repK                                 ENUMERATED {n1, n2, n4, n8},
   repK-RV                              ENUMERATED {s1-0231, s2-
0303, s3-0000}                          OPTIONAL, -- Need R
   periodicity                       ENUMERATED {
                                           sym2, sym7, sym1x14,
sym2x14, sym4x14, sym5x14, sym8x14, sym10x14, sym16x14, sym20x14,
                                           sym32x14, sym40x14,
sym64x14, sym80x14, sym128x14, sym160x14, sym256x14, sym320x14,
sym512x14,
                                           sym640x14,
sym 1024x14, sym 1280x14, sym2560x14, sym5120x14,
                                           sym6, sym1x12,
sym2x12, sym4x12, sym5x12, sym8x12, sym10x12, sym16x12, sym20x12,
sym32x12,
                                           sym40x12, sym64x12,
sym80x12, sym128x12, sym160x12, sym256x12, sym320x12, sym512x12,
sym640x12,
                                           sym 1280x12,
sym2560x12
   },
   configured GrantTimer                              INTEGER (1..64)
OPTIONAL, -- Need R
   rrc-ConfiguredUplinkGrant         SEQUENCE {
      timeDomainOffset                     INTEGER (0..5119),
      timeDomainAllocation                 INTEGER (0..15),
      frequency DomainAllocation        BIT STRING (SIZE(18)),
      antennaPort                          INTEGER (0..31),
      dmrs-SeqInitialization               INTEGER (0..1)
OPTIONAL, -- Need R
      precodingAndNumberOfLayers           INTEGER (0..63),
      srs-ResourceIndicator                INTEGER (0..15)
OPTIONAL, -- Need R
      mcsAndTBS                            INTEGER (0..31),
      frequency HoppingOffset                     INTEGER (1..
maxNrofPhysicalResourceBlocks-1)        OPTIONAL, -- Need
R
      pathlossReferenceIndex                             INTEGER
(0..maxNrofPUSCH-PathlossReferenceRSs-1),
      ...
   }
OPTIONAL, -- Need R
   ...
}
```

Next, a PUSCH transmission method is described. A DMRS antenna port for PUSCH transmission is the same as an antenna port for SRS transmission. PUSCH transmission may follow each of a codebook-based transmission method and a non-codebook-based transmission method according to whether the value of txConfig in pusch-Config of Table 24, which is higher signaling, is a "codebook" ora "non-Codebook".

As described above, PUSCH transmission may be dynamically scheduled through DCI format 0_0 or 0_1, and may be semi-statically configured by a configured grant. If scheduling for PUSCH transmission is indicated to the terminal through DCI format 0_0, the terminal may perform beam configuration for the PUSCH transmission by using pucch-spatialRelationnfoID corresponding to a terminal-specific PUCCH resource corresponding tothelowest ID in an uplink BWP activated in a serving cell. The PUSCH transmission is based on a single antenna port. The terminal does not expect scheduling for PUCCH transmission through DCI format 0_0, within a BWP in which a PUCCH resource including pucch-spatialRelationDnfo is not configured. If txConfig in pusch-Config of Table 24 is not configured for the terminal, the terminal may not expect to be scheduled through DCI format 0_1.

TABLE 24

```
PUSCH-Config ::=                        SEQUENCE {
    dataScramblingIdentityPUSCH                     INTEGER (0..1023)
OPTIONAL, -- Need S
    txConfig                                ENUMERATED {codebook,
nonCodebook}                            OPTIONAL, -- Need S
    dmrs-UplinkForPUSCH-MappingTypeA            SetupRelease { DMRS-
UplinkConfig }                          OPTIONAL, -- Need M
    dmrs-UplinkForPUSCH-MappingTypeB            SetupRelease { DMRS-
UplinkConfig }                          OPTIONAL, -- Need M
    pusch-PowerControl                              PUSCH-PowerControl
OPTIONAL, -- Need M
    frequency Hopping                       ENUMERATED {intraSlot,
interSlot}                              OPTIONAL, -- Need S
    frequency HoppingOffsetLists            SEQUENCE (SIZE (1..4)) OF
INTEGER (1.. maxNrofPhysicalResourceBlocks-1)
OPTIONAL, -- Need M
    resource Allocation                                     ENUMERATED
{ resourceAllocation Type0, resourceAllocation Type1, dynamicSwitch},
    pusch-TimeDomainAllocationList              SetupRelease { PUSCH-
TimeDomainResourceAllocationList }      OPTIONAL, -- Need M
    pusch-AggregationFactor                 ENUMERATED { n2, n4, n8 }
OPTIONAL, -- Need S
    mcs-Table                               ENUMERATED {qam256,
qam64LowSE}                                     OPTIONAL, -- Need
S
    mcs-TableTransformPrecoder              ENUMERATED {qam256,
qam64LowSE}                                     OPTIONAL, -- Need
S
    transformPrecoder                       ENUMERATED {enabled,
disabled}                               OPTIONAL, -- Need S
    codebookSubset                                          ENUMERATED
{fullyAndPartial AndNonCoherent, partial AndNonCoherent, nonCoherent}
OPTIONAL, -- Cond codebookBased
    maxRank                                         INTEGER (1..4)
OPTIONAL, -- Cond codebookBased
    rbg-Size                                ENUMERATED { config2}
OPTIONAL, -- Need S
    uci-OnPUSCH                                     SetupRelease { UCI-
OnPUSCH}                                OPTIONAL, -- Need M
    tp-pi2BPSK                              ENUMERATED {enabled}
OPTIONAL, -- Need S
    ...
}
```

Next, codebook-based PUSCH transmission is described.

Codebook-based PUSCH transmission may be dynamically scheduled through DCI format 0_0 or 0_1, and may be semi-statically operated by a configured grant. If a codebook-based PUSCH is dynamically scheduled by DCI format 0_1 or is semi-statically operated by a configured grant, the terminal determines a precoder for PUSCH transmission, based on an SRS resource indicator (SRI), a transmission precoding matrix indicator (TPMI), and a transmission rank (the number of PUSCH transmission layers).

The SRI may be given through an SRS resource indicator, which is a field in the DCI, or may be configured through srs-ResourceIndicator which is higher signaling. At least one SRS resource may be configured for the terminal at the time of codebook-based PUSCH transmission, and a maximum of two SRS resources may be configured. In a case where an SRI is provided to the terminal through the DCI, an SRS resource indicated by the SRI indicates an SRS resource corresponding to the SRI among SRS resources transmitted before a PDCCH including the SRI. In addition, a TPMI and a transmission rank may be given through precoding information and number of layers, which is a field in the DCI, or may be configured by precodingAndNumberOfLayers which is higher signaling. The TPMI is used to indicate a precoder applied to PUSCH transmission. If one SRS resource is configured for the terminal, the TPMI is used to indicate a precoder to be applied in the configured one SRS resource. If multiple SRS resources are configured for the terminal, the TPMI is used to indicate a precoder to be applied in an SRS resource indicated by the SRI.

A precoder to be used for PUSCH transmission is selected in an uplink codebook having a number of antenna ports corresponding to the value of nrofSRS-Ports in SRS-Config which is higher signaling. In codebook-based PUSCH transmission, the terminal determines a codebook subset, based on a TPMI and codebookSubset in pusch-Config which is higher signaling. The codebookSubset in pusch-Config which is higher signaling may be configured to be one of "fullyAndPartialAndNonCoherent", "partialAndNonCoherent", or "nonCoherent", based on UE capability reported to the base station by the terminal. If the terminal reports "partialAndNonCoherent" as UE capability, the terminal does not expect that the value of codebookSubset which is higher signaling is configured to be "fullyAndPartialAndNonCoherent". In addition, if the terminal reports "nonCoherent" as UE capability, the terminal does not expect that the value of codebookSubset which is higher signaling is configured to be "fullyAndPartialAndNonCoherent" or "partialAndNonCoherent". In a case where nrofSRS-Ports in the SRS-ResourceSet which is higher signaling indicates two SRS antenna ports, the terminal does not expect that the value of codebookSubset which is higher signaling is configured to be "partialAndNonCoherent".

One SRS resource set configured by "codebook" as the value of usage in the SRS-ResourceSet which is higher signaling may be configured for the terminal, and one SRS resource in the SRS resource set may be indicated through an SRI. If several resources are configured in an SRS resource set configured by "codebook" as the value of usage in the SRS-ResourceSet which is higher signaling, the terminal expects that the value of nrofSRS-Ports in the SRS-Resource which is higher signaling is configured to be identical for all the SRS resources.

The terminal may transmit, to the base station, one or multiple SRS resources included in an SRS resource set configured by "codebook" as the value of usage according to higher signaling, and the base station may select one from among the SRS resources transmitted by the terminal, and indicates the terminal to perform PUSCH transmission by using transmission beam information on the selected SRS resource. In codebook-based PUSCH transmission, an SRI is used as information for selecting the index of one SRS resource, and is included in the DCI. Additionally, the base station may include, in the DCI, information indicating a TPMI and a rank to be used by the terminal for PUSCH transmission. The terminal may use an SRS resource indicated by the SRI, to apply a precoder indicated by a TPMI and a rank indicated based on a transmission beam of the SRS resource, so as to perform PUSCH transmission.

Next, non-codebook-based PUSCH transmission is described.

Non-codebook-based PUSCH transmission may be dynamically scheduled through DCI format 0_0 or 0_1, and may be semi-statically operated by a configured grant. In a case where at least one SRS resource is configured in an SRS resource set configured by "nonCodebook" as the value of usage in the SRS-ResourceSet which is higher signaling, non-codebook-based PUSCH transmission may be scheduled for the terminal through DCI format 0_1.

With respect to an SRS resource set configured by "non-Codebook" as the value of usage in the SRS-ResourceSet which is higher signaling, one connected non-zero power (NZP) CSI-RS resource may be configured for the terminal. The terminal may perform a calculation for a precoder for SRS transmission through a measurement of the NZP CSI-RS resource connected to the SRS resource set. In a case where a difference between the first symbol of aperiodic SRS transmission by the terminal, and the last reception symbol of an aperiodic NZP CSI_RS resource connected to an SRS resource set is smaller than 42 symbols, the terminal does not expect that information on a precoder for SRS transmission is updated.

If the value of resourceType in the SRS-ResourceSet which is higher signaling is configured to be "aperiodic", a connected NZP CSI-RS is indicated by SRS request which is a field in DCI format 0_1 or 1_1. In a case where the connected NZP CSI-RS resource is an aperiodic NZP CSI-RS resource, this implies that there is a connected NZP CSI-RS for a case where the value of the SRS request which is a field in DCI format 0_1 or 1_1 is not "00". Corresponding DCI is required not to indicate scheduling of a cross carrier or a cross BWP. In addition, if the value of the SRS request indicates existence of an NZP CSI-RS, the NZP CSI-RS may be positioned in a slot in which a PDCCH including an SRS request field is transmitted. TCI states configured for a scheduled subcarrier may not be configured to be QCL-TypeD.

If a periodic or semi-persistent SRS resource set is configured, a connected NZP CSI-RS may be indicated through associated CSI-RS in the SRS-ResourceSet which is higher signaling. With respect to non-codebook-based transmission, the terminal does not expect that spatialRelationInfo which is higher signaling for an SRS resource and associated CSI-RS in the SRS-ResourceSet which is higher signaling are configured together.

In a case where multiple SRS resources are configured for the terminal, the terminal may determine a precoder and a transmission rank to be applied to PUSCH transmission, based on an SRI indicated by the base station. The SRI may be indicated through an SRS resource indicator, which is a field in the DCI, or may be configured through srs-ResourceIndicator which is higher signaling. Similarly to codebook-based PUSCH transmission described above, in a case where an SRI is provided to the terminal through the DCI, an SRS resource indicated by the SRI indicates an SRS resource corresponding to the SRI among SRS resources transmitted before a PDCCH including the SRI. The terminal may use one or multiple SRS resources for SRS transmission, and a maximum number of SRS resources and a maximum number of SRS resources which are simultaneously transmittable in the same symbol in one SRS resource set is determined based on UE capability reported by the terminal to the base station. The SRS resources simultaneously transmitted by the terminal occupy the same RB. The terminal configures one SRS port for each SRS resource. The number of SRS resource sets configured by "nonCodebook" as the value of usage in the SRS-ResourceSet which is higher signaling may be configured to be only one, and the number of SRS resources for non-codebook-based PUSCH transmission may be configured to up to four.

The base station may transmit one NZP CSI-RS connected to an SRS resource set to the terminal, and the terminal calculates a precoder to be used to transmit one or multiple SRS resources in the SRS resource set, based on a result of measurement performed at the time of reception of the NZP CSI-RS. The terminal applies the calculated precoder when transmitting, to the base station, one or multiple SRS resources in an SRS resource set configured by "non-Codebook" as usage, and the base station selects one or multiple SRS resources among the received one or multiple SRS resources. In non-codebook-based PUSCH transmission, an SRI indicates an index which is able to represent a combination of one or multiple SRS resources, and the SRI is included in the DCI. The number of SRS resources indicated by an SRI transmitted by the base station may be the number of transmission layers of a PUSCH, and the terminal applies a precoder applied to SRS resource transmission to each of the layers so as to transmit a PUSCH.

[Related to Terminal Capability Reporting]

In a wireless communication system (for example, an LTE system, 5G system, or NR system), the UE may perform a procedure for reporting a capability supported by the UE to the corresponding BS in the state in which the UE is connected to a serving BS. In the following description, this is referred to as a UE capability report.

The BS may transmit a UE capability enquiry message that makes a request for a capability report to the UE in the connected state. The message may include a UE capability request for each radio access technology (RAT) type of the BS. The request for each RAT type may include supported frequency band combination information. In the case of the UE capability enquiry message, a plurality of UE capabilities for respective RAT types may be requested through one RRC message container transmitted by the BS or the BS may insert the UE capability enquiry message including the UE capability request for each RAT type multiple times and transmit the same to the UE. That is, the UE capability enquiry is repeated multiple times within one message and the UE may configure a UE capability information message corresponding thereto and report the same multiple times. In the next-generation mobile communication system, a UE capability request for NR, LTE, E-UTRA-NR dual connectivity (EN-DC), and multi-RAT dual connectivity (MR-DC) may be made. The UE capability enquiry message is generally transmitted initially after the UE is connected to the BS, but may be requested at any time when the BS needs the same.

The UE receiving the request for the UE capability report from the BS in the above step may configure a UE capability according to RAT type and band information requested by the BS. A method by which the UE configures the UE capability in a wireless communication system (for example, a 5G or NR system) is described below.

1. When the UE receives a list of LTE and/or NR bands from the BS through a UE capability request, the UE configures a band combination (BC) for EN-DC and NR stand alone (SA). That is, the UE configures a candidate list of BCs for EN-DC and NR SA on the basis of requested bands in FreqBandList. The bands sequentially have priorities as stated in FreqBandList.

2. When the BS sets a "eutra-nr-only" flag or an "eutra" flag and makes a request for the UE capability report, the UE completely removes NR SA BCs from the configured candidate list of BCs. Such an operation may occur only when the LTE BS (eNB) makes a request for an "eutra" capability.

3. Thereafter, the UE removes fallback BCs from the candidate list of BCs configured in the above stage. The fallback BC is a BC which can be obtained by removing a band corresponding to at least one SCell from a predetermined BC, and a BC before the removal of the band corresponding to at least one SCell can cover the fallback BC and thus the fallback BC can be omitted. This stage is applied to MR-DC, that is, LTE bands. BCs left after the stage are a final "candidate BC list".

4. The UE selects BCs suitable for a requested RAT type in the final "candidate BC list" and selects BCs to be reported. In this stage, the UE configures supportedBandCombinationList according to a determined order. That is, the UE configures BCs and UE capability to be reported according to an order of a preset rat-Type (nr→eutra-nr→eutra). Further, the UE configures featureSetCombination for the configured supportedBandCombinationList and configures a list of "candidate feature set combination" in a candidate BC list from which a list for fallback BCs (including capability at the same or lower stage) is received. The "candidate feature set combination" may include all feature set combinations for NR and EUTRA-NR BCs, and may be acquired from a feature set combination of UE-NR-Capabilities and UE-MRDC-Capabilities containers.

5. When the requested rat Type is eutra-nr and influences, featureSetCombinations are included in all of the two containers of UE-MRDC-Capabilities and UE-NR-Capabilities. However, the NR feature set includes only UE-NR-Capabilities.

After configuring the UE capability, the UE may transfer a UE capability information message including the UE capability to the BS. The BS may perform scheduling for the corresponding UE and transmission/reception management on the basis of the UE capability received from the UE.

[Related to CA/DC]

Figure 17:
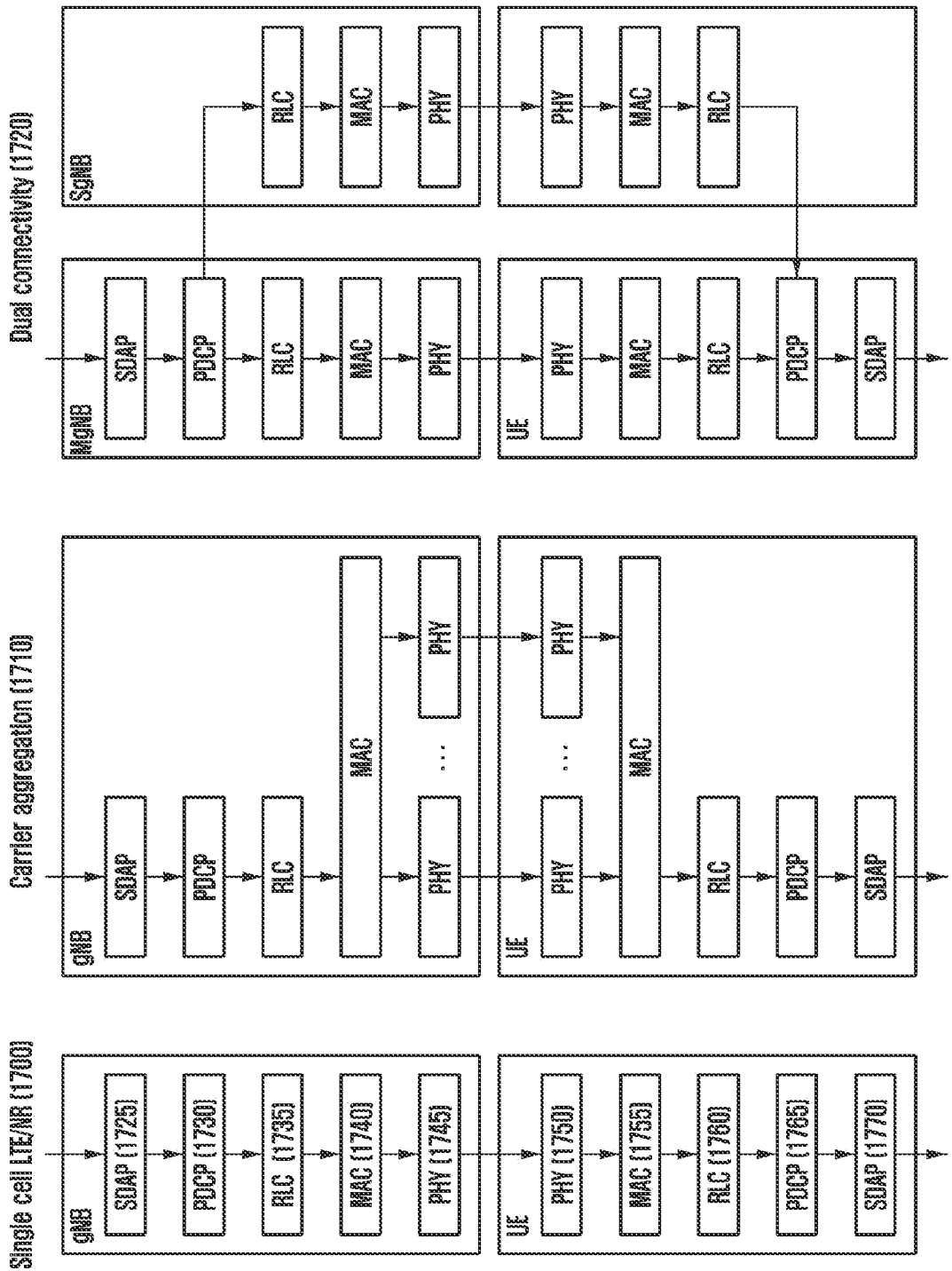
FIG. 17 illustrates a wireless protocol structure of the BS and the UE in a single cell environment, a carrier aggregation (CA) environment, and a dual connectivity (DC) environment in a wireless communication system, according to an embodiment of the disclosure.

FIG. 17 illustrates a wireless protocol structure of the BS and the UE in single cell, CA, and DC, according to an embodiment of the disclosure.

Referring to FIG. 17, a wireless protocol of a wireless communication system (for example, a 5G or NR system) includes an NR service data adaptation protocol (SDAP) 1725 or 1770, an NR packet data convergence protocol (PDCP) 1730 or 765, an NR radio link control (RLC) 1735 or 1760, and an NR medium access control (MAC) 1740 or 1755 in each of the UE and the NR gNB.

Main functions of the NR SDAP 1725 or 1770 may include some of the following functions:
- a user data transmission function (transfer of user-plane data);
- a function of mapping QoS flow and a data bearer for uplink and downlink (mapping between a QoS flow and a DRB for both DL and UL);
- a function of marking a QoS flow ID for uplink and downlink (marking QoS flow ID in both DL and UL packets); and
- a function of mapping reflective QoS flow to a data bearer for uplink SDAP PDUs (reflective QoS flow to DRB mapping for the UL SDAP PDUs).

With respect to the SDAP layer device, the UE may receive a configuration as to whether to use a header of the SDAP layer device or a function of the SDAP layer device for each PDCP layer device, each bearer, or each logical channel through an RRC message. If the SDAP header is configured, a 1-bit indicator of non-access stratum (NAS) reflective QoS of the SDAP header and a 1 bit-indicator of AS reflective QoS may indicate that the UE updates or reconfigures information on mapping of QoS flow and a data bearer in uplink and downlink. The SDAP header may include QoS flow ID information indicating the QoS. The QoS information may be used as data-processing-priority or scheduling information to support a seamless service.

Main functions of the NR PDCP 1730 or 1765 may include some of the following functions:
- a header compression and decompression function (header compression and decompression: robust header compression (ROHC) only);
- a user data transmission function (transfer of user data);
- a sequential delivery function (in-sequence delivery of upper-layer PDUs);
- a non-sequential delivery function (out-of-sequence delivery of upper-layer PDUs);
- a reordering function (PDCP PDU reordering for reception);
- a duplicate detection function (duplicate detection of lower-layer SDUs);
- a retransmission function (retransmission of PDCP SDUs);
- a ciphering and deciphering function (ciphering and deciphering); and
- a timer-based SDU removal function (timer-based SDU discard in uplink).

The reordering function of the NR PDCP layer device is a function of sequentially reordering PDCP PDUs received from a lower layer on the basis of a PDCP sequence number (SN), and may include a function of sequentially transferring the reordered data to a higher layer The reordering function of the NR PDCP layer device may include a function of directly transmitting data regardless of the sequence, a function of recording PDCP PDUs lost due to the reordering, a function of reporting statuses of the lost PDCP PDUs to a transmitting side, and a function of making a request for retransmitting the lost PDCP PDUs.

Main functions of the NR RLC 1735 or 1760 may include some of the following functions:
- a data transmission function (transfer of upper-layer PDUs);
- a sequential delivery function (in-sequence delivery of upper-layer PDUs);
- a non-sequential delivery function (out-of-sequence delivery of upper-layer PDUs);
- an automatic repeat request (ARQ) function (error correction through ARQ);
- a concatenation, segmentation, and reassembly function (concatenation, segmentation and reassembly of RLC SDUs);
- a re-segmentation function (re-segmentation of RLC data PDUs);
- a reordering function (reordering of RLC data PDUs);
- a duplicate detection function (duplicate detection);
- an error detection function (protocol error detection);
- an RLC SDU deletion function (RLC SDU discard); and
- an RLC reestablishment function (RLC reestablishment).

The sequential delivery function (in-sequence delivery) of the NR RLC layer device is a function of sequentially transmitting RLC SDUs received from a lower layer to the higher layer. When one original RLC SDU is divided into a plurality of RLC SDUs and then received, the sequential delivery function (in-sequence delivery) of the NR RLC layer device may include a function of reassembling and transmitting the RLC SDUs, a function of reordering the received RLC PDUs on the basis of an RLC SN or a PDCP SN, a function of recording RLC PDUs lost due to the reordering, a function of reporting statuses of the lost RLC PDUs to a transmitting side, and a function of making a request for retransmitting the lost RLC PDUs. When there are lost RLC SDUs, the sequential delivery function (in-sequence delivery) of the NR RLC layer device may include a function of sequentially transferring only RLC SDUs preceding the lost RLC SDUs to the higher layer or a function of, if a predetermined timer expires even though there are lost RLC SDUs, sequentially transferring all RLC SDUs received before the timer starts to the higher layer. Alternatively, the sequential delivery function (in-sequence delivery) of the NR RLC layer device may include a function of, if a predetermined timer expires even though there are lost RLC SDUs, sequentially transferring all RLC SDUs received up to now to the higher layer. Further, the NR RLC device may process the RLC PDUs sequentially in the order of reception thereof (according to an arrival order regardless of a serial number or a sequence number) and may transfer the RLC PDUs to the PDCP device regardless of the sequence thereof (out-of-sequence delivery). In the case of segments, the NR RLC device may receive segments that are stored in the buffer or are to be received in the future, reconfigure the segments to be one RLC PDU, process the RLC PDU, and then transmit the same to the PDCP device. The NR RLC layer device may not include a concatenation function, and the function may be performed by the NR MAC layer, or may be replaced with a multiplexing function of the NR MAC layer.

The non-sequential function (out-of-sequence delivery) of the NR RLC layer device is a function of transferring RLC SDUs received from a lower layer directly to a higher layer regardless of the sequence of the RLC SDUs, and may include, when one original RLC SDU is divided into a plurality of RLC SDUs and then received, a function of reassembling and transmitting the RLC PDUs and a function of storing RLC SNs or PDCP SNs of the received RLC PDUs, reordering the RLC PDUs, and recording lost RLC PDUs.

The NR MAC 1740 or 1755 may be connected to a plurality of NR RLC layer devices configured in one UE and main functions of the NR MAC may include some of the following functions:
- a mapping function (mapping between logical channels and transport channels);
- a multiplexing and demultiplexing function (multiplexing/demultiplexing of MAC SDUs);
- a scheduling information report function (scheduling information reporting);
- a HARQ function (error correction through HARQ);
- a logical channel priority control function (priority handling between logical channels of one UE);
- a UE priority control function (priority handling between UEs by means of dynamic scheduling);
- an MBMS service identification function (MBMS service identification);
- a transport format selection function (transport format selection): and
- a padding function (padding).

The NR PHY layer 1745 or 1750 performs an operation for channel-coding and modulating higher-layer data to generate an OFDM symbol and transmitting the OFDM symbol through a radio channel or demodulating and channel-decoding the OFDM symbol received through the radio channel and transmitting the demodulated and channel-decoded OFDM symbol to the higher layer.

A detailed structure of the wireless protocol may be variously changed according to a carrier (or cell) operation scheme. For example, when the BS transmits data to the UE on the basis of a single carrier (or cell), the BS and the UE use a protocol structure having a single structure for each layer as indicated by reference numeral 1700. On the other hand, when the BS transmits data to the UE on the basis of CA using multiple carriers in a single TRP, the BS and the UE use a protocol structure in which layers up to RLC have a single structure but the PHY layer is multiplexed through the MAC layer as indicated by reference numeral 1710. In another example, when the BS transmits data to the UE on the basis of DC using multiple carriers in multiple TRPs, the BS and the UE use a protocol structure in which layers up to RLC have a single structure but the PHY layer is multiplexed through the MAC layer as indicated by reference numeral 1720.

Referring to the PDCCH and beam configuration-related descriptions described above, it is difficult to achieve the required reliability in a scenario requiring high reliability, such as URLLC, since PDCCH repetition transmission is not currently supported in Rel-15 and Rel-16 NRs. The disclosure improves PDCCH reception reliability of a terminal by providing a PDCCH repetition transmission method via multiple transmission points (TRPs).

Hereinafter, an embodiment of the disclosure is applicable in FDD and TDD systems. Higher signaling (or higher layer signaling) may be a signal transmission method of transmitting a signal from a BS to a terminal by using a downlink data channel of a physical layer or from the terminal to the BS by using an uplink data channel of the physical layer, and may be referred to as RRC signaling, PDCP signaling, or an MAC control element (CE).

When determining whether to apply cooperative communication, the UE can use various methods by which PDCCH (s) allocating PDSCHs to which cooperative communication is applied have specific formats, PDCCH(s) allocating PDSCHs to which cooperative communication is applied include a specific indicator informing of whether cooperative communication is applied, PDCCH(s) allocating PDSCHs to which cooperative communication is applied are scrambled by a specific RNTI, or the application of cooperative communication to a specific section indicated by a higher layer is assumed. Thereafter, for convenience of description, reception of, by the UE, a PDSCH to which cooperative communication is applied on the basis of conditions similar to the above conditions is referred to as an "NC-JT" case (a non-coherent joint transmission (NC-JT) case).

Determining the priority between A and B may be accomplished in various ways, such as selecting one having a higher priority according to a predetermined priority rule to perform an operation corresponding thereto, or omitting or dropping an operation of one having a lower priority.

Hereinafter, in the disclosure, the examples described above will be explained through multiple embodiments. However, the embodiments are not independent, and one or more embodiments can be applied simultaneously or in combination.

[Related to NC-JT]

According to an embodiment of the disclosure, in order to receive a PDSCH from a plurality of TRPs, the UE may use NC-JT.

A wireless communication system (for example, a 5G or NR system) may support all of the service having very short transmission latency and the service requiring a high connectivity density as well as the service requiring a high transmission rate unlike the conventional system. In a wireless communication network including a plurality of cells, TRPs, or beams, cooperative communication (coordinated transmission) between respective cells, TRPs, and/or beams may satisfy various service requirements by increasing the strength of a signal received by the UE or efficiently controlling interference between the cells, TRPs, and/or beams.

Joint transmission (JT) is a representative transmission technology for the cooperative communication and may increase the strength of a signal received by the UE or throughput by transmitting signals to one UE through different cells, TRPs, and/or beams. At this time, a channel between each cell, TRP, and/or beam and the UE may have different characteristics, and particularly, NC-JT supporting non-coherent precoding between respective cells, TRPs, and/or beams may need individual precoding, MCS, resource allocation, and TCI indication according to the channel characteristics for each link between each cell, TRP, and/or beam and the UE.

The NC-JT may be applied to at least one of a downlink data channel (e.g., a PDSCH), a downlink control channel (e.g., a PDCCH), an uplink data channel (e.g., a PUSCH), and an uplink control channel (e.g., a PUCCH)). In PDSCH transmission, transmission information such as precoding, MCS, resource allocation, and TCI may be indicated through DL DCI, and should be independently indicated for each cell, TRP, and/or beam for the NC-JT. This is a significant factor that increases payload required for DL DCI transmission, which may have a bad influence on reception performance of a PDCCH for transmitting the DCI. Accordingly, in order to support JT of the PDSCH, carefully designing a tradeoff between an amount of DCI information and reception performance of control information is required.

Figure 18:
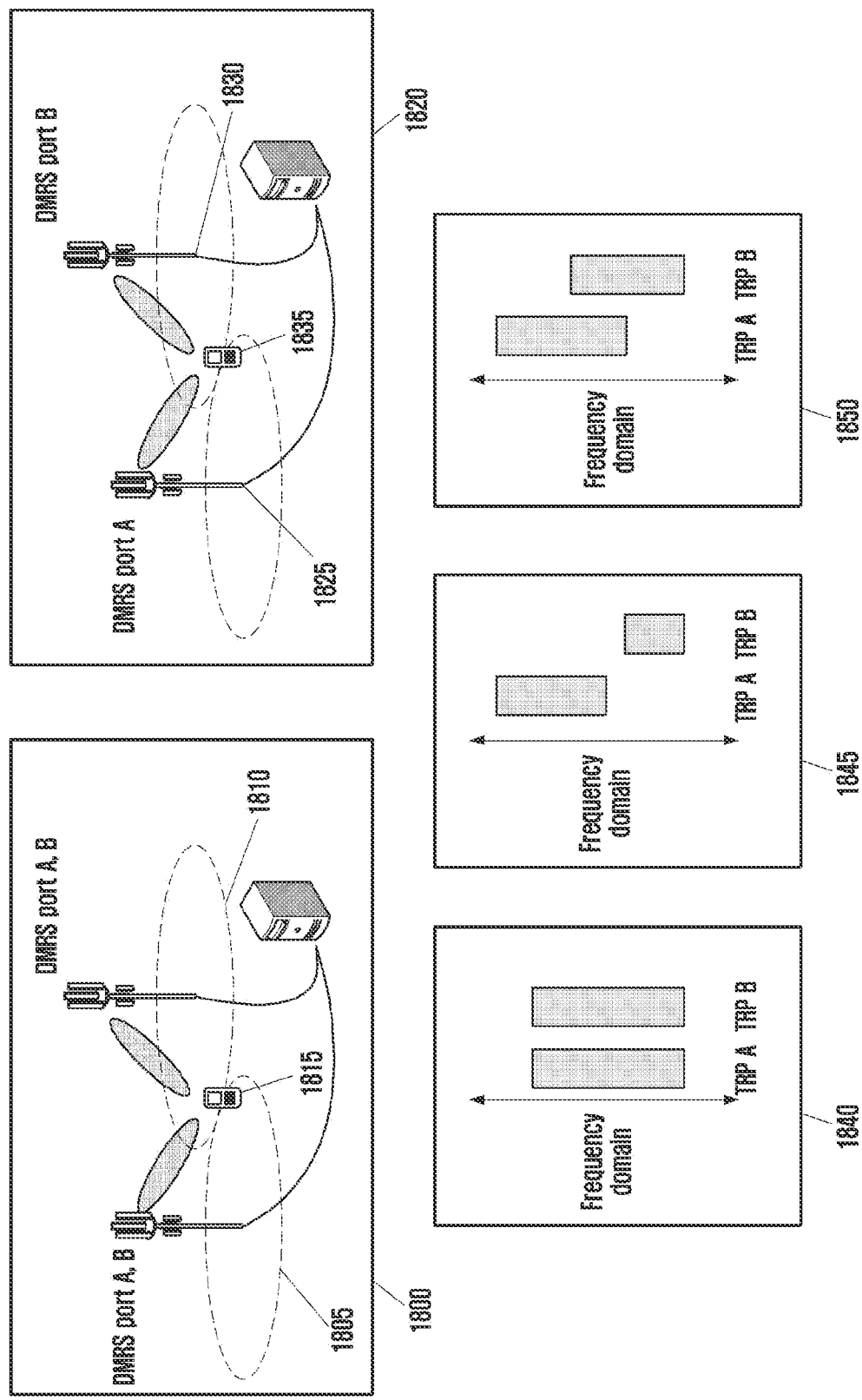
FIG. 18 illustrates a configuration of antenna ports and an example of resource allocation for cooperative communication in a wireless communication system, according to an embodiment of the disclosure.

FIG. 18 illustrates a configuration of antenna ports and an example of resource allocation for transmitting a PDSCH using cooperative communication in a wireless communication system, according to an embodiment.

Referring to FIG. 18, the example for PDSCH transmission is described for each scheme of JT, and examples for allocating radio resources for each TRP are described.

Referring to FIG. 18, an example 1800 of coherent JT (C-JT) supporting coherent precoding between respective cells, TRPs, and/or beams is illustrated.

In the case of C-JT, a TRP A 1805 and a TRP B 1810 transmit single data (e.g., a PDSCH) to a UE 1818, and the plurality of TRPs may perform joint precoding. This may mean that the TRP A 1805 and the TPR B 1810 transmit DMRSs through the same DMRS ports in order to transmit the same PDSCH. For example, the TRP A 1805 and the TPR B 1810 may transmit DMRSs to the UE through a DMRS port A and a DMRS port B, respectively. In this case, the UE may receive one piece of DCI information for receiving one PDSCH demodulated on the basis of the DMRSs transmitted through the DMRS port A and the DMRS port B.

FIG. 18 illustrates an example 1820 of NC-JT supporting non-coherent precoding between respective cells, TRPs, and/or beams for PDSCH transmission.

In the case of NC-JT, the PDSCH is transmitted to a UE 1835 for each cell, TPR, and/or beam, and individual precoding may be applied to each PDSCH. Respective cells, TRPs, and/or beams may transmit different PDSCHs or different PDSCH layers to the UE, thereby improving throughput compared to single cell, TRP, and/or beam transmission. Further, respective cells, TRPs, and/or beams may repeatedly transmit the same PDSCH to the UE, thereby improving reliability compared to single cell, TRP, and/or beam transmission. For convenience of description, the cell, TRP, and/or beam are commonly called a TRP.

At this time, various wireless resource allocations such as the case 1840 in which frequency and time resources used by a plurality of TRPs for PDSCH transmission are all the same, the case 1845 in which frequency and time resources used by a plurality of TRPs do not overlap at all, and the case 1850 in which some of the frequency and time resources used by a plurality of TRPs overlap each other may be considered.

In order to support NC-JT, DCIs in various forms, structures, and relations may be considered to simultaneously allocate a plurality of PDSCHs to one UE.

Figure 19:
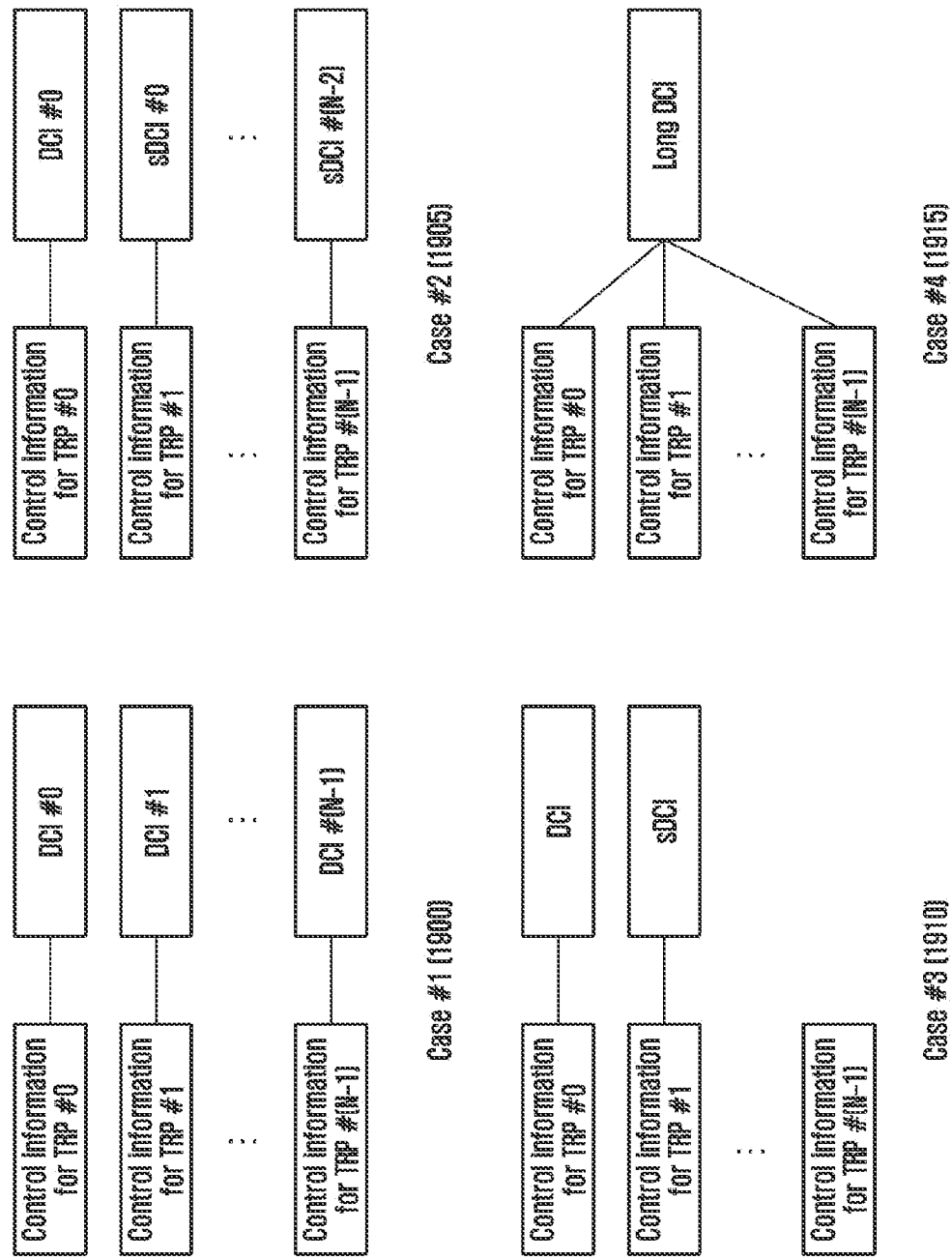
FIG. 19 illustrates an example for a configuration of downlink control information (DCI) for cooperative communication in a wireless communication system, according to an embodiment of the disclosure.

FIG. 19 illustrates an example for a configuration of DCI for cooperative communication in a wireless communication system, according to an embodiment of the disclosure.

For example, FIG. 19 illustrates a configuration of DCI for NC-JT in which respective TRPs transmit different PDSCHs or different PDSCH layers to the UE in a wireless communication system.

Referring to FIG. 19, case #1 1900 is an example in which control information for PDSCHs transmitted from (N−1) additional TRPs is transmitted independently from control information for a PDSCH transmitted by a serving TRP in a situation in which (N−1) different PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through independent DCIs (DCI #0 to DCI #(N−1)). Formats between the independent DCIs may be the same as or different from each other, and payload between the DCIs may also be the same as or different from each other. In case #1, a degree of freedom of PDSCH control or allocation can be completely guaranteed, but when respective pieces of DCI are transmitted by different TRPs, a difference between DCI coverages may be generated and reception performance may deteriorate.

Case #2 1905 is an example in which pieces of control information for PDSCHs of (N−1) additional TRPs are transmitted and each piece of the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for single PDSCH transmission.

DCI #0 that is control information for a PDSCH transmitted from the serving TRP (TRP #0) may include all information elements of DCI format 1_0, DCI format 1_1, and DCI format 1_2, but shortened DCIs (hereinafter, referred to as sDCIs) (sDCI #0 to sDCI #(N−2)) that are control information for PDSCHs transmitted from the cooperative TRPs (TRP #1 to TRP #(N−1)) may include only some of the information elements of DCI format 1_0, DCI format 1_1, and DCI format 1_2. Accordingly, the sDCI for transmitting control information of PDSCHs transmitted from cooperative TPRs has smaller payload compared to the normal DCI (nDCI) for transmitting control information related to the PDSCH transmitted from the serving TRP, and thus can include reserved bits compared to the nDCI.

In case #2 1905, a degree of freedom of each PDSCH control or allocation may be limited according to content of information elements included in the sDCI, but reception capability of the sDCI is better than the nDCI, and thus a probability of the generation of difference between DCI coverages may become lower.

Case #3 1910 is an example in which one piece of control information for PDSCHs of (N−1) additional TRPs is transmitted and the DCI is dependent on control information for the PDSCH transmitted from the serving TRP in a situation in which (N−1) different PDSCHs are transmitted from (N−1) additional TRPs (TRP #1 to TRP #(N−1)) other than the serving TRP (TRP #0) used for a single PDSCH transmission.

In the case of DCI #0 that is control information for the PDSCH transmitted from the serving TRP (TRP 190 0), all information elements of DCI format 1_0, DCI format 1_1, and DCI format 1_2 may be included, and in the case of control information for PDSCHs transmitted from cooperative TRPs (TRP #1 to TRP #(N−1)), only some of the information elements of DCI format 1_0, DCI format 1_1, and DCI format 12 may be gathered in one "secondary" DCI (sDCI) and transmitted. The sDCI may include at least one piece of HARQ-related information such as frequency domain resource assignment and time domain resource assignment of the cooperative TRPs and the MCS. In addition, information that is not included in the sDCI such as a BWP indicator and a carrier indicator may follow the DCI (DCI #0, normal DCI, or nDCI) of the serving TRP.

In case #3 1910, a degree of freedom of PDSCH control or allocation may be limited according to content of the information elements included in the sDCI but reception performance of the sDCI can be controlled, and case #3 1910 may have smaller complexity of DCI blind decoding of the UE compared to case #1 1900 or case #2 1905.

Case #4 1915 is an example in which control information for PDSCHs transmitted from (N−1) additional TRPs is transmitted in the DCI (long DCI) that is the same as that of control information for the PDSCH transmitted from the serving TRP in a situation in which different (N−1) PDSCHs are transmitted from the (N−1) additional TRPs (TRP #1 to TRP #(N−1)) other than the serving TRP (TRP #0) used for single PDSCH transmission. That is, the UE may acquire control information for PDSCHs transmitted from different TRPs (TRP #0 to TRP #(N−1)) through single DCI. In case #4 1915, complexity of DCI blind decoding of the UE may not be increased, but a degree of freedom of PDSCH control or allocation may be low since the number of cooperative TRPs is limited according to long DCI payload restriction.

The sDCI may refer to various pieces of supplementary DCI such as shortened DCI, secondary DCI, or normal DCI (DCI formats 1_0 and 1_1) including PDSCH control information transmitted in the cooperative TRP, and unless specific restriction is mentioned, the corresponding description may be similarly applied to the various pieces of supplementary DCI.

Case #1 1900, case #2 1905, and case #3 1910 in which one or more pieces of DCI (or PDCCHs) are used to support NC-JT may be classified as multiple PDCCH-based NC-JT, and case #4 1915 in which single DCI (or PDCCH) is used to support NC-JT may be classified as single PDCCH-based NC-JT. In multiple PDCCH-based PDSCH transmission, a CORESET for scheduling DCI of the serving TRP (TRP #0) is separated from CORESETs for scheduling DCI of cooperative TRPs (TRP #1 to TRP #(N−1)). A method of distinguishing the CORESETs may include a distinguishing method through a higher-layer indicator for each CORESET and a distinguishing method through a beam configuration for each CORESET. Further, in single PDCCH-based NC-JT, single DCI schedules a single PDSCH having a plurality of layers instead of scheduling a plurality of PDSCHs, and the plurality of layers may be transmitted from a plurality of TRPs. At this time, association between a layer and a TRP transmitting the corresponding layer may be indicated through a TCI indication for the layer.

The "cooperative TRP" may be replaced with various terms such as a "cooperative panel" or a "cooperative beam" when actually applied.

"The case in which NC-JT is applied" may be variously interpreted as "the case in which the UE simultaneously receives one or more PDSCHs in one BWP", "the case in which the UE simultaneously receives PDSCHs on the basis of two or more TCI indications in one BWP", and "the case in which the PDSCHs received by the UE are associated with one or more DMRS port groups" according to circumstances, but is used by one expression for convenience of description.

In the disclosure, a wireless protocol structure for NC-JT may be variously used according to a TRP development scenario. For example, when there is no backhaul delay between cooperative TRPs or there is a small backhaul delay, a method (a CA-like method) using a structure based on MAC layer multiplexing can be used similarly to reference numeral 1710 of FIG. 17. On the other hand, when the backhaul delay between cooperative TRPs is too large to be ignored (for example, when a time of 2 ms or longer is needed to exchange information such as CSI, scheduling, and HARQ-ACK between cooperative TRPs), a method (a DC-like method) of securing a characteristic robust to a delay can be used through an independent structure for each TRP from an RLC layer similarly to reference numeral 1720 of FIG. 17.

The UE supporting C-JT/NC-JT may receive a C-JT/NC-JT-related parameter or a setting value from a higher-layer configuration and set an RRC parameter of the UE on the basis thereof. For the higher-layer configuration, the UE may use a UE capability parameter, for example, tci-StatePDSCH. The UE capability parameter, for example, tci-StatePDSCH may define TCI states for PDSCH transmission, the number of TCI states may be configured as 4, 8, 16, 32, 64, and 128 in FR1 and as 64 and 128 in FR2, and a maximum of 8 states which can be indicated by 3 bits of a TCI field of the DCI may be configured through a MAC CE message among the configured numbers. A maximum value 128 means a value indicated by maxNumberConfiguredTClstatesPerCC within the parameter tci-StatePDSCH which is included in capability signaling of the UE. As described above, a series of configuration processes from the higher-layer configuration to the MAC CE configuration may be applied to a beamforming indication or a beamforming change command for at least one PDSCH in one TRP.

[Multi-DCI-Based Multi-TRP]

As an embodiment of the disclosure, a multi-DCI-based multi-TRP transmission method is described. By a multi-DCI-based multi-TRP transmission method, a downlink control channel for NC-JT transmission may be configured based on a multi-PDCCH.

In NC-JT based on multiple PDCCHs, there may be a CORESET or a search space separated for each TRP when DCI for scheduling the PDSCH of each TRP is transmitted. The CORESET or the search space for each TRP can be configured according to at least one of the following configuration cases.

A configuration of a higher-layer index for each CORESET: CORESET configuration information configured by a higher layer may include an index value, and a TRP for transmitting a PDCCH in the corresponding CORESET may be identified by the configured index value for each CORESET. That is, in a set of CORESETs having the same higher-layer index value, the same TRP may transmit the PDCCH or the PDCCH for scheduling the PDSCH of the same TRP may be transmitted. The index for each CORESET may be named CORESETPoolIndex, and it may be considered that the PDCCH is transmitted from the same TRP in CORESETs in which the same CORESETPoolIndex value is configured. In the CORESET in which the same CORESETPoolIndex value is not configured, a default value of CORESETPoolIndex may be configured, and the default value may be 0.

In the disclosure, if the number of CORESETPoolIndex types of multiple CORESETs included in PDCCH-Config that is higher layer signaling exceeds 1, that is, if the CORESETs have different CORESETPoolIndexs, a terminal may consider that a base station is able to use a multi-DCI-based multi-TRP transmission method.

On the contrary, in the disclosure, if the number of CORESETPoolIndex types of multiple CORESETs included in PDCCH-Config that is higher layer signaling is 1, that is, if all the CORESETs have the same CORESETPoolIndex of 0 or 1, the terminal may consider that the base station performs transmission by using a single TRP rather than using a multi-DCI-based multi-TRP transmission method.

A configuration of multiple PDCCH-Config: a plurality of PDCCH-Config are configured in one BWP, and each PDCCH-Config may include a PDCCH configuration for each TRP. That is, a list of CORESETs for each TRP and/or a list of search spaces for each TRP may be included in one PDCCH-Config, and one or more CORESETs and one or more search spaces included in one PDCCH-Config may correspond to a specific TRP.

A configuration of a CORESET beam/beam group: a TRP that corresponds to the corresponding CORESET may be identified through a beam or a beam group configured for each CORESET. For example, when the same TCI state is configured in a plurality of CORESETs, the corresponding CORESETs may be transmitted through the same TRP or a PDCCH for scheduling a PDSCH of the same TRP may be transmitted in the corresponding CORESET.

A configuration of a search space beam/beam group: a beam or a beam group is configured for each search space, and a TRP for each search space may be identified therethrough. For example, when the same beam/beam group or TCI state is configured in a plurality of search spaces, the same TRP may transmit the PDCCH in the corresponding search space or a PDCCH for scheduling a PDSCH of the same TRP may be transmitted in the corresponding search space.

As described above, by separating the CORESETs or search spaces for each TRP, it is possible to divide PDSCHs and HARQ-ACK for each TRP and accordingly to generate an independent HARQ-ACK codebook for each TRP and use an independent PUCCH resource.

The configuration may be independent for each cell or BWP. For example, while two different CORESETPoolIndex values may be configured in the primary cell (PCell), no CORESETPoolIndex value may be configured in a specific SCell. In this case, NC-JT may be configured in the PCell, but NC-JT may not be configured in the SCell in which no CORESETPoolIndex value is configured.

A PDSCH TCI state activation/deactivation MAC-CE which is applicable to a multi-DCI-based multi-TRP transmission method may follow FIG. 16 described above. If CORESETPoolIndexs for all CORESETs in PDCCH-Config that is higher layer signaling are not configured for the terminal, the terminal may disregard a CORESET pool ID field 16-55 in the MAC-CE 16-50. If the terminal is able to support a multi-DCI-based multi-TRP transmission method, that is, if CORESETs in PDCCH-Config that is higher layer signaling have different CORESETPoolIndexs, the terminal may activate a TCI state in the DCI included in a PDCCH transmitted in CORESETs having the same CORESETPoolIndex value as that of the CORESET pool ID field 16-55 in the MAC-CE 16-50. For example, if the value of the CORESET pool ID field 16-55 in the MAC-CE 16-50 is 0, a TCI state in the DCI included in a PDCCH transmitted from CORESETs having CORESETPoolIndex of 0 may follow activation information of the MAC-CE.

In a case where the terminal is configured by the base station to be able to use a multi-DCI-based multi-TRP transmission method, that is, in a case where the number of CORESETPoolIndex types of multiple CORESETs included in PDCCH-Config that is higher layer signaling exceeds 1, or in a case where the CORESETs have different CORESETPoolIndexs, the terminal may recognize that PDSCHs scheduled by PDCCHs in the respective CORESETs having two different CORESETPoolIndexs have the following restrictions.

If PDSCHs scheduled by PDCCHs in respective CORESETs having two different CORESETPoolIndexs entirely or partially overlap with each other, the terminal may apply TCI states indicated by the PDCCHs, to different CDM groups, respectively. That is, two or more TCI states may not be applied to one CDM group.

If PDSCHs scheduled by PDCCHs in respective CORESETs having two different CORESETPoolIndexs entirely or partially overlap with each other, the terminal may expect that the PDSCHs have the same number of actual front loaded DMRS symbols, the same number of actual additional DMRS symbols, the same position of an actual DMRS symbol, and the same DMRS type.

The terminal may expect that bandwidth parts indicated by PDCCHs in respective CORESETs having two different CORESETPoolIndexs are the same and the subcarrier spacings are also the same.

The terminal may expect that information on a PDSCH scheduled by a PDCCH in a CORESET having each of two different CORESETPoolIndexs is fully included in a corresponding PDCCH.

[Single-DCI-Based Multi-TRP]

As an embodiment of the disclosure, a single-DCI-based multi-TRP transmission method is described. By a single-DCI-based multi-TRP transmission method, a downlink control channel for NC-JT transmission may be configured based on a single-PDCCH.

In single PDCCH-based NC-JT, PDSCH transmitted by a plurality of TRPs may be scheduled by one piece of DCI. At this time, as a method of indicating the number of TRPs transmitting the corresponding PDSCHs and the number of TCI states may be used. That is, single PDCCH-based NC-JT may be considered when the number of TCI states indicated by the DCI for scheduling the PDSCHs is 2, and single-TRP transmission may be considered when the number of TCI states is 1. The TCI states indicated by the DCI may correspond to one or two TCI states among TCI states activated by the MAC CE. When the TCI states of DCI correspond to two TCI states activated by the MAC CE, a TCI codepoint indicated by the DCI is associated with the TCI states activated by the MAC CE, in which case the number of TCI states activated by the MAC CE, corresponding to the TCI codepoint, may be 2.

As another example, if at least one codepoint among all codepoints of a TCI state field in the DCI indicates two TCI states, a terminal may consider that a base station is able to perform transmission based on a single-DCI-based multi-TRP transmission method. The at least one codepoint of the TCI state field indicating two TCI states may be activated through an enhanced PDSCH TCI state activation/deactivation MAC-CE.

FIG. 20 illustrates a diagram of an enhanced PDSCH TCI state activation/deactivation MAC-CE structure according to an embodiment of the disclosure. The meaning of each field in the MAC CE and a value available in each field may be shown as in Table 25.

In FIG. 20, if the value of a CO field 20-05 is 1, the MAC-CE may include a TCI state ID0,2 field 20-15 in addition to a TCI state ID0,1 field 20-10. This implies that TCI state ID0,1 and TCI state ID0,2 are activated for the 0-th codepoint of a TCI state field included in the DCI, and when the base station indicates the codepoint to the terminal, two TCI states may be indicated to the terminal. If the value of the CO field 20-05 is 0, the MAC-CE is unable to include the TCI state ID0,2 field 20-15, and this implies that one TCI state corresponding to TCI state ID0,1 is activated for the 0-th codepoint of a TCI state field included in the DCI.

This configuration may be independent for each cell or each BWP. For example, the number of activated TCI states corresponding to one TCI codepoint is up to 2 in a PCell, but the number of activated TCI states corresponding to one TCI codepoint may be up to 1 in a particular SCell. In this case, it may be considered that NC-JT transmission is configured in a PCell, but NC-JT transmission is not configured in an SCell described above.

[Single-DCI-Based Multi-TRP PDSCH Repetitive Transmission Scheme (TDM/FDM/SDM) Distinguishment Method]

Next, a single-DCI-based multi-TRP PDSCH repetitive transmission scheme distinguishment method will be described. Different single-DCI-based multi-TRP PDSCH repetitive transmission schemes (e.g., TDM, FDM, and SDM) may be indicated to a terminal from a base station according to a value indicated by a DCI field and a higher layer signaling configuration. Table 26 below shows a method of distinguishing between single or multi-TRP-based schemes indicated to a terminal according to a particular DCI field value and a higher layer signaling configuration.

TABLE 25

Serving Cell ID: This field indicates the identity of the Serving Cell for which the MAC CE applies. The length of the field is 5 bits. If the indicated Serving Cell is configured as part of a simultaneousTCI-UpdateList1 or simultaneousTCI-UpdateList2 as specified in TS 38.331 [5], this MAC CE applies to all the Serving Cells configured in the set simultaneousTCI-UpdateList1 or simultaneousTCI-UpdateList2, respectively;
BWP ID: This field indicates a DL BWP for which the MAC CE applies as the codepoint of the DCI bandwidth part indicator field as specified in TS 38.212 [9]. The length of the BWP ID field is 2 bits;
$C_i$: This field indicates whether the octet containing TCI state $ID_{i,2}$ is present. If this field is set to "1", the octet containing TCI state $ID_{i,2}$ is present. If this field is set to "0", the octet containing TCI state $ID_{i,2}$ is not present;
TCI state $Id_{i,j}$: This field indicates the TCI state identified by TCI-StateId as specified in TS 38.331 [5], where i is the index of the codepoint of the DCI Transmission configuration indication field as specified in TS 38.212 [9] and TCI state $Id_{i,j}$ denotes the j-th TCI state indicated for the i-th codepoint in the DCI Transmission Configuration Indication field. The TCI codepoint to which the TCI States are mapped is determined by its ordinal position among all the TCI codepoints with sets of TCI state $ID_{i,j}$ fields, i.e. the first TCI codepoint with TCI state $ID_{0,1}$ and TCI state $ID_{0,2}$ shall be mapped to the codepoint value 0, the second TCI codepoint with TCI state $ID_{1,1}$ and TCI state $ID_{1,2}$ shall be mapped to the codepoint value 1 and so on. The TCI state $Id_{i,2}$ is optional based on the indication of the Ci field. The maximum number of activated TCI codepoint is 8 and the maximum number of TCI states mapped to a TCI codepoint is 2.
R: Reserved bit, set to "0".

TABLE 26

| Combination | Number of TCI states | Number of CDM groups | repetitionNumber configuration and indication condition | Related to repetitionScheme configuration | Transmission scheme indicated to terminal |
|---|---|---|---|---|---|
| 1 | 1 | ≥1 | Condition 2 | Not configured | Single-TRP |
| 2 | 1 | ≥1 | Condition 2 | Configured | Single-TRP |
| 3 | 1 | ≥1 | Condition 3 | Configured | Single-TRP |
| 4 | 1 | 1 | Condition 1 | Configured or not configured | Single-TRP TDM scheme B |
| 5 | 2 | 2 | Condition 2 | Not configured | Multi-TRP SDM |
| 6 | 2 | 2 | Condition 3 | Not configured | Multi-TRP SDM |
| 7 | 2 | 2 | Condition 3 | Configured | Multi-TRP SDM |
| 8 | 2 | 2 | Condition 3 | Configured | Multi-TRP FDM scheme A/FDM scheme B/TDM scheme A |
| 9 | 2 | 2 | Condition 1 | Not configured | Multi-TRP TDM scheme B |

In Table 26 above, each column may be described as follows.

Number of TCI states (second column): This indicates the number of TCI states indicated by a TCI state field in the DCI, and for example, may be one or two.

Number of CDM groups (third column): This indicates the number of different CDM groups of DMRS ports indicated by an antenna port field in the DCI. For example, same may be 1, 2, or 3.

repetitionNumber configuration and indication condition (fourth column): There may be three conditions according to whether repetitionNumber is configured for all TDRA entries which may be indicated by a time domain resource allocation field in the DCI, and whether an actually indicated TDRA entry has a repetitionNumber configuration.

Condition 1: At least one of all TDRA entries which may be indicated by a time domain resource allocation field includes a configuration on repetitionNumber, and a TDRA entry indicated by a time domain resource allocation field in the DCI includes a configuration on repetitionNumber greater than 1.

Condition 2: At least one of all TDRA entries which may be indicated by a time domain resource allocation field includes a configuration on repetitionNumber, and a TDRA entry indicated by a time domain resource allocation field in the DCI does not include a configuration on repetitionNumber.

Condition 3: All TDRA entries which may be indicated by a time domain resource allocation field do not include a configuration on repetitionNumber Related to repetitionScheme configuration (fifth column): This indicates whether repetitionScheme that is higher layer signaling is configured. As the higher layer signaling repetitionScheme, one of "tdmSchemeA", "fdmSchemeA", and "fdmSchemeB" may be configured.

Transmission scheme indicated to terminal (sixth column): This indicates single or multi-TRP schemes indicated by combinations (first column) represented in Table 26 above.

Single-TRP: This indicates single-TRP-based PDSCH transmission. If pdsch-AggegationFactor in higher layer signaling PDSCH-config is configured for a terminal, a single-TRP-based PDSCH repetitive transmission performed configured times may be scheduled for the terminal. Otherwise, a single-TRP-based PDSCH single transmission may be scheduled for the terminal.

Single-TRP TDM scheme B. This indicates single-TRP-based inter-slot time resource division-based PDSCH transmission. According to condition 1 related to repetitionNumber described above, a terminal repeats PDSCH transmission in the time domain a number of times corresponding to a number of slots corresponding to the count of repetitionNumber greater than 1 configured in a TDRA entry indicated by a time domain resource allocation field. The terminal applies the same start symbol and the same symbol length of a PDSCH indicated by the TDRA entry to each of the slots, the number of which is equal to the count of repetitionNumber, and applies the same TCI state to every PDSCH repetitive transmission. This scheme is similar to a slot aggregation scheme in that inter-slot PDSCH repetitive transmission is performed in the time resources, but differs from slot aggregation in that whether repetitive transmission is indicated may be dynamically determined based on a time domain resource allocation field in the DCI.

Multi-TRP SDM: This means a multi-TRP-based spatial resource division PDSCH transmission scheme. This is a method of receiving distributed layers from each TRP, and is not a repetitive transmission scheme, but may increase the reliability of PDSCH transmission in that transmission is performed at a lowered code rate by increasing the number of layers. A terminal may apply two TCI states indicated through a TCI state field in the DCI to two CDM groups indicated by a base station, respectively, so as to receive a PDSCH.

Multi-TRP FDM scheme A: This means a multi-TRP-based frequency resource division PDSCH transmission scheme. This scheme provides one PDSCH transmission position (occasion) and thus is not repetitive transmission like multi-TRP SDM. However, transmission is possible with high reliability at a lowered code rate by increasing the amount of frequency resources. Multi-TRP FDM scheme A may apply two TCI states indicated through a TCI state field in the DCI to frequency resources not overlapping each other, respectively. In a case where a PRB bundling size is determined to be a wideband, if the number of RBs indicated by a frequency domain resource allocation field is N, the terminal applies the first TCI state to the first ceil(N/2) RBs, and applies the second TCI state to the remaining floor(N/2) RBs so as to perform reception. Here, ceil(·) and floor(·) are operators indicating rounding up and down for one decimal place. If a PRB bundling size is determined to be 2 or 4, the terminal may applies the first TCI state to even-numbered precoding resource block groups (PRGs), and applies the second TCI state to odd-numbered PRGs to perform reception.

Multi-TRP FDM scheme B: This means a multi-TRP-based frequency resource division PDSCH repetitive transmission scheme, and provides two PDSCH transmission occasions to repeat PDSCH transmission at the respective occasions. In the same way as multi-TRP FDM scheme A, multi-TRP FDM scheme B may also apply two TCI states indicated through a TCI state field in the DCI to frequency resources not overlapping each other, respectively. In a case where a PRB bundling size is determined to be a wideband, if the number of RBs indicated by a frequency domain resource allocation field is N, the terminal applies the first TCI state to the first ceil(N/2) RBs, and applies the second TCI state to the remaining floor(N/2) RBs so as to perform reception. Here, ceil(·) and floor(·) are operators indicating rounding up and down for one decimal place. If a PRB bundling size is determined to be 2 or 4, the terminal may applies the first TCI state to even-numbered PRGs, and applies the second TCI state to odd-numbered PRGs to perform reception.

Multi-TRP TDM scheme A: This means a multi-TRP-based time resource division intra-slot PDSCH repetitive transmission scheme. A terminal may have two PDSCH transmission occasions in one slot, and the first reception occasion may be determined based on the start symbol and the symbol length of a PDSCH indicated through a time domain resource allocation field in the DCI. The start symbol of the second reception occasion of the PDSCH may be a position obtained by applying a symbol offset of the higher layer signaling StartingSymbolOffsetK from the last symbol of the first transmission occasion, and the transmission occasion may be determined as long as the indicated symbol length therefrom. If the higher layer signaling StartingSymbolOffsetK is not configured, the symbol offset may be considered as 0.

Multi-TRP TDM scheme B: This means a multi-TRP-based time resource division inter-slot PDSCH repetitive transmission scheme. A terminal may have one PDSCH transmission occasion in one slot, and receive repetitive transmission, based on the same start symbol and the same symbol length of a PDSCH during a number of slots corresponding to the count of repetitionNumber indicated through a time domain resource allocation field in the DCI. If repetitionNumber is 2, the terminal may receive PDSCH repetitive transmission in the first and second slots by applying the first and second TCI states, respectively. If repetitionNumber is greater than 2, the terminal may use different TCI state application schemes according to which the higher layer signaling tciMapping is configured to be. If tciMapping is configured to be cyclicMapping, the terminal applies the first and second TCI states to the first and second PDSCH transmission occasions, respectively, and also applies this TCI state application method to the remaining PDSCH transmission occasions in the same way. If tciMapping is configured to be sequenticalMapping, the terminal applies the first TCI state to the first and second PDSCH transmission occasions and the second TCI state to the third and fourth PDSCH transmission occasions, respectively, and also applies this TCI state application method to the remaining PDSCH transmission occasions in the same way.

[Related to DMRS]

Next, antenna port field indication included in DCI format 1_1 and DCI format 1_2 defined in Table 7 described above will be described. An antenna port field in DCI formats 1_1 and 1_2 may be expressed by 4, 5, or 6 bits, and may perform indication through Table 27 to Table 34 below.

TABLE 27

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12-15 | Reserved | Reserved |

TABLE 28

Antenna port(s) (1000 + DMRS port), dmrs-Type = 1, maxLength = 1
One Codeword:
Codeword 0 enabled,
Codeword 1 disabled

| Value | Number of DMRS CDM group(s) without data | DMRS port(s) |
|---|---|---|
| 0 | 1 | 0 |
| 1 | 1 | 1 |
| 2 | 1 | 0, 1 |
| 3 | 2 | 0 |
| 4 | 2 | 1 |
| 5 | 2 | 2 |
| 6 | 2 | 3 |
| 7 | 2 | 0, 1 |
| 8 | 2 | 2, 3 |
| 9 | 2 | 0-2 |
| 10 | 2 | 0-3 |
| 11 | 2 | 0, 2 |
| 12 | 2 | 0, 2, 3 |
| 13-15 | Reserved | Reserved |

TABLE 29

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbol | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | Reserved | Reserved | Reserved | | | | |

TABLE 30

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 2 | 0-4 | 2 |
| 1 | 1 | 1 | 1 | 1 | 2 | 0, 1, 2, 3, 4, 6 | 2 |
| 2 | 1 | 0, 1 | 1 | 2 | 2 | 0, 1, 2, 3, 4, 5, 6 | 2 |
| 3 | 2 | 0 | 1 | 3 | 2 | 0, 1, 2, 3, 4, 5, 6, 7 | 2 |
| 4 | 2 | 1 | 1 | 4-31 | reserved | reserved | reserved |
| 5 | 2 | 2 | 1 | | | | |
| 6 | 2 | 3 | 1 | | | | |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |

TABLE 30-continued

Antenna port(s) (1000 + DMRS port), dmrs-Type = 1, maxLength = 2

| | One Codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 11 | 2 | 0, 2 | 1 | | | | |
| 12 | 2 | 0 | 2 | | | | |
| 13 | 2 | 1 | 2 | | | | |
| 14 | 2 | 2 | 2 | | | | |
| 15 | 2 | 3 | 2 | | | | |
| 16 | 2 | 4 | 2 | | | | |
| 17 | 2 | 5 | 2 | | | | |
| 18 | 2 | 6 | 2 | | | | |
| 19 | 2 | 7 | 2 | | | | |
| 20 | 2 | 0, 1 | 2 | | | | |
| 21 | 2 | 2, 3 | 2 | | | | |
| 22 | 2 | 4, 5 | 2 | | | | |
| 23 | 2 | 6, 7 | 2 | | | | |
| 24 | 2 | 0, 4 | 2 | | | | |
| 25 | 2 | 2, 6 | 2 | | | | |
| 26 | 2 | 0, 1, 4 | 2 | | | | |
| 27 | 2 | 2, 3, 6 | 2 | | | | |
| 28 | 2 | 0, 1, 4, 5 | 2 | | | | |
| 29 | 2 | 2, 3, 6, 7 | 2 | | | | |
| 30 | 2 | 0, 2, 4, 6 | 2 | | | | |
| 31 | 2 | 0, 2, 3 | 1 | | | | |

TABLE 31

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |

TABLE 31-continued

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 23 | 2 | 0, 2 | | | |
| 24-31 | Reserved | Reserved | | | |

TABLE 32

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 0 | 1 | 0 | 0 | 3 | 0-4 |
| 1 | 1 | 1 | 1 | 3 | 0-5 |

TABLE 32-continued

Antenna port(s) (1000 + DMRS port), dmrs-Type = 2, maxLength = 1

| | One codeword: Codeword 0 enabled, Codeword 1 disabled | | | Two codewords: Codeword 0 enabled, Codeword 1 enabled | |
|---|---|---|---|---|---|
| Value | Number of DMRS CDM group(s) without data | DMRS port(s) | Value | Number of DMRS CDM group(s) without data | DMRS port(s) |
| 2 | 1 | 0, 1 | 2-31 | reserved | reserved |
| 3 | 2 | 0 | | | |
| 4 | 2 | 1 | | | |
| 5 | 2 | 2 | | | |
| 6 | 2 | 3 | | | |
| 7 | 2 | 0, 1 | | | |
| 8 | 2 | 2, 3 | | | |
| 9 | 2 | 0-2 | | | |
| 10 | 2 | 0-3 | | | |
| 11 | 3 | 0 | | | |
| 12 | 3 | 1 | | | |
| 13 | 3 | 2 | | | |
| 14 | 3 | 3 | | | |
| 15 | 3 | 4 | | | |
| 16 | 3 | 5 | | | |
| 17 | 3 | 0, 1 | | | |
| 18 | 3 | 2, 3 | | | |
| 19 | 3 | 4, 5 | | | |
| 20 | 3 | 0-2 | | | |
| 21 | 3 | 3-5 | | | |
| 22 | 3 | 0-3 | | | |
| 23 | 2 | 0, 2 | | | |
| 24 | 2 | 0, 2, 3 | | | |
| 25-31 | Reserved | Reserved | | | |

TABLE 33

Antenna port(s) (1000 + DMRS port), dmrs-Type = 2, maxLength = 2

| | One codeword: Codeword 0 enabled, Codeword 1 disabled | | | Two Codewords: Codeword 0 enabled, Codeword 1 enabled | | |
|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |

TABLE 33-continued

Antenna port(s) (1000 + DMRS port), dmrs-Type = 2, maxLength = 2

| | One codeword:<br>Codeword 0 enabled,<br>Codeword 1 disabled | | | | Two Codewords:<br>Codeword 0 enabled,<br>Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58-63 | Reserved | Reserved | Reserved | | | | |

TABLE 34

Antenna port(s) (1000 + DMRS port), dmrs-Type = 2, maxLength = 2

| | One codeword:<br>Codeword 0 enabled,<br>Codeword 1 disabled | | | | Two Codewords:<br>Codeword 0 enabled,<br>Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 0 | 1 | 0 | 1 | 0 | 3 | 0-4 | 1 |
| 1 | 1 | 1 | 1 | 1 | 3 | 0-5 | 1 |
| 2 | 1 | 0, 1 | 1 | 2 | 2 | 0, 1, 2, 3, 6 | 2 |
| 3 | 2 | 0 | 1 | 3 | 2 | 0, 1, 2, 3, 6, 8 | 2 |
| 4 | 2 | 1 | 1 | 4 | 2 | 0, 1, 2, 3, 6, 7, 8 | 2 |
| 5 | 2 | 2 | 1 | 5 | 2 | 0, 1, 2, 3, 6, 7, 8, 9 | 2 |
| 6 | 2 | 3 | 1 | 6-63 | Reserved | Reserved | Reserved |
| 7 | 2 | 0, 1 | 1 | | | | |
| 8 | 2 | 2, 3 | 1 | | | | |
| 9 | 2 | 0-2 | 1 | | | | |
| 10 | 2 | 0-3 | 1 | | | | |
| 11 | 3 | 0 | 1 | | | | |
| 12 | 3 | 1 | 1 | | | | |
| 13 | 3 | 2 | 1 | | | | |
| 14 | 3 | 3 | 1 | | | | |
| 15 | 3 | 4 | 1 | | | | |
| 16 | 3 | 5 | 1 | | | | |
| 17 | 3 | 0, 1 | 1 | | | | |
| 18 | 3 | 2, 3 | 1 | | | | |
| 19 | 3 | 4, 5 | 1 | | | | |
| 20 | 3 | 0-2 | 1 | | | | |

TABLE 34-continued

Antenna port(s) (1000 + DMRS port), dmrs-Type = 2, maxLength = 2

| | One codeword: Codeword 0 enabled, Codeword 1 disabled | | | | Two Codewords: Codeword 0 enabled, Codeword 1 enabled | | |
|---|---|---|---|---|---|---|---|
| Value | Number of DMRS CDM group(s) without data | DMRS port(s) | Number of front-load symbols | Value | Number of DMRS CDM group(s) without data | DMRS port(s) | Number of front-load symbols |
| 21 | 3 | 3-5 | 1 | | | | |
| 22 | 3 | 0-3 | 1 | | | | |
| 23 | 2 | 0, 2 | 1 | | | | |
| 24 | 3 | 0 | 2 | | | | |
| 25 | 3 | 1 | 2 | | | | |
| 26 | 3 | 2 | 2 | | | | |
| 27 | 3 | 3 | 2 | | | | |
| 28 | 3 | 4 | 2 | | | | |
| 29 | 3 | 5 | 2 | | | | |
| 30 | 3 | 6 | 2 | | | | |
| 31 | 3 | 7 | 2 | | | | |
| 32 | 3 | 8 | 2 | | | | |
| 33 | 3 | 9 | 2 | | | | |
| 34 | 3 | 10 | 2 | | | | |
| 35 | 3 | 11 | 2 | | | | |
| 36 | 3 | 0, 1 | 2 | | | | |
| 37 | 3 | 2, 3 | 2 | | | | |
| 38 | 3 | 4, 5 | 2 | | | | |
| 39 | 3 | 6, 7 | 2 | | | | |
| 40 | 3 | 8, 9 | 2 | | | | |
| 41 | 3 | 10, 11 | 2 | | | | |
| 42 | 3 | 0, 1, 6 | 2 | | | | |
| 43 | 3 | 2, 3, 8 | 2 | | | | |
| 44 | 3 | 4, 5, 10 | 2 | | | | |
| 45 | 3 | 0, 1, 6, 7 | 2 | | | | |
| 46 | 3 | 2, 3, 8, 9 | 2 | | | | |
| 47 | 3 | 4, 5, 10, 11 | 2 | | | | |
| 48 | 1 | 0 | 2 | | | | |
| 49 | 1 | 1 | 2 | | | | |
| 50 | 1 | 6 | 2 | | | | |
| 51 | 1 | 7 | 2 | | | | |
| 52 | 1 | 0, 1 | 2 | | | | |
| 53 | 1 | 6, 7 | 2 | | | | |
| 54 | 2 | 0, 1 | 2 | | | | |
| 55 | 2 | 2, 3 | 2 | | | | |
| 56 | 2 | 6, 7 | 2 | | | | |
| 57 | 2 | 8, 9 | 2 | | | | |
| 58 | 2 | 0, 2, 3 | 1 | | | | |
| 59-63 | Reserved | Reserved | Reserved | | | | |

Table 27 and Table 28 are tables used when dmrs-type is indicated to be 1 and maxLength is indicated to be 1, Table 29 and Table 30 are tables used when dmrs-type is equal to 1 and maxLength is equal to 2, Table 31 and Table 32 show DMRS ports used when dmrs-type is equal to 2 and maxLength is equal to 1, and Table 33 and Table 34 show DMRS ports used when dmrs-type is equal to 2 and maxLength is equal to 2.

If a terminal has received a MAC-CE for activating a codepoint indicating two TCI states for at least one codepoint of a TCI state field in the DCI, a DMRS port may be indicated to the terminal by using Table 28, Table 30, Table 32, and Table 34. Otherwise, a DMRS port may be indicated to the terminal by using Table 27, Table 29, Table 31, and Table 33. If a codepoint indicating two TCI states is indicated to the terminal through a TCI state field, entries indicating DMRS ports 1000, 1002, and 1003 may be indicated to the terminal for the purpose of NC-JT scheduling in Table 28, Table 30, Table 32, and Table 34, and the entries may be entry #12 in Table 28, entry #31 in Table 30, entry #24 in Table 32, and entry #58 in Table 34.

With respect to DCI format 1_1, if the higher layer signalings dmrs-DownlinkForPDSCH-MappingTypeA and dmrs-DownlinkForPDSCH-MappingTypeB are both configured for the terminal, a bit length of an antenna port field in DCI format 1_1 may be determined by max{xA, xB}. Here, xA and xB may indicate bit lengths of an antenna port field determined through dmrs-DownlinkForPDSCH-MappingTypeA and dmrs-DownlinkForPDSCH-MappingTypeB, respectively. If a PDSCH mapping type corresponding to the smaller value among xA and xB is scheduled, each of MSB bits, the number of which is equal to |xA−xB|, may be allocated 0 bits and then transmitted.

With respect to DCI format 1_2, if the higher layer signaling antennaPortsFieldPresenceDCI-1-2 is not configured for the terminal, there is not antenna port field in DCI format 1-2. That is, the length of the antenna port field is 0 bits, and the terminal may determine a DMRS port by assuming the 0-th entry in Table 27, Table 29, Table 31, and Table 33. If the higher layer signaling antennaPortsFieldPresenceDCI-1-2 is configured for the terminal, the bit length of an antenna port field in DCI format 1_2 may be determined similarly to the case of DCI format 1_1. If the higher layer signalings dmrs-DownlinkForPDSCH-MappingTypeA-DCI-1-2 and dmrs-DownlinkForPDSCH-MappingTypeB-DCI-1-2 are both configured for the terminal, the bit length of an antenna port field in DCI format 1_2 may be determined by max{xA, xB}, and here, xA and xB may indicate bit lengths of an antenna port field determined through dmrs-DownlinkForPDSCH-MappingTypeA-DCI-1-2 and dmrs-DownlinkForPDSCH-MappingTypeB-DCI-1-2, respectively. If a PDSCH mapping type corresponding to the smaller value among xA and xB is scheduled, each of as many MSB bits as |xA−xB| may be allocated 0 bits and then transmitted.

The numbers 1,2, and 3 indicated by number of DMRS CDM group(s) without data in Table 27 to Table 34 may indicate CDM groups {0}, {0, 1}, and {0, 1, 2}, respectively. DMRS port(s) shows indexes of used ports in sequence. Antenna port may be indicated by DMRS port+1000. A CDM group of a DMRS is connected to a method of generating a DMRS sequence and an antenna port as shown in Table 35 and Table 36. Table 35 shows parameters of a case of using dmrs-type=1, and Table 36 shows parameters of a case of using dmrs-type=2.

TABLE 35

Parameters for PDSCH DM-RS dmrs-type = 1.

| p | CDM group $\lambda$ | $\Delta$ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |

TABLE 36

Parameters for PDSCH DM-RS dmrs-type = 2.

| p | CDM group $\lambda$ | $\Delta$ | $w_f(k')$ k' = 0 | k' = 1 | $w_t(l')$ l' = 0 | l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |

A DMRS sequence according to each parameter may be determined by Equation 3 below. In Equation 3, p denotes a DMRS port, k denotes a subcarrier index, l denotes an OFDM symbol index, p denotes a subcarrier spacing, wf(k') and wt(l') denote a frequency domain orthogonal cover code (FD-OCC) coefficient and a time domain orthogonal cover code (TD-OCC) coefficient according to a k' value and a l' value, respectively, and Δ expresses the interval between CDM groups by using the number of subcarriers. In [Equation 3], $\beta_{PDSCH}^{DMRS}$ is a scaling factor indicating the ratio between the energy-per-RE (EPRE) of a PDSCH and the EPRE of a DMRS, and may be calculated by $$\beta_{PDSCH}^{DMRS} = 10^{-\frac{\beta_{DRMS}}{20}},$$

and the value of $\beta_{DMRS}$ may be 0 dB, −3 dB, and −4.77 dB according to 1, 2, and 3 of the number of CDM groups.

$$a_{k,l}^{(p,\mu)} = \beta_{PDSCH}^{DMRS} w_f(k')w_t(l')r(2n+k') \quad \text{[Equation 3]}$$

$$k = \begin{cases} 4n + 2k' + \Delta & \text{Configuration type 1} \\ 4n + 2k' + \Delta & \text{Configuration type 2} \end{cases}$$

$$k' = 0,1$$

$$l = \bar{l} + l'$$

$$n = 0,1,\ldots$$

In a case where DMRS type 1 is used, if a single codeword is scheduled and entries #2, #9, #10, #11, and #30 are indicated to a terminal by using Table 27 or Table 29, if a single codeword is scheduled and entries #2, #9, #10, #11, and #12 are indicated thereto by using Table 28, if a single codeword is scheduled and entries #2, #9, #10, #11, #30, and #31 are indicated thereto by using Table 30, or if two codewords are scheduled, the terminal may consider that the scheduling is single-user MIMO scheduling. That is, the terminal may assume that a different terminal is not scheduled to all remaining orthogonal DMRS ports other than DMRS ports allocated to a scheduled PDSCH, and may not expect multi-user MIMO (MU-MIMO) scheduling. In this case, the terminal does not assume that a different terminal is co-scheduled, and may not perform a multi-user MIMO reception operation like canceling, nulling, or whitening multi-user interference.

In a case where DMRS type 2 is used, if a single codeword is scheduled and entries #2, #10, and #23 are indicated to a terminal by using Table 31 or Table 33, if a single codeword is scheduled and entries #2, #10, #23, and #24 are indicated thereto by using Table 32, if a single codeword is scheduled and entries #2, #10, #23, and #58 are indicated thereto by using Table 34, or if two codewords are scheduled, the terminal may consider that the scheduling is single-user MIMO scheduling. That is, the terminal may assume that a different terminal is not scheduled to all remaining orthogonal DMRS ports other than DMRS ports allocated to a scheduled PDSCH, and may not expect multi-user MIMO scheduling. In this case, the terminal does not assume that a different terminal is co-scheduled, and may not perform a multi-user MIMO reception operation like canceling, nulling, or whitening multi-user interference.

The terminal may not expect that while the number of maximum front-loaded DMRS symbols is configured to be len2 through the higher layer signaling maxLength, one or more additional DMRS symbols are configured through the higher layer signaling dmrs-AdditionalPosition.

The terminal may not expect that the number of actual front-loaded DMRS, the number of actual additional DMRS symbol, a DMRS symbol position, and a DMRS type configuration are different for all terminals subject to multi-user MIMO scheduling.

In a case of a terminal having a PRG size of 2 or 4, the terminal may not expect that frequency resource allocation does not match in a PRG unit grid for a different terminal co-scheduled using different orthogonal DMRS ports in the same CDM group as that of a DMRS port indicated to the terminal.

In a case of a PDSCH scheduled by DCI format 1_1 and 1_2, a terminal may assume that CDM groups indicated through the column of "number of DMRS CDM group(s) without data" in Table 27 to Table 34 described above may include DMRS ports allocated to a different terminal which may be co-scheduled through a multi-user MIMO scheme, and may not be used for data transmission of the terminal, and 1, 2, and 3 of the values indicated through the column of "number of DMRS CDM group(s) without data" in Table 27 to Table 34 may imply that the indexes of CDM groups corresponding to the values correspond to CDM groups 0, {0,1}, and {0,1,2}, respectively.

If the higher layer signaling dmrs-FD-OCC-disableForRank1PDSCH is configured for a terminal and one DMRS port is allocated to the terminal for PDSCH scheduling, the terminal may not expect that a different terminal is allocated a DMRS port in which a different FD-OCC is used, among different orthogonal DMRS ports belonging to the same CDM group as that of the one allocated DMRS port.

In one embodiment, a method of supporting enhanced DMRS types 1 and 2 supporting an increased number of orthogonal ports is described.

An evolved standard of 5G may support enhanced DMRS type 1 and enhanced DMRS type 2 supporting an increased number of orthogonal ports while maintaining the same RE use amount and the same overhead as those of DMRS type 1 and DMRS type 2 which have been supported in an initial standard of 5G for all uplink and downlink. In a case of conventional DMRS type 1, if the number of front loaded symbols is 1 and 2, maximum four and eight orthogonal DMRS ports may be supported, respectively, and in a case of DMRS type 2, if the number of front loaded symbols is 1 and 2, maximum six and twelve orthogonal DMRS ports may be supported, respectively. Referring to these supported items, in a case of enhanced DMRS type 1, if the number of front loaded symbols is 1 and 2, maximum eight and sixteen orthogonal DMRS ports may be supported, respectively, and in a case of enhanced DMRS type 2, if the number of front loaded symbols is 1 and 2, maximum twelve and twenty four orthogonal DMRS ports may be supported, respectively.

Hereinafter, a new DMRS type supporting an increased number of orthogonal ports as described above may be named one of "enhanced DMRS types 1 and 2", "new DMRS types 1 and 2", "new DMRS types 1 and 2", "DMRS types 1-1 and 2-1", or "DMRS types 3 and 4", and other similar expanded names which may be called with the meaning of having a function enhanced compared to that of conventional DMRS types 1 and 2 may not be excluded. In addition, the following items are described mainly for downlink, but may also be applied similarly to uplink DMRS supporting.

If a terminal supports enhanced DMRS types 1 and 2, the terminal may report a terminal capability of supporting enhanced DMRS types 1 and 2 to a base station. The reporting of the terminal capability may be transmitted to the base station per band and, more specifically, may be possible also per feature set (FS) (per band per band combination) or per feature set per component carrier (FSPC) (per CC per band per band combination). In addition, the reporting of the terminal capability may be differently supported for each frequency range (FR), or may be limited to FR1 (e.g., sub 6 gHz). Furthermore, the reporting of the terminal capability may include, as described above, the meaning wherein in a case of enhanced DMRS type 1, if the number of front loaded symbols is 1 and 2, maximum eight and sixteen orthogonal DMRS ports may be supported, respectively, and in a case of enhanced DMRS type 2, if the number of front loaded symbols is 1 and 2, maximum twelve and twenty four orthogonal DMRS ports may be supported, respectively. The terminal may perform reporting through common terminal capability for enhanced DMRS types 1 and 2, and may report whether the terminal supports only enhanced DMRS type 1, supports only enhanced DMRS type 2, or supports both enhanced DMRS types 1 and 2. Alternatively, the terminal may report whether the terminal supports each of enhanced DMRS types 1 and 2 through an individual terminal capability.

In addition, if the terminal supports a dynamic switching function between an enhanced DMRS type and a conventional DMRS type, the terminal may report the function through a terminal capability. The dynamic switching function between an enhanced DMRS type and a conventional DMRS type may imply that a DMRS type configured through higher layer signaling is changeable through a MAC-CE, that selection between an enhanced type and a conventional type is possible through DCI, or both of them. If the terminal reports, through a common terminal capability, whether enhanced DMRS types 1 and 2 are supported, the terminal may report, through one terminal capability, whether a dynamic switching function for DMRS types 1 and 2 is supported, while reporting whether the terminal supports only dynamic switching between DMRS type 1 and enhanced DMRS type 1, the terminal supports only dynamic switching between DMRS type 2 and enhanced DMRS type 2, or the terminal supports dynamic switching between an enhanced type and a conventional type for both of two types. On the contrary, in a case where the terminal reports, through a common terminal capability or an individual terminal capability, whether enhanced DMRS types 1 and 2 are supported, the terminal may report, through an individual terminal capability for each type, that dynamic switching between a conventional type and an enhanced type is possible.

In addition, in a case where the terminal operates in enhanced DMRS type 1 or 2, if the terminal supports conventional DMRS type 1 or 2 and multi-user MIMO scheduling, the terminal may report the function through a terminal capability. The multi-user MIMO scheduling may indicate co-scheduling between conventional DMRS type 1 and enhanced DMRS type 1, or co-scheduling between conventional DMRS type 2 and enhanced DMRS type 2. Similarly to the above description, a terminal capability relating to whether co-scheduling between a conventional DMRS type and an enhanced DMRS type is possible may be reported through a common terminal capability. For example, the terminal may report only co-scheduling between conventional type 1 and enhanced type 1 being possible, report only co-scheduling between conventional type 2 and enhanced type 2 being possible, or report co-scheduling between a conventional type and an enhanced type being possible for both types 1 and 2. Alternatively, the terminal may perform reporting through an individual terminal capability for each type.

With respect to the terminal having reported a terminal capability, a base station may configure an enhanced DMRS type 1 and 2 scheme for the terminal through higher layer signaling by using the following methods.

[Higher layer configuration method 1] For example, an enhanced DMRS type being supported may be configured for the terminal through the higher layer signaling DMRS-DownlinkConfig.

[Higher layer configuration method 1-1] The higher layer signaling dmrs-Type-r18 similar to the higher layer signaling dmrs-Type used to determine a conventional DMRS type may be configured, and dmrs-Type-r18 may be used to define an enhanced DMRS type other than DMRS type 1 or 2. An RRC IE that is called dmrs-Type-r18 in addition to dmrs-Type may be newly configured for the terminal in the higher layer signaling DMRS-DownlinkConfig. Through dmrs-Type-r18, one of a total of four different DMRS types including DMRS types 1 and 2 and enhanced DMRS types 1 and 2 may be configured, or one of enhanced DMRS types 1 and 2 may be configured. For example, as shown in Table 37 below, if dmrs-Type-r18 is configured, one of DMRS type 2, enhanced DMRS type 1 or enhanced DMRS type 2 may be configured, and existing dmrs-Type may be disregarded. If dmrs-Type-r18 is not configured, a DMRS type may be determined according to a dmrs-Type configuration scheme. As another example, if dmrs-Type-r18 is configured, one of enhanced DMRS types 1 and 2 may be configured, and existing dmrs-Type may be disregarded. If dmrs-Type-r18 is not configured, a DMRS type may be determined according to a dmrs-Type configuration scheme. If a base station configures higher layer signaling for a terminal by using [Higher layer configuration method 1-1], one of a total of four schemes including DMRS type 1, DMRS type 2, enhanced DMRS type 1, and enhanced DMRS type 2 may be configured for the terminal with respect to each of PDSCH mapping type A or B. In another method, if a base station configures higher layer signaling for a terminal by using [Higher layer configuration method 1-1], one of a total of two schemes including a conventional scheme (e.g., DMRS type 1 or 2) and an enhanced scheme (e.g., enhanced DMRS type 1 or 2) of DMRS type may be configured for the terminal for each of PDSCH mapping type A or B, and this may be a higher layer configuration scheme in which dynamic switching between a conventional scheme and an enhanced scheme is impossible, or dynamic switching is not considered. The dmrs-Type-r18 which is the name of an RRC IE is merely an example, and may be different from the name of an actual RRC IE.

[Higher layer configuration method 1-2] while a conventional meaning of an existing dmrs-Type wherein one of DMRS types 1 and 2 is determined is used, a new RRC IE (e.g., enhanced-Dmrs-Type-r18) having the meaning of whether enhanced DMRS type 1 or 2 is available may be additionally configured. As shown in Table 38 below, if the higher layer signaling dmrs-Type is not configured for a terminal by a base station and enhanced-Dmrs-Type-r18 is not configured therefor, the terminal may support a conventional scheme for DMRS type 1. In addition, if dmrs-Type is not configured for the terminal and enhanced-Dmrs-Type-r18 is configured to be enabled, this may imply that the terminal may support an enhanced scheme for DMRS type 1. In this case, in a case where the terminal supports dynamic switching between a conventional type and an enhanced type, if enhanced-Dmrs-Type-r18 is configured for the terminal, the terminal may perform dynamic switching without additional higher layer signaling, or whether to perform dynamic switching may be configured by the base station for the terminal through dynamicSwitchType that is an additional higher layer signaling.

TABLE 38

| | |
|---|---|
| DMRS-DownlinkConfig ::= | SEQUENCE { |
| dmrs-Type | ENUMERATED {type2} |
| OPTIONAL, -- Need S | |
| dmrs-AdditionalPosition | ENUMERATED {pos0, pos1, pos3} |
| OPTIONAL, -- Need S | |
| maxLength | ENUMERATED {len2} |
| OPTIONAL, -- Need S | |
| scramblingID0 | INTEGER (0..65535) |
| OPTIONAL, -- Need S | |
| scramblingID1 | INTEGER (0..65535) |
| OPTIONAL, -- Need S | |
| phase TrackingRS | SetupRelease { PTRS-DownlinkConfig } |
| | OPTIONAL, -- Need M |
| ..., | |
| [[ | |
| dmrs-Downlink-r16 | ENUMERATED {enabled} |
| OPTIONAL -- Need R | |
| ]] | |
| enhanced-Dmrs-Type-r18 | ENUMERATED {enabled} |
| OPTIONAL, -- Need S | |
| } | |

[Higherlayer configuration method 2] A terminal may not use the higher layer signalingDMRS-DownlinkConfig in

TABLE 37

| | |
|---|---|
| DMRS-DownlinkConfig ::= | SEQUENCE { |
| dmrs-Type | ENUMERATED {type2} |
| OPTIONAL, -- Need S | |
| dmrs-AdditionalPosition | ENUMERATED {pos0, pos1, pos3} |
| OPTIONAL, -- Need S | |
| maxLength | ENUMERATED {len2} |
| OPTIONAL, -- Need S | |
| scramblingID0 | INTEGER (0..65535) |
| OPTIONAL, -- Need S | |
| scramblingID1 | INTEGER (0..65535) |
| OPTIONAL, -- Need S | |
| phaseTrackingRS | SetupRelease { PTRS-DownlinkConfig } |
| OPTIONAL, -- Need M | |
| ..., | |
| [[ | |
| dmrs-Downlink-r16 | ENUMERATED {enabled} |
| OPTIONAL -- Need R | |
| ]] | |
| dmrs-Type-r18 | ENUMERATED {type2, etype1, etype2} |
| OPTIONAL, -- Need S | |
| } | | order to support an enhanced DMRS type, and an enhanced DMRS type being supported may be configured for the terminal through a new RRC LE (e.g., enhanced-Dmrs-Type-r18) in PDSCH-Config individually to the higher layer signaling. As shown in Table 39 below, if the higher layer signaling enhanced-Dmrs-Type-r18 is not configured for a terminal by a base station, the terminal may determine a DMRS type an existing DMRS-DownlinkConfig configuration. If the higher layer signaling enhanced-Dmrs-Type-r18 is configured for the terminal by the base station, the terminal may use an enhanced scheme for a DMRS type determined according to an existing DMRS-DownlinkConfig configuration. In this case, in a case where the terminal supports dynamic switching between a conventional type and an enhanced type, if enhanced-Dmrs-Type-r18 is configured for the terminal, the terminal may perform dynamic switching without additional higher layer signaling, or whether to perform dynamic switching may be configured by the base station for the terminal through dynamicSwitchType that is an additional higher layer signaling.

TABLE 39

| PDSCH-Config ::= | SEQUENCE { |
|---|---|
| dataScramblingIdentityPDSCH OPTIONAL, -- Need S | INTEGER (0..1023) |
| dmrs-DownlinkForPDSCH-MappingTypeA DownlinkConfig } OPTIONAL, -- Need M | SetupRelease { DMRS- |
| dmrs-DownlinkForPDSCH-MappingTypeB DownlinkConfig } OPTIONAL, -- Need M | SetupRelease { DMRS- |
| . . . | |
| enhanced-Dmrs-Type-r18 OPTIONAL, -- Need S | ENUMERATED {enabled} |

Hereinafter, various supporting methods of determining specific RE mapping and an OCC for enhanced DMRS types 1 and 2 will be described.

[Enhanced DMRS Type 1 Supporting Method 1]

As an embodiment of a method of supporting enhanced DMRS type 1 described above, time and frequency resource mapping of a DMRS RE and a frequency domain orthogonal cover code (FD-OCC) coefficient and a time domain orthogonal cover code (TD-OCC) coefficient for the mapping in a case of using enhanced DMRS type 1 may be determined based on [Equation 4] and Table 40 below.

$$a_{k,l}^{(p,\mu)} = \beta_{PDSCH}^{DMRS} w_f(k') w_t(l') r(2n+k')$$

$k = 8n + 4k' + \Delta \text{(for new DMRS type 1)}$ $k' = 0, 1$ $l = \bar{l} + l'$ $n = 0, 1, \ldots$ $\Delta = 0, 1, 2, 3$ [Equation 4]

Table 40 shows parameters for [enhanced DMRS type 1 supporting method 1] according to an embodiment of the disclosure.

TABLE 40

| p | CDM group $\lambda$ | $\Delta$ | $w_f(k')$ k' = 0 | $w_f(k')$ k' = 1 | $w_t(l')$ l' = 0 | $w_t(l')$ l' = 1 |
|---|---|---|---|---|---|---|
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 2 | 2 | +1 | +1 | +1 | +1 |
| 1005 | 2 | 2 | +1 | −1 | +1 | +1 |
| 1006 | 3 | 3 | +1 | +1 | +1 | +1 |
| 1007 | 3 | 3 | +1 | −1 | +1 | +1 |
| 1008 | 0 | 0 | +1 | +1 | +1 | −1 |
| 1009 | 0 | 0 | +1 | −1 | +1 | −1 |
| 1010 | 1 | 1 | +1 | +1 | +1 | −1 |
| 1011 | 1 | 1 | +1 | −1 | +1 | −1 |
| 1012 | 2 | 2 | +1 | +1 | +1 | −1 |
| 1013 | 2 | 2 | +1 | −1 | +1 | −1 |
| 1014 | 3 | 3 | +1 | +1 | +1 | −1 |
| 1015 | 3 | 3 | +1 | −1 | +1 | −1 |

In [Enhanced DMRS type 1 supporting method 1] based on [Equation 4] and Table 40 above, a total of four CDM groups are used. Ina case of one front loaded DMRS symbol, two DMRS ports may be included in each CDM group and thus a total of eight orthogonal DMRS ports may be supported, and in a case of two front loaded DMRS symbols, four DMRS ports may be included in each CDM group and thus a total of sixteen orthogonal DMRS ports may be supported. Compared to the interval between REs allocated to a particular DMRS port in the same CDM group being two REs in conventional DMRS type 1, four CDM groups are supported, and thus the interval may increase to four REs. The number of CDM groups is increased while the number of DMRS ports in each CDM group is maintained, and thus scheduling of a PDSCH transmitted together with a DMRS may be limited to the unit of two RBs. In [Equation 4], $\beta_{PDSCH}^{DMRS}$ is a scaling factor indicating the ratio between the energy-per-RE (EPRE) of a PDSCH and the EPRE of a DMRS, and may be calculated by $\beta_{PDSCH}^{DMRS} = 10\beta_{DMRS}/20$, and the value of $\beta_{DMRS}$ may be 0 dB, −3 dB, −4.77 dB, and −6 dB according to 1, 2, 3, and 4 of the number of CDM groups.

[Enhanced DMRS Type 1 Supporting Method 2]

As another embodiment of a method of supporting enhanced DMRS type 1 described above, time and frequency resource mapping of a DMRS RE and an FD-OCC coefficient and a TD-OCC coefficient for the mapping in a case of using enhanced DMRS type 1 may be determined based on [Equation 5] and Table 41 below.

$$a_{k,l}^{(p,\mu)} = \beta_{PDSCH}^{DMRS} w_f(k') w_t(l') r(2n+k')$$

$k = 8n + 2k' + \Delta \text{(for new DMRS type 1)}$ $k' = 0, 1$ $l=\bar{l}+l'$ $n=0,1,\ldots$ [Equation 5]

Table 41 shows parameters for [enhanced DMRS type 1 supporting method 2] according to an embodiment of the disclosure.

TABLE 41

| p | CDM group $\lambda$ | $\Delta$ | $w_f(k')$ | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 2 | 4 | +1 | +1 | +1 | +1 |
| 1005 | 2 | 4 | +1 | −1 | +1 | +1 |
| 1006 | 3 | 5 | +1 | +1 | +1 | +1 |
| 1007 | 3 | 5 | +1 | −1 | +1 | +1 |
| 1008 | 0 | 0 | +1 | +1 | +1 | −1 |
| 1009 | 0 | 0 | +1 | −1 | +1 | −1 |
| 1010 | 1 | 1 | +1 | +1 | +1 | −1 |
| 1011 | 1 | 1 | +1 | −1 | +1 | −1 |
| 1012 | 2 | 4 | +1 | +1 | +1 | −1 |
| 1013 | 2 | 4 | +1 | −1 | +1 | −1 |
| 1014 | 3 | 5 | +1 | +1 | +1 | −1 |
| 1015 | 3 | 5 | +1 | −1 | +1 | −1 |

In [Enhanced DMRS type 1 supporting method 2] based on [Equation 5] and Table 41 above, a total of four CDM groups are used. In a case of one front loaded DMRS symbol, two DMRS ports may be included in each CDM group and thus a total of eight orthogonal DMRS ports may be supported, and in a case of two front loaded DMRS symbols, four DMRS ports may be included in each CDM group and thus a total of sixteen orthogonal DMRS ports may be supported. The number of CDM groups is increased while the number of DMRS ports in each CDM group is maintained, and thus scheduling of a PDSCH transmitted together with a DMRS may be limited to the unit of two RBs. As in conventional DMRS type 1, the interval between REs allocated to a particular DMRS port in the same CDM group is maintained to be two REs. However, for each DMRS port, the DMRS density of a particular RB among two RBs may be high and the DMRS density of the other RB may be low. For example, in a case of DMRS port 1000 to 1003, the DMRS density of the even-numbered RBs among allocated RBs is twice the DMRS density of the odd-numbered RBs, but in a case of DMRS port 1004 to 1008, the opposite situation may occur. In [Equation 5], $\beta_{PDSCH}^{DMRS}$ is a scaling factor indicating the ratio between the energy-per-RE (EPRE) of a PDSCH and the EPRE of a DMRS, and may be calculated by $\beta_{PDSCH}^{DMRS}=10^{\beta_{DMRS}/20}$, and the value of $\beta_{DMRS}$ may be 0 dB, −3 dB, −4.77 dB, and −6 dB according to 1, 2, 3, and 4 of the number of CDM groups.

[Enhanced DMRS Type 1 Supporting Method 3]

As another embodiment of a method of supporting enhanced DMRS type 1 described above, time and frequency resource mapping of a DMRS RE and an FD-OCC coefficient and a TD-OCC coefficient for the mapping in a case of using enhanced DMRS type 1 may be determined based on [Equation 3] above and Table 42 below. What is different from conventional DMRS type 1 is that indication for DMRS ports 1000 to 1007 is possible for even-numbered RBs to which a PDSCH is scheduled, and indication for DMRS ports 1008 to 1015 is possible for odd-numbered RBs. Therefore, as shown in Table 42 below, when the indexes of DMRS ports are different from each other by eight indexes, the FD-OCC coefficients and the TD-OCC coefficients are the same. Alternatively, while only indication for DMRS ports 1000 to 1007 is supported using Table 35 described above, which RB among an even-numbered RB and an odd-numbered RB in which a DMRS RE is disposed in frequency resources to which a PDSCH is scheduled is additionally indicated. Therefore, a method of distinguishing the same DMRS ports 1000 according to an RB in which a DMRS RE is disposed may also be used. A specific DMRS port indication and RB position indication method will be described later.

Table 42 shows parameters for [enhanced DMRS type 1 supporting method 3] according to an embodiment of the disclosure.

TABLE 42

| p | CDM group $\lambda$ | $\Delta$ | $w_f(k')$ | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 1 | +1 | +1 | +1 | +1 |
| 1003 | 1 | 1 | +1 | −1 | +1 | +1 |
| 1004 | 0 | 0 | +1 | +1 | +1 | −1 |
| 1005 | 0 | 0 | +1 | −1 | +1 | −1 |
| 1006 | 1 | 1 | +1 | +1 | +1 | −1 |
| 1007 | 1 | 1 | +1 | −1 | +1 | −1 |
| 1008 | 0 | 0 | +1 | +1 | +1 | +1 |
| 1009 | 0 | 0 | +1 | −1 | +1 | +1 |
| 1010 | 1 | 1 | +1 | +1 | +1 | +1 |
| 1011 | 1 | 1 | +1 | −1 | +1 | +1 |
| 1012 | 0 | 0 | +1 | +1 | +1 | −1 |
| 1013 | 0 | 0 | +1 | −1 | +1 | −1 |
| 1014 | 1 | 1 | +1 | +1 | +1 | −1 |
| 1015 | 1 | 1 | +1 | −1 | +1 | −1 |

In [Enhanced DMRS type 1 supporting method 3] based on [Equation 3] and Table 42 above, a total of two CDM groups are used. In a case of one front loaded DMRS symbol, two DMRS ports may be included in each CDM group and DMRS ports are divided to be allocated to even-numbered RBs and odd-numbered RBs, and thus a total of eight orthogonal DMRS ports may be supported, and in a case of two front loaded DMRS symbols, four DMRS ports may be included in each CDM group and thus a total of sixteen orthogonal DMRS ports may be supported. While a DMRS is divided to be allocated to even-numbered RBs and odd-numbered RBs while the number of DMRS ports in each CDM group and the number of CDM groups are maintained, and thus scheduling of a PDSCH transmitted together with the DMRS may be limited to the unit of three or more RBs.

[Enhanced DMRS Type 1 Supporting Method 4]

As another embodiment of a method of supporting enhanced DMRS type 1 described above, time and frequency resource mapping of a DMRS RE and an FD-OCC coefficient and a TD-OCC coefficient for the mapping in a case of using enhanced DMRS type 1 may be determined based on [Equation 5-1] and Table 43 below.

$a_{k,l}^{(p,u)}=\beta_{PDSCH}^{DMRS}w_f(k')w_t(l')r(2n+k')$ $k=12n+2k'+\Delta$ (for new,DMRS type 1)

$k'=0,1,2,3,4,5$ $l=\bar{l}+l'$ $n=0,1,+1\ldots$ [Equation 5-1]

Table 43 shows parameters for [enhanced DMRS type 1 supporting method 4] according to an embodiment of the disclosure.

TABLE 43

| p | CDM group λ | Δ | $w_f(k')$ k'=0 | k'=1 | k'=2 | k'=3 | k'=4 | k'=5 | $w_t(l')$ l'=0 | l'=1 |
|---|---|---|---|---|---|---|---|---|---|---|
| 1000 | 0 | 0 | +1 | +1 | +1 | +1 | +1 | +1 | +1 | +1 |
| 1001 | 0 | 0 | +1 | −1 | +1 | −1 | +1 | −1 | +1 | +1 |
| 1002 | 1 | 1 | +1 | +1 | +1 | +1 | +1 | +1 | +1 | +1 |
| 1003 | 1 | 1 | +1 | −1 | +1 | −1 | +1 | −1 | +1 | +1 |
| 1004 | 0 | 0 | +1 | +1 | +1 | +1 | +1 | +1 | +1 | −1 |
| 1005 | 0 | 0 | +1 | −1 | +1 | −1 | +1 | −1 | +1 | −1 |
| 1006 | 1 | 1 | +1 | +1 | +1 | +1 | +1 | +1 | +1 | −1 |
| 1007 | 1 | 1 | +1 | −1 | +1 | −1 | +1 | −1 | +1 | −1 |
| 1008 | 0 | 0 | +A | +A | +B | +B | +C | +C | +1 | +1 |
| 1009 | 0 | 0 | +A | −A | +B | −B | +C | −C | +1 | +1 |
| 1010 | 1 | 1 | +A | +A | +B | +B | +C | +C | +1 | +1 |
| 1011 | 1 | 1 | +A | −A | +B | −B | +C | −C | +1 | +1 |
| 1012 | 0 | 0 | +A | +A | +B | +B | +C | +C | +1 | −1 |
| 1013 | 0 | 0 | +A | −A | +B | −B | +C | −C | +1 | −1 |
| 1014 | 1 | 1 | +A | +A | +B | +B | +C | +C | +1 | −1 |
| 1015 | 1 | 1 | +A | −A | +B | −B | +C | −C | +1 | −1 |

In [Enhanced DMRS type 1 supporting method 4] based on [Equation 5-1] and Table 43 above, a total of two CDM groups are used. In a case of one front loaded DMRS symbol, four DMRS ports may be included in each CDM group, and in a case of two front loaded DMRS symbols, eight DMRS ports may be included in each CDM group and thus a total of sixteen orthogonal DMRS ports may be supported. The number of DMRS ports in each CDM groups is increased while 2 of the number of CDM groups of conventional DMRS type 1 is maintained. Therefore, scheduling of a PDSCH to be transmitted together with a DMRS may be maintained at a unit of one RB identically to the conventional unit, and a DMRS may be mapped to the same RE position as that of conventional DMRS type 1. However, in conventional DMRS type 1, under the assumption that channels of two REs (e.g., RE #0 and RE #2) positioned to be spaced two REs apart from each other are the same, an OCC is applied to the two REs to distinguish between orthogonal ports, and in a case of one front loaded DMRS symbol, a total of six REs in one RB are used per port, and three OCCs having a length of 2 are used. If [Enhanced DMRS type 1 supporting method 4] is used, in a case of one front loaded DMRS symbol, a total of six REs in one RB are used per port, and one OCC having a length of 6 is used to distinguish between a total of four orthogonal ports. An OCC having a length of 6 is applied to six REs, and adjacent REs may be spaced two REs apart from each other. That is, an OCC is required to be applied six REs under the assumption that the six REs, the relative RE positions thereof are 0, 2, 4, 6, 8, and 10, belong to the same channel, and thus channel estimation performance may be degraded compared to conventional DMRS type 1. Therefore, this enhanced DMRS type 1 may be used for multi-user MIMO in a channel with small frequency-selective characteristic. In Table 43 above, the values of A, B, and C in an OCC having a length of 6 may be determined so that all ports are orthogonal. For example, A=1, B=$e^{j2\pi/3}$, and C=$e^{j4\pi/3}$ may be possible, and other values are not excluded. The values of A, B, and C may be previously defined in a standard and promised between a base station and a terminal, may be configured for the terminal through higher layer signaling, may be activated to the terminal through a MAC-CE, may be dynamically indicated to the terminal through DCI, and may be notified of to the terminal through a combination of these signalings. In [Equation 5-1], $\beta_{PDSCH}^{DMRS}$ is a scaling factor indicating the ratio between the energy-per-RE (EPRE) of a PDSCH and the EPRE of a DMRS, and may be calculated by $\#_D SC=10\beta_{DMRS}/20$, and the value of $f_{DMRS}$ may be 0 dB and −3 dB according to 1 and 2 of the number of CDM groups.

[Enhanced DMRS Type 1 Supporting Method 5]

As another embodiment of a method of supporting enhanced DMRS type 1 described above, time and frequency resource mapping of a DMRS RE and an FD-OCC coefficient and a TD-OCC coefficient for the mapping in a case of using enhanced DMRS type 1 may be determined based on [Equation 5-2] and Table 44 below.

$$a_{k,l}^{(p,\mu)}=\beta_{PDSCH}^{DMRS}w_o(m)w_f(k')w_t(l')r(2n+k')$$

$k=4n+2k'+\Delta$ (for new DMRS type 1)

$k'=0,1$ $l=\bar{l}+l'$ $n=0,1,\ldots$ $m=\mathrm{mod}(n,3)$  [Equation 5-2]

Table 44 shows parameters for [enhanced DMRS type 1 supporting method 5] according to an embodiment of the disclosure.

TABLE 44

| p | CDM group λ | Δ | $w_f(k')$ k'=0 | k'=1 | $w_t(l')$ l'=0 | l'=1 | $w_o(m)$ m=0 | m=1 | m=2 |
|---|---|---|---|---|---|---|---|---|---|
| 1000 | 0 | 0 | +1 | +1 | +1 | +1 | +1 | +1 | +1 |
| 1001 | 0 | 0 | +1 | −1 | +1 | +1 | +1 | +1 | +1 |
| 1002 | 1 | 1 | +1 | +1 | +1 | +1 | +1 | +1 | +1 |
| 1003 | 1 | 1 | +1 | −1 | +1 | +1 | +1 | +1 | +1 |
| 1004 | 0 | 0 | +1 | +1 | +1 | −1 | +1 | +1 | +1 |
| 1005 | 0 | 0 | +1 | −1 | +1 | −1 | +1 | +1 | +1 |
| 1006 | 1 | 1 | +1 | +1 | +1 | −1 | +1 | +1 | +1 |
| 1007 | 1 | 1 | +1 | −1 | +1 | −1 | +1 | +1 | +1 |
| 1008 | 0 | 0 | +1 | +1 | +1 | +1 | +A | +B | +C |
| 1009 | 0 | 0 | +1 | −1 | +1 | +1 | +A | +B | +C |
| 1010 | 1 | 1 | +1 | +1 | +1 | +1 | +A | +B | +C |
| 1011 | 1 | 1 | +1 | −1 | +1 | +1 | +A | +B | +C |
| 1012 | 0 | 0 | +1 | +1 | +1 | −1 | +A | +B | +C |
| 1013 | 0 | 0 | +1 | −1 | +1 | −1 | +A | +B | +C |
| 1014 | 1 | 1 | +1 | +1 | +1 | −1 | +A | +B | +C |
| 1015 | 1 | 1 | +1 | −1 | +1 | −1 | +A | +B | +C |

In [Enhanced DMRS type 1 supporting method 5] based on [Equation 5-2] and Table 44 above, a total of two CDM groups are used. In a case of one front loaded DMRS symbol, four DMRS ports may be included in each CDM group, and in a case of two front loaded DMRS symbols, eight DMRS ports may be included in each CDM group and thus a total of sixteen orthogonal DMRS ports may be supported. The number of DMRS ports in each CDM groups is increased while 2 of the number of CDM groups of conventional DMRS type 1 is maintained. Therefore, scheduling of a PDSCH to be transmitted together with a DMRS may be maintained at a unit of one RB identically to the conventional unit, and a DMRS may be mapped to the same RE position as that of conventional DMRS type 1. However, in conventional DMRS type 1, under the assumption that channels of two REs (e.g., RE #0 and RE #2) positioned to be spaced two REs apart from each other are the same, an OCC is applied to the two REs to distinguish between orthogonal ports, and in a case of one front loaded DMRS symbol, a total of six REs in one RB are used per port, and three OCCs having a length of 2 are used. If [Enhanced DMRS type 1 supporting method 5] is used, in a case of one front loaded DMRS symbol, a total of six REs in one RB are used per port, and one OCC having a length of 6 is used to distinguish between a total of four orthogonal ports. An OCC having a length of 6 is applied to six REs, and adjacent REs may be spaced two REs apart from each other. That is, an OCC is required to be applied six REs under the assumption that the six REs, the relative RE positions thereof are 0, 2, 4, 6, 8, and 10, belong to the same channel, and thus channel estimation performance may be degraded compared to conventional DMRS type 1. Therefore, this enhanced DMRS type 1 may be used for multi-user MIMO in a channel with small frequency-selective characteristic. In Table 44 above, the values of A, B, and C in an OCC having a length of 6 may be determined so that all ports are orthogonal. For example, A=1, B=$e^{j2\pi/3}$, and C=$e^{j4\pi/3}$ may be possible, and other values are not excluded. The values of A, B, and C may be previously defined in a standard and promised between a base station and a terminal, may be configured for the terminal through higher layer signaling, may be activated to the terminal through a MAC-CE, may be dynamically indicated to the terminal through DCI, and may be notified of to the terminal through a combination of these signalings. In [Equation 5-2], $\beta_{PDSCH}^{DMRS}$ is a scaling factor indicating the ratio between the energy-per-RE (EPRE) of a PDSCH and the EPRE of a DMRS, and may be calculated by $$\beta_{PDSCH}^{DMRS} = 10^{-\frac{\beta_{DRMS}}{20}},$$

and the value of $\beta_{DMRS}$ may be 0 dB and −3 dB according to 1 and 2 of the number of CDM groups.

[Enhanced DMRS Type 2 Supporting Method 1]

As an embodiment of a method of supporting enhanced DMRS type 2 described above, time and frequency resource mapping of a DMRS RE and an FD-OCC coefficient and a TD-OCC coefficient for the mapping in a case of using enhanced DMRS type 2 may be determined based on [Equation 6] and Table 45 below.

k=12n+k'+Δ(for new IMRS type 2)

k'=0,1,2,3 l=$\bar{l}$+l' n=0,1, . . .                                                                                                     [Equation 6]

Table 45 shows parameters for [enhanced DMRS type 2 supporting method 1] according to an embodiment of the disclosure.

TABLE 45

| p | CDM group λ | Δ | $w_f(k')$ | | | | $w_t(l')$ | |
|---|---|---|---|---|---|---|---|---|
| | | | k'=0 | k'=1 | k'=2 | k'=3 | l'=0 | l'=1 |
| 1000 | 0 | 0 | +1 | +1 | +1 | +1 | +1 | +1 |
| 1001 | 0 | 0 | −1 | −1 | +1 | +1 | +1 | +1 |
| 1002 | 0 | 0 | −1 | +1 | −1 | +1 | +1 | +1 |
| 1003 | 0 | 0 | +1 | −1 | −1 | +1 | +1 | +1 |
| 1004 | 1 | 4 | +1 | +1 | +1 | +1 | +1 | +1 |
| 1005 | 1 | 4 | −1 | −1 | +1 | +1 | +1 | +1 |

TABLE 45-continued

| p | CDM group λ | Δ | $w_f(k')$ | | | | $w_t(l')$ | |
|---|---|---|---|---|---|---|---|---|
| | | | k'=0 | k'=1 | k'=2 | k'=3 | l'=0 | l'=1 |
| 1006 | 1 | 4 | −1 | +1 | −1 | +1 | +1 | +1 |
| 1007 | 1 | 4 | +1 | −1 | −1 | +1 | +1 | +1 |
| 1008 | 2 | 8 | +1 | +1 | +1 | +1 | +1 | +1 |
| 1009 | 2 | 8 | −1 | −1 | +1 | +1 | +1 | +1 |
| 1010 | 2 | 8 | −1 | +1 | −1 | +1 | +1 | +1 |
| 1011 | 2 | 8 | +1 | −1 | −1 | +1 | +1 | +1 |
| 1012 | 0 | 0 | +1 | +1 | +1 | +1 | +1 | −1 |
| 1013 | 0 | 0 | −1 | −1 | +1 | +1 | +1 | −1 |
| 1014 | 0 | 0 | −1 | +1 | −1 | +1 | +1 | −1 |
| 1015 | 0 | 0 | +1 | −1 | −1 | +1 | +1 | −1 |
| 1016 | 1 | 4 | +1 | +1 | +1 | +1 | +1 | −1 |
| 1017 | 1 | 4 | −1 | −1 | +1 | +1 | +1 | −1 |
| 1018 | 1 | 4 | −1 | +1 | −1 | +1 | +1 | −1 |
| 1019 | 1 | 4 | +1 | −1 | −1 | +1 | +1 | −1 |
| 1020 | 2 | 8 | +1 | +1 | +1 | +1 | +1 | −1 |
| 1021 | 2 | 8 | −1 | −1 | +1 | +1 | +1 | −1 |
| 1022 | 2 | 8 | −1 | +1 | −1 | +1 | +1 | −1 |
| 1023 | 2 | 8 | +1 | −1 | −1 | +1 | +1 | −1 |

In [Enhanced DMRS type 2 supporting method 1] based on [Equation 6] and Table 45 above, a total of three CDM groups are used. In a case of one front loaded DMRS symbol, four DMRS ports may be included in each CDM group and thus a total of twelve orthogonal DMRS ports may be supported, and in a case of two front loaded DMRS symbols, eight DMRS ports may be included in each CDM group and thus a total of twenty four orthogonal DMRS ports may be supported. The number of DMRS ports in each CDM group is increased while the number of CDM groups is maintained, and thus scheduling of a PDSCH to be transmitted together with a DMRS may be maintained at the unit of one RB identically to the conventional unit. However, the position of a DMRS RE is concentrated on a particular position in an RB, and thus DMRS channel estimation performance may be ensured at the time of PDSCH scheduling for two or more RBs. For example, the RE position in each RB for DMRS ports 1000 to 1003 in CDM group 0 corresponds to the 0-th to 4-th subcarriers, and thus a DMRS is concentrated on only subcarriers having low indexes in an RB. Therefore, DMRS channel estimation performance for a subcarrier with a high index may be degraded. In [Equation 6], $\beta_{PDSCH}^{DMRS}$ is a scaling factor indicating the ratio between the energy-per-RE (EPRE) of a PDSCH and the EPRE of a DMRS, and may be calculated by $$\beta_{PDSCH}^{DMRS} = 10^{-\frac{\beta_{DRMS}}{20}},$$

and the value of $\beta_{DMRS}$ may be 0 dB, −3 dB, and −4.77 dB according to 1, 2, and 3 of the number of CDM groups.

[Enhanced DMRS Type 2 Supporting Method 2]

As another embodiment of a method of supporting enhanced DMRS type 2 described above, time and frequency resource mapping of a DMRS RE and an FD-OCC coefficient and a TD-OCC coefficient for the mapping in a case of using enhanced DMRS type 2 may be determined based on [Equation 3] above and Table 46 below. Similarly to [Enhanced DMRS type 1 supporting method 3] described above, what is different from conventional DMRS type 2 is that indication for DMRS ports 1000 to 1011 is possible for even-numbered RBs to which a PDSCH is scheduled, and indication for DMRS ports 1012 to 1023 is possible for odd-numbered RBs. Therefore, as shown in Table 46 below, when the indexes of DMRS ports are different from each other by twelve indexes, the FD-OCC coefficients and the TD-OCC coefficients are the same. Alternatively, while only indication for DMRS ports 1000 to 1011 is supported using Table 36 described above, which RB among an even-numbered RB and an odd-numbered RB in which a DMRS RE is disposed in frequency resources to which a PDSCH is scheduled is additionally indicated. Therefore, a method of distinguishing the same DMRS ports 1000 according to an RB in which a DMRS RE is disposed may also be used. A specific DMRS port indication and RB position indication method will be described later.

Table 46 shows parameters for [enhanced DMRS type 2 supporting method 2] according to an embodiment of the disclosure.

TABLE 46

| p | CDM group $\lambda$ | $\Delta$ | $w_f(k')$ | | $w_t(l')$ | |
|---|---|---|---|---|---|---|
| | | | k' = 0 | k' = 1 | l' = 0 | l' = 1 |
| 1000 | 0 | 0 | +1 | +1 | +1 | +1 |
| 1001 | 0 | 0 | +1 | −1 | +1 | +1 |
| 1002 | 1 | 2 | +1 | +1 | +1 | +1 |
| 1003 | 1 | 2 | +1 | −1 | +1 | +1 |
| 1004 | 2 | 4 | +1 | +1 | +1 | +1 |
| 1005 | 2 | 4 | +1 | −1 | +1 | +1 |
| 1006 | 0 | 0 | +1 | +1 | +1 | −1 |
| 1007 | 0 | 0 | +1 | −1 | +1 | −1 |
| 1008 | 1 | 2 | +1 | +1 | +1 | −1 |
| 1009 | 1 | 2 | +1 | −1 | +1 | −1 |
| 1010 | 2 | 4 | +1 | +1 | +1 | −1 |
| 1011 | 2 | 4 | +1 | −1 | +1 | −1 |
| 1012 | 0 | 0 | +1 | +1 | +1 | +1 |
| 1013 | 0 | 0 | +1 | −1 | +1 | +1 |
| 1014 | 1 | 2 | +1 | +1 | +1 | +1 |
| 1015 | 1 | 2 | +1 | −1 | +1 | +1 |
| 1016 | 2 | 4 | +1 | +1 | +1 | +1 |
| 1017 | 2 | 4 | +1 | −1 | +1 | +1 |
| 1018 | 0 | 0 | +1 | +1 | +1 | −1 |
| 1019 | 0 | 0 | +1 | −1 | +1 | −1 |
| 1020 | 1 | 2 | +1 | +1 | +1 | −1 |
| 1021 | 1 | 2 | +1 | −1 | +1 | −1 |
| 1022 | 2 | 4 | +1 | +1 | +1 | −1 |
| 1023 | 2 | 4 | +1 | −1 | +1 | −1 |

In [Enhanced DMRS type 2 supporting method 2] based on [Equation 3] and Table 46 above, a total of three CDM groups are used. In a case of one front loaded DMRS symbol, two DMRS ports may be included in each CDM group and DMRS ports are divided to be allocated to even-numbered RBs and odd-numbered RBs, and thus a total of twelve orthogonal DMRS ports may be supported, and in a case of two front loaded DMRS symbols, four DMRS ports may be included in each CDM group and thus a total of twenty four orthogonal DMRS ports may be supported. While a DMRS is divided to be allocated to even-numbered RBs and odd-numbered RBs while the number of DMRS ports in each CDM group and the number of CDM groups are maintained, and thus scheduling of a PDSCH transmitted together with the DMRS may be limited to the unit of three or more RBs.

[Enhanced DMRS Type 2 Supporting Method 3]

Time and frequency resource mapping of a DMRS RE and an FD-OCC coefficient and a TD-OCC coefficient for the mapping in a case of using enhanced DMRS type 2 may be determined based on [Equation 7] and Table 47 below.

$$a_{k,l}^{(p,\mu)} = \beta_{PDSCH}^{DMRS} w_f(k') w_t(l') r(2n+k')$$

$$k = 12n + 6\lfloor k'/2 \rfloor + \text{mod}(k',2) + \Delta \text{ (for new DMRS type 2)}$$

$$k' = 0,1,2,3$$

$$l = \bar{l} + l'$$

$$n = 0,1,\ldots \quad \text{[Equation 7]}$$

Table 47 shows parameters for [enhanced DMRS type 2 supporting method 3] according to an embodiment of the disclosure.

TABLE 47

| p | CDM group $\lambda$ | $\Delta$ | $w_f(k')$ | | | | $w_t(l')$ | |
|---|---|---|---|---|---|---|---|---|
| | | | k' = 0 | k' = 1 | k' = 2 | k' = 3 | l' = 0 | l' = 1 |
| 1000 | 0 | 0 | +1 | +1 | +1 | +1 | +1 | +1 |
| 1001 | 0 | 0 | +1 | −1 | +1 | −1 | +1 | +1 |
| 1002 | 1 | 2 | +1 | +1 | +1 | +1 | +1 | +1 |
| 1003 | 1 | 2 | +1 | −1 | +1 | −1 | +1 | +1 |
| 1004 | 2 | 4 | +1 | +1 | +1 | +1 | +1 | +1 |
| 1005 | 2 | 4 | +1 | −1 | +1 | −1 | +1 | +1 |
| 1006 | 0 | 0 | +1 | +1 | +1 | +1 | +1 | −1 |
| 1007 | 0 | 0 | +1 | −1 | +1 | −1 | +1 | −1 |
| 1008 | 1 | 2 | +1 | +1 | +1 | +1 | +1 | −1 |
| 1009 | 1 | 2 | +1 | −1 | +1 | −1 | +1 | −1 |
| 1010 | 2 | 4 | +1 | +1 | +1 | +1 | +1 | −1 |
| 1011 | 2 | 4 | +1 | −1 | +1 | −1 | +1 | −1 |
| 1012 | 0 | 0 | +1 | +1 | −1 | +1 | +1 | +1 |
| 1013 | 0 | 0 | +1 | −1 | −1 | −1 | +1 | +1 |
| 1014 | 1 | 2 | +1 | +1 | −1 | +1 | +1 | +1 |
| 1015 | 1 | 2 | +1 | −1 | −1 | −1 | +1 | +1 |
| 1016 | 2 | 4 | +1 | +1 | −1 | +1 | +1 | +1 |
| 1017 | 2 | 4 | +1 | −1 | −1 | −1 | +1 | +1 |
| 1018 | 0 | 0 | +1 | +1 | −1 | +1 | +1 | −1 |
| 1019 | 0 | 0 | +1 | −1 | −1 | −1 | +1 | −1 |
| 1020 | 1 | 2 | +1 | +1 | −1 | +1 | +1 | −1 |
| 1021 | 1 | 2 | +1 | −1 | −1 | −1 | +1 | −1 |
| 1022 | 2 | 4 | +1 | +1 | −1 | +1 | +1 | −1 |
| 1023 | 2 | 4 | +1 | −1 | −1 | −1 | +1 | −1 |

In [Enhanced DMRS type 2 supporting method 3] based on [Equation 7] and Table 47 above, a total of three CDM groups are used. In a case of one front loaded DMRS symbol, four DMRS ports may be included in each CDM group and thus a total of twelve orthogonal DMRS ports may be supported, and in a case of two front loaded DMRS symbols, eight DMRS ports may be included in each CDM group and thus a total of twenty four orthogonal DMRS ports may be supported. The number of DMRS ports in each CDM groups is increased while the number of CDM groups is maintained. Therefore, scheduling of a PDSCH to be transmitted together with a DMRS may be maintained at a unit of one RB identically to the conventional unit, and a DMRS may be mapped to the same RE position as that of conventional DMRS type 2. However, in conventional DMRS type 2, under the assumption that channels of two consecutive REs are the same, an OCC is applied to the two REs to distinguish between orthogonal ports, and in a case of one front loaded DMRS symbol, a total of four REs in one RB are used per port, and two OCCs having a length of 2 are used. If [Enhanced DMRS type 2 supporting method 3] is used, in a case of one front loaded DMRS symbol, a total of four REs in one RB are used per port, and one OCC having a length of 4 is used to distinguish between a total of four orthogonal ports. That is, an OCC having a length of 4 is applied to consecutive two RE sets spaced apart six REs from each other, that is, an OCC is required to be applied to four REs under the assumption that the four REs, the relative RE positions thereof are 0, 1, 6, and 7, belong to the same channel, and thus channel estimation performance may be degraded compared to conventional DMRS type 2. Therefore, this enhanced DMRS type 2 may be used for multi-user MIMO in a channel with small frequency-selective characteristic. In [Equation 7], $\beta_{PDSCH}^{DMRS}$ is a scaling factor indicating the ratio between the energy-per-RE (EPRE) of a PDSCH and the EPRE of a DMRS, and may be calculated by $\beta_{PDSCH}^{DMRS}=10\beta_{DMRS}/20$, and the value of $\beta_{DMRS}$ may be 0 dB, −3 dB, and −4.77 dB according to 1, 2, and 3 of the number of CDM groups.

With respect to [Enhanced DMRS type 1 supporting method 1] to [Enhanced DMRS type 1 supporting method 5] and [Enhanced DMRS type 2 supporting method 1] to [Enhanced DMRS type 2 supporting method 3] described above, a terminal may report a terminal capability meaning each supporting method being possible to a base station. The terminal capability may be valid only for FR1, or may be valid for both FR1 and FR2. The terminal capability may include the meaning wherein, as a maximum number of supported ports, for enhanced DMRS type 1, eight ports are possible when one front-loaded DMRS symbol is used and sixteen ports are possible when two front-loaded DMRS symbols are used, and for enhanced DMRS type 2, twelve ports are possible when one front-loaded DMRS symbol is used and twenty four ports are possible when two front-loaded DMRS symbols are used. After receiving the terminal capability, the base station may configure a higher layer signaling corresponding thereto, and this may be one of the higher layer signaling configuration methods described above, or may be an independent higher layer signaling.

In one embodiment, a method of determining, by a base station and a terminal, multiple DMRS types for which dynamic switching indication is possible, based on terminal capability reporting and higher layer signaling is disclosed. As described herein, a 5G NR terminal may support DMRS types 1 and 2, and terminals supporting Release 18 including a more evolved function or functions beyond Release 18 may support enhanced DMRS types 1 and 2 capable of supporting additional orthogonal ports to DMRS types 1 and 2, respectively. A base station and a terminal may determine multiple DMRS types for which dynamic switching indication is possible, among some or all of DMRS type 1, DMRS type 2, enhanced DMRS type 1, and enhanced DMRS type 2 through the following various methods.

[Method 2-1]

One of a total of four DMRS types including DMRS type 1, DMRS type 2, enhanced DMRS type 1, and enhanced DMRS type 2 may be dynamically indicated to a terminal by a base station. In this case, one of the four DMRS types may be dynamically indicated to the terminal by the base station, and thus the base station may have the highest scheduling flexibility for the terminal. On the other hand, the terminal does not know which of the four DMRS types is to be dynamically indicated by the base station, and thus may be required to prepare an independent channel estimation scheme for each of the four DMRS types at the time of PDSCH and PUSCH scheduling of the base station. Therefore, in view of system, it is advantageous in that the highest scheduling flexibility is ensured for scheduling of a particular terminal in a single user MIMO scheme and scheduling of multiple terminals in a multi-user MIMO scheme, which reflect the situations and scenarios of terminals served by a base station. However, the number of the channel estimation schemes of different DMRS types, which the terminal is required to prepare, is increased from 2 to a maximum of 4, and thus the burden on the terminal may be increased.

[Method 2-2]

One of a total of two DMRS types including DMRS type 1 and enhanced DMRS type 1 may be dynamically indicated to a terminal by a base station. Alternatively, similarly, one of a total of two DMRS types including DMRS type 2 and enhanced DMRS type 2 may be dynamically indicated thereto by the base station. After one of DMRS type 1 and DMRS type 2 is configured for the terminal and enhanced DMRS type 1 or enhanced DMRS type 2 that is a method enhanced therefrom is configured for the terminal, one of two methods including a conventional scheme and an enhanced scheme of type 1 may be indicated to the terminal or one of two methods including a conventional scheme and an enhanced scheme of type 2 may be indicated thereto. In a conventional standard, dynamic switching indication for DMRS type 1 and DMRS type 2 is possible through a time domain resource allocation in the DCI. However, if an enhanced DMRS type is configured for the terminal and the terminal uses [Method 2-2], the terminal may be able to perform dynamic switching only between two methods including a conventional scheme and an enhanced scheme of a particular type as described above, and may not expect dynamic switching between type 1 and type 2 which are different from each other.

[Method 2-3]

A terminal always supports DMRS type 1 and may support additional X different DMRS types, and accordingly, a base station may be able to perform dynamic switching indication for a total of (X+1) DMRS types. A PDSCH scheduled by the base station with DCI format 1_0 is DMRS type 1, and thus the terminal may be required to necessarily prepare supporting DMRS type 1. Additionally, the terminal may further support X (e.g., X∈{1, 2, 3})) types among DMRS type 2, enhanced DMRS type 1, and enhanced DMRS type 2, and the X types may be reported through a terminal capability. According to the X types reported by the terminal, the base station may configure additional DMRSs type for the terminal, and the terminal may receive a dynamic switching indication for (X+1) DMRS types configured through higher layer signaling.

In one embodiment, a method of dynamic switching among multiple DMRS types configured by a base station through higher layer signaling, based on terminal capability reporting of a terminal is disclosed. If the base station is able to schedule only enhanced DMRS type 1 or enhanced DMRS type 2 to the terminal and does not support dynamic switching to conventional DMRS type 1 or DMRS type 2, channel estimation performance may degrade due to the characteristic of an RE mapping and OCC application scheme of enhanced DMRS type 1 or enhanced DMRS type 2 when the terminal undergoes a frequency-selective channel. A main support scenario of enhanced DMRS type 1 or enhanced DMRS type 2 is multi-user MIMO scheduling with other terminals. Therefore, a terminal in a channel environment suitable for single-user MIMO scheduling with a large number of layers may require conversion to a conventional DMRS type. However, if this conversion is supported in a semi-static configuration scheme based on higher layer signaling, inevitable latency occurs and thus the possibility of performance decreasing in view of a particular terminal and a system may be generated. For this reason, a scheme of dynamic switching among multiple DMRS types may be required.

The following methods may be applied to at least one of [Method 2-1] to [Method 2-3] described above, and there may be no restriction that the methods have to be applied to only a particular method or are unable to be applied to a particular method.

[Method 3-1] Scheme Based on Time Domain Resource Allocation (TDRA) Field in DCI A terminal may support dynamic switching between a conventional DMRS type and an enhanced DMRS type, based on a time domain resource allocation field in the DCI scheduling a PDSCH or a PUSCH. A DMRS type may be indicated through a PDSCH mapping type or a PUSCH mapping type among values which are indicable by entries in the time domain resource allocation field. More specifically, a PDSCH mapping type (e.g., type A or type B) or a PUSCH mapping type (e.g., type A or type B) may be indicated to the terminal through a time domain resource allocation field in the DCI, and there may be DMRS types configured to correspond to PDSCH mapping type A or PDSCH mapping type B, or PUSCH mapping type A or PUSCH mapping type B. Conventionally, it is possible to configure one of DMRS type 1 and DMRS type 2 to correspond to PDSCH mapping type A or B, or PUSCH mapping type A or B. For example, DMRS type 1 is configured for PDSCH mapping type A or PUSCH mapping type A, and DMRS type 2 is configured for PDSCH mapping type B or PUSCH mapping type B, and if a base station indicates PDSCH or PUSCH mapping type A through a time domain resource allocation field in the DCI, the terminal may assume that DMRS type 1 has been applied to a scheduled PDSCH or PUSCH.

Similarly, one of a total of four types including DMRS type 1, DMRS type 2, enhanced DMRS type 1, and enhanced DMRS type 2 may be configured for PDSCH mapping type A or PUSCH mapping type A in consideration of two additional DMRS types including enhanced DMRS type 1 and enhanced DMRS type 2. Similarly, one of the four types may also be configured for PDSCH mapping type B or PUSCH mapping type B. Dynamic switching indication for a total of two of the four types may be possible according to whether each entry in the time domain resource allocation field in the DCI indicates mapping type A or B.

As another method, each entry in the time domain resource allocation field in the DCI may indicate PDSCH or PUSCH mapping type A or B, and additionally indicate a DMRS type connected thereto together. If four different DMRS types including DMRS type 1, DMRS type 2, enhanced DMRS type 1, and enhanced DMRS type 2 are configured for the terminal through higher layer signaling, PDSCH or PUSCH mapping type A or B may have a maximum of four connected DMRS types. For example, entries 1 to 4 of the time domain resource allocation field in the DCI may indicate PDSCH or PUSCH mapping type A and DMRS type 1, DMRS type 2, enhanced DMRS type 1, and enhanced DMRS type 2 may be connected thereto, respectively, and entries 5 to 8 may indicate PDSCH or PUSCH mapping type B and DMRS type 1, DMRS type 2, enhanced DMRS type 1, and enhanced DMRS type 2 may be connected thereto, respectively.

As another method, each entry in the time domain resource allocation field in the DCI may indicate PDSCH or PUSCH mapping type A or B, and there may be a DMRS type connected to PDSCH or PUSCH mapping type A or B through conventional higher layer signaling. One of type A and type B may be configured for each entry of the time domain resource allocation field in the DCI through mappingType in the higher layer signaling PDSCH-TimeDomainResourceAllocation or PUSCH-TimeDomainResourceAllocation, the configured one type among type A and type B may be applied through this entry indication, and a DMRS type connected thereto may be applied. The base station may additionally configure, for the terminal, whether an enhanced DMRS type is applied, in higher layer signaling for each entry described above. In a case where type A is configured through mappingType in the higher layer signaling PDSCH-TimeDomainResourceAllocation or PUSCH-TimeDomainResourceAllocation for configuration for a particular entry in the time domain resource allocation field, DMRS type 1 is connected to type A, and a higher layer signaling meaning whether an enhanced DMRS type is applied is configured, if the entry is indicated to the terminal through the time domain resource allocation field in the DCI, the terminal may interpret scheduling information by assuming PDSCH or PUSCH mapping type A and enhanced DMRS type 1, and receive a PDSCH or transmit a PUSCH according to the interpretation.

[Method 3-2] Scheme Based on Particular Entry of Table Used in Antenna Port Field in the DCI A terminal may support dynamic switching between a conventional DMRS type and an enhanced DMRS type according to a value indicated by an antenna port field in the DCI scheduling a PDSCH or a PUSCH.

For example, the terminal may select one of a conventional DMRS type and an enhanced DMRS type according to a port number in each entry of a table indicated by an antenna port field. In a case of type 1, if 0 to 7, which are port numbers indicated by a conventional DMRS type, are indicated in the antenna port field, the DMRS type may be considered to be conventional DMRS type 1, and if port numbers 8 to 15 are indicated, the DMRS type may be considered to be enhanced DMRS type 1. In a case of type 2, if 0 to 11, which are port numbers indicated by a conventional DMRS type, are indicated in the antenna port field, the DMRS type may be considered to be conventional DMRS type 2, and if port numbers 12 to 23 are indicated, the DMRS type may be considered to be enhanced DMRS type 2.

As another example, the terminal may expect that an indication for a conventional DMRS type or an enhanced DMRS type is added in each entry of a table indicated by an antenna port field. That is, a new column is added to a table used in antenna port field indication, so that a particular entry may be indicated to be distinguished between a conventional DMRS type and an enhanced DMRS type.

As another example, if a method of using the same RE position by a conventional DMRS type and an enhanced DMRS type is considered (e.g., enhanced DMRS type 1 based on [Enhanced DMRS type 1 supporting method 4] or [Enhanced DMRS type 1 supporting method 5], or enhanced DMRS type 2 based on [Enhanced DMRS type 2 supporting method 3 described above], the terminal may additionally indicate information on an OCC length to be applied by the terminal, through each entry of a table indicated by an antenna port field. For example, one of OCC lengths of 2, 3, and 6 may be indicated to distinguish between conventional DMRS type 1 and enhanced DMRS type 1, and one of OCC lengths of 2 and 4 may be indicated to distinguish between conventional DMRS type 2 and enhanced DMRS type 2. That is, a new column is added to a table used in antenna port field indication, and an OCC length value may be indicated through information of the column.

[Method 3-3] Scheme Based on MSB or LSB of Antenna Port Field in DCI

A terminal may support dynamic switching between a conventional DMRS type and an enhanced DMRS type according to an additional MSB or LSB value of an antenna port field in DCI scheduling a PDSCH or a PUSCH. For example, if the additional MSB or LSB value of the antenna port field in the DCI is 0, the terminal may consider PUSCH or PDSCH scheduling to which a conventional DMRS type has been applied, and if the value is 1, the terminal may consider PUSCH or PDSCH scheduling to which an enhanced DMRS type is applied (alternatively, the opposite example is possible). Distinguishment between DMRS type 1 and DMRS type 2 may be possible through a PDSCH or PUSCH mapping type which is indicable through a time domain resource allocation field in the DCI. An additional MSB or LSB value of an antenna port field indicating one of conventional and enhanced DMRS types may be determined according to whether a particular higher layer signaling is configured, and may be configured in PUSCH scheduling DCI format 0_1 or 0_2 or PDSCH scheduling DCI format 1_1 or 1_2. A particular higher layer signaling enabling determination of whether there is an additional MSB or LSB of an antenna port field may be individually defined for each DCI format or may be commonly defined in a bandwidth part or a cell.

[Method 3-4] Scheme Based on New Field in DCI

A terminal may support dynamic switching between a conventional DMRS type and an enhanced DMRS type according to a value of a new field in DCI scheduling a PDSCH or a PUSCH. For example, the new field in the DCI may be one bit, and may means whether an enhanced DMRS type is applied. For example, if the value of the new field in the DCI is 0, the terminal may consider PUSCH or PDSCH scheduling to which a conventional DMRS type has been applied, and if the value is 1, the terminal may consider PUSCH or PDSCH scheduling to which an enhanced DMRS type has been applied (alternatively, the opposite example is possible). Distinguishment between DMRS type 1 and DMRS type 2 may be possible through a PDSCH or PUSCH mapping type which is indicable through a time domain resource allocation field in the DCI. Existence or absence of the new field in the DCI may be determined according to whether a particular higher layer signaling is configured, and may be configured in PUSCH scheduling DCI format 0_1 or 0_2 or PDSCH scheduling DCI format 1_1 or 1_2. A particular higher layer signaling enabling determination of existence or absence of the new field may be individually defined for each DCI format or may be commonly defined in a bandwidth part or a cell.

[Method 3-5] Scheme Based on DCI Format

A terminal may support dynamic switching between a conventional DMRS type and an enhanced DMRS type according to a DCI format scheduling a PDSCH or a PUSCH. For example, if a PUSCH is scheduled to the terminal through DCI format 0_0 or 0_1, or a PDSCH is scheduled through DCI format 1_0 or 1_1, the terminal may consider conventional DMRS type 1 or 2 to transmit or receive PUSCH or PDSCH scheduling. For example, if a PUSCH is scheduled to the terminal through DCI format 0_2 or a new PUSCH scheduling DCI format (e.g., 0_3), or a PDSCH is scheduled through DCI format 1_2 or a new PDSCH scheduling DCI format (e.g., 1_3), the terminal may consider enhanced DMRS type 1 or 2 to transmit or receive PUSCH or PDSCH scheduling. Distinguishment between DMRS type 1 and DMRS type 2 may be possible through a PDSCH or PUSCH mapping type which is indicable through a time domain resource allocation field in the DCI.

[Method 3-6] Scheme Based on MAC-CE

A higher layer signaling for conventional DMRS type 1 and DMRS type 2 may be configured for a terminal by a base station, the terminal may perform dynamic switching between the two DMRS types through a TDRA field in the DCI, and dynamic switching between a conventional DMRS type and an enhanced DMRS type may be indicated to the terminal through a MAC-CE receivable from the base station. That is, activation and deactivation of an enhanced DMRS type may be indicated to the terminal through a MAC-CE receivable from the base station. If only DMRS type 1 is configured for the terminal through higher layer signaling and the terminal has received a MAC-CE indicating activation of an enhanced DMRS type, the terminal may consider that enhanced DMRA type 1 is applied to PDSCH and PUSCH scheduling after passage of a particular time (e.g., three slots) from transmission of a PUCCH including HARQ-ACK information for a PDSCH including the MAC-CE. If only DMRS type 2 is configured for the terminal through higher layer signaling and the terminal has received a MAC-CE indicating activation of an enhanced DMRS type, the terminal may consider that enhanced DMRA type 2 is applied to PDSCH and PUSCH scheduling after passage of a particular time (e.g., three slots) from transmission of a PUCCH including HARQ-ACK information for a PDSCH including the MAC-CE. If DMRS types 1 and 2 are configured for the terminal through higher layer signaling and the terminal has received a MAC-CE indicating activation of an enhanced DMRS type, the terminal may consider that enhanced DMRA type 1 or enhanced DMRA type 2 is applied to PDSCH and PUSCH scheduling after passage of a particular time (e.g., three slots) from transmission of a PUCCH including HARQ-ACK information for a PDSCH including the MAC-CE. Distinguishment between DMRS type 1 and DMRS type 2 may be possible through a PDSCH or PUSCH mapping type which is indicable through a time domain resource allocation field in the DCI.

[Method 3-7] Scheme Based on New RNTI

A terminal may consider whether PDSCH or PUSCH scheduling is PDSCH or PUSCH scheduling to which a conventional DMRS type or an enhanced DMRS type has been applied, according to which RNTI with which a CRC of a PDCCH transmitted from a base station is scrambled. For example, if the terminal has succeeded in decoding a PDCCH having a CRC scrambled with the same RNTI as a newly defined DMRS-RNTI, the terminal may consider that an enhanced DMRS type has been applied to a PDSCH or PUSCH scheduled through the PDCCH. On the contrary, if the terminal has succeeded in decoding DCI having a CRC scrambled with a conventional RNTI (e.g., C-RNTI or MCS-C-RNTI) rather than a newly defined DMRS-RNTI, the terminal may consider that the scheduling is PDSCH or PUSCH scheduling to which a conventional DMRS type has been applied. If a new RNTI is defined, the number of RNTIs the terminal has to consider when decoding a DCI format in a specific search space is increased, and thus PDCCH decoding performance may be affected. Distinguishment between DMRS type 1 and DMRS type 2 may be possible through a PDSCH or PUSCH mapping type which is indicable through a time domain resource allocation field in the DCI.

[Method 3-8] Scheme Based on PDCCH-Related Information

A terminal may assume, based on information related to a PDCCH transmitted from a base station, which DMRS type, based on which PDSCH or PUSCH transmission scheduled by the PDCCH is performed. The PDCCH-related information which may be considered by the base station and the terminal may be at least one of the following various items:

Control resource set index,
Lowest RB index in control resource set,
Search space index, PDCCH monitoring occasion in particular slot of search space, PDCCH aggregation level and candidate index, or Whether PDCCH transmission is repeated.

For example, if PDSCH or PUSCH transmission is scheduled to the terminal by the base station by using control resource set #0, the terminal may consider that the scheduling is PDSCH or PUSCH scheduling to which a conventional DMRS type has been applied. On the contrary, if PDSCH or PUSCH transmission is scheduled to the terminal by the base station by using a control resource set (e.g., control resource set #1) rather than control resource set #0, the terminal may consider that the scheduling is PDSCH or PUSCH scheduling to which an enhanced DMRS type has been applied.

As another example, if the lowest RB index of a control resource set including a PDCCH received by the terminal is an even number (or odd number), the terminal may consider that the scheduling is PDSCH or PUSCH scheduling to which a conventional DMRS type has been applied. On the contrary, if the lowest RB index of a control resource set including a PDCCH received by the terminal is an odd number (or even number), the terminal may consider that the scheduling is PDSCH or PUSCH scheduling to which an enhanced DMRS type has been applied. Distinguishment between DMRS type 1 and DMRS type 2 may be possible through a PDSCH or PUSCH mapping type which is indicable through a time domain resource allocation field in the DCI.

[Method 3-9] Scheme Based on Scheduling Information

Dynamic switching between a conventional DMRS type and an enhanced DMRS type may be indicated to a terminal, based on PDSCH or PUSCH scheduling information of a base station. If as PDSCH or PUSCH scheduling information received from the base station, information of a frequency domain resource allocation (FDRA) field scheduling an even number (or odd number) of RBs is indicated, the terminal may consider that the scheduling is PDSCH or PUSCH scheduling to which an enhanced DMRS type has been applied. If as PDSCH or PUSCH scheduling information received from the base station, information of a frequency domain resource allocation (FDRA) field scheduling an odd number (or even number) of RBs is indicated, the terminal may consider that the scheduling is PDSCH or PUSCH scheduling to which a conventional DMRS type has been applied. Distinguishment between DMRS type 1 and DMRS type 2 may be possible through a PDSCH or PUSCH mapping type which is indicable through a time domain resource allocation field in the DCI.

A method obtained by combining [Method 3-1] to [Method 3-9] described above may be possible. In addition, a terminal may report a terminal capability for each of [Method 3-1] to [Method 3-9] described above to a base station, may configure a particular method among [Method 3-1] to [Method 3-9] described above through higher layer signaling and support same, and may previously define same in standard with the base station.

Figure 21:
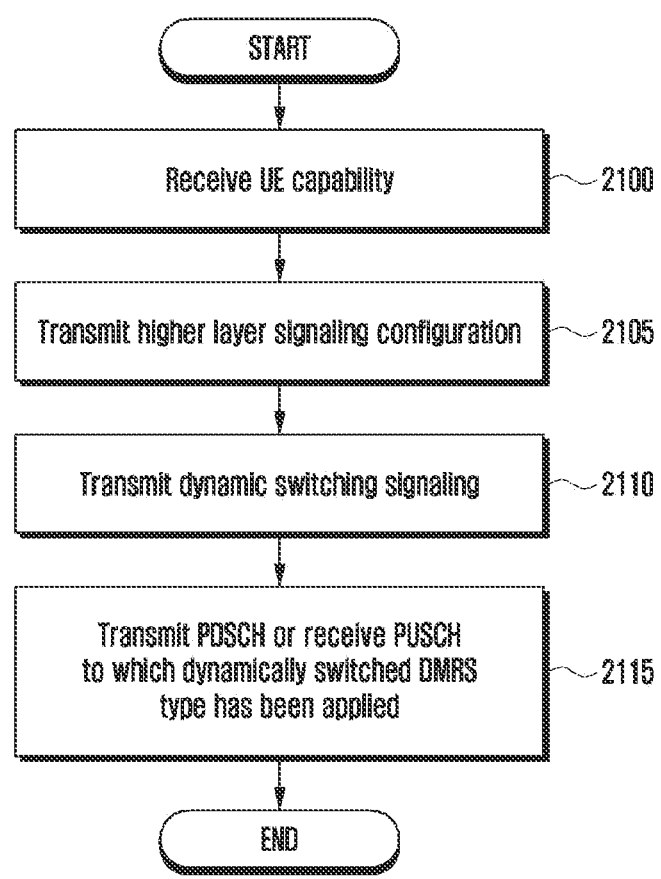
FIG. 21 illustrates a diagram of an operation of a base station according to an embodiment of the disclosure.

FIG. 21 illustrates a diagram of an operation of a base station according to an embodiment of the disclosure.

The operations of the base station of FIG. 21 may be performed based on embodiments of the disclosure described herein. The order of operating steps in FIG. 21 may be changed, some steps may be omitted according to circumstances, or two or more steps may be merged and executed.

A base station may receive terminal capability information from a terminal (operation 2100).

For example, the terminal capability information may include information (e.g., information on an enhanced DMRS type supportable by the terminal/the number of supportable DMRS types) on a terminal capability associated with an enhanced DMRS type. For example, the terminal capability information may include information associated with the number of DMRS types supported by the terminal. The information associated with the number of DMRS types may include a value obtained by subtracting 1 from the number of DMRS types supported by the terminal.

The base station may transmit an available higher layer signaling (e.g., RRC signaling) to the terminal, based on the received terminal capability information (operation 2105). The terminal capability information and the higher layer signaling corresponding thereto may include at least one of [Enhanced DMRS type 1 supporting method 1] to [Enhanced DMRS type 1 supporting method 5] or [Enhanced DMRS type 2 supporting method 1] to [Enhanced DMRS type 2 supporting method 3] mentioned herein, may include at least one of [Method 2-1] to [Method 2-3] mentioned herein, and/or may include at least one of [Method 3-1] to [Method 3-9] mentioned herein or include a method obtained by combining two or more of [Method 3-1] to [Method 3-9].

For example, the base station may transmit information indicating at least one DMRS type to the terminal through higher layer signaling (e.g., RRC signaling).

Based on the terminal capability information and a configuration for the higher layer signaling corresponding thereto, the base station may transmit a dynamic switching signaling to the terminal (operation 2110).

For example, the dynamic switching signaling may include information indicating dynamic switching between different DMRS types. For example, switching between different DMRS types may be performed according to at least one of [Method 3-1] to [Method 3-9] described above.

Thereafter, the base station may transmit, to the terminal, a PDSCH to which a dynamically switched DMRS type has been applied (operation 2115), or receive, from the terminal, a PUSCH to which a dynamically switched DMRS type has been applied (operation 2115).

Figure 22:
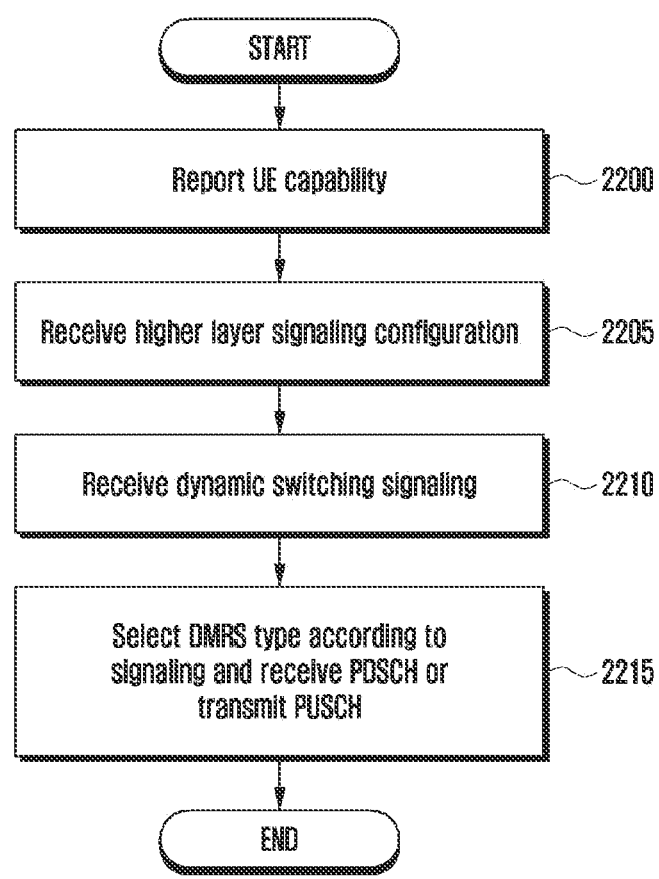
FIG. 22 illustrates a diagram of an operation of a terminal according to an embodiment of the disclosure.

FIG. 22 illustrates a diagram of an operation of a terminal according to an embodiment of the disclosure.

The operations of the terminal of FIG. 22 may be performed based on embodiments of the disclosure described herein. The order of operating steps in FIG. 22 may be changed, some steps may be omitted according to circumstances, or two or more steps may be merged and executed.

A terminal may transmit terminal capability information to a base station (operation 2200).

For example, the terminal capability information may include information (e.g., information on an enhanced DMRS type supportable by the terminal/the number of supportable DMRS types) on a terminal capability associated with an enhanced DMRS type. For example, the terminal capability information may include information associated with the number of DMRS types supported by the terminal. The information associated with the number of DMRS types may include a value obtained by subtracting 1 from the number of DMRS types supported by the terminal.

The terminal may receive an available higher layer signaling (e.g., RRC signaling) from the base station to correspond to the transmitted terminal capability information (operation 2205). The terminal capability information and the higher layer signaling corresponding thereto may include at least one of [Enhanced DMRS type 1 supporting method 1] to [Enhanced DMRS type 1 supporting method 5] or

[Enhanced DMRS type 2 supporting method 1] to [Enhanced DMRS type 2 supporting method 3] mentioned herein, may include at least one of [Method 2-1] to [Method 2-3] mentioned herein, and/or may include at least one of [Method 3-1] to [Method 3-9] mentioned herein or include a method obtained by combining two or more of [Method 3-1] to [Method 3-9].

For example, the terminal may receive information indicating at least one DMRS type to the terminal through higher layer signaling (e.g., RRC signaling).

Based on the terminal capability information and a configuration for the higher layer signaling corresponding thereto, the terminal may receive a dynamic switching signaling from the base station (operation 2210).

For example, the dynamic switching signaling may include information indicating dynamic switching between different DMRS types. For example, switching between different DMRS types may be performed according to at least one of [Method 3-1] to [Method 3-9] described above.

Thereafter, the terminal may receive, from the base station, a PDSCH to which a dynamically switched DMRS type has been applied (operation 2215), or transmit, to the base station, a PUSCH to which a dynamically switched DMRS type has been applied (operation 2215).

In addition, for example, a base station/terminal operation of FIG. 21 and FIG. 22 described above may be performed by a terminal of FIG. 23 and a base station of FIG. 24 described later.

In one embodiment, conditions of a base station and a terminal for DMRS type dynamic switching are disclosed. This embodiment may be operated by being combined with the above embodiments.

A terminal may support rank 1 to a maximum of rank 8 of a PDSCH and PUSCH through a single-user MIMO operation by using enhanced DMRS type 1 and enhanced DMRS type 2 described above.

The terminal may receive a PDSCH configured by rank 1 to a maximum of rank 8, that is, configured by one to eight layers by using enhanced DMRS type 1 and enhanced DMRS type 2 described above. Similarly, the terminal may transmit a PUSCH configured by rank 1 to a maximum of rank 8.

In a case of PDSCH reception, the terminal is able to support up to rank 8 by using conventional DMRS type 1 or DMRS type 2, that is, is able to receive a PDSCH configured by one to eight layers. Therefore, if the terminal supports reception of a PDSCH configured by a maximum of eight layers by using enhanced DMRS type 1 and enhanced DMRS type 2, the terminal may notify the base station of this supporting through separate selective reporting of a terminal capability.

The terminal capability indicating that support of enhanced DMRS type 1 and enhanced DMRS type 2, which may be used at the time of PDSCH reception and PUSCH transmission, is possible may be defined through two methods below.

[Method 4-1-1] Defining One Terminal Capability

In one method, a terminal and a base station may define one terminal capability report for supporting enhanced DMRS type 1 or enhanced DMRS type 2, and may indicate and share different pieces of information through different components in a corresponding signaling. If the terminal reports one terminal capability, one or more particular functions may be basically supported, and these functions may be expressed by random components explicitly included in one terminal capability report, or when the terminal capability report is transmitted from the terminal to the base station, this transmission may implicitly mean supporting of a basic function.

[Method 4-1-2] Defining Multiple Terminal Capabilities

As another method, a terminal and a base station may define multiple different terminal capabilities for supporting enhanced DMRS type 1 or enhanced DMRS type 2, and one terminal capability of them may be defined as a basic terminal capability. The terminal may notify the base station that support of a basic function of enhanced DMRS type 1 or enhanced DMRS type 2 is possible, by reporting the basic terminal capability. Under the precondition that the basic terminal capability is reported, the terminal may indicate and share, to and with the base station, that support of an additional function of enhanced DMRS type 1 or enhanced DMRS type 2 is possible. The basic terminal capability includes one or more particular functions and the functions may be basically supported, and these functions may be expressed by random components explicitly included in the basic terminal capability report, or when the basic terminal capability report is transmitted from the terminal to the base station, this transmission may implicitly mean supporting of a basic function.

With respect to the above two methods, the terminal may distinguishably define a basic function and an additional (optional) function for supporting enhanced DMRS type 1 or enhanced DMRS type 2. A definable function which may be included in a terminal capability report may consider a combination of one or more of the following items.

[Function 1] Supportable enhanced DMRS type
   1-1. Support of enhanced DMRS type 1
   1-2. Support of enhanced DMRS type 2
   1-3. Support of both enhanced DMRS type 1 and enhanced DMRS type 2

[Function 2] Number of supportable layers
   2-1. Support of 1-layer to N-layer (e.g., N is a natural number of 1 to 8)
   2-2. Support of (N+1)-layer to 8-layer (e.g., N is a natural number of 0 to 7)
   2-3. Support of 1-layer to 8-layer

[Function 3] DMRS symbol-related function: The number of front-loaded DMRS symbols, and the number of additional DMRS symbols
   3-1. Reuse of terminal capability report which has been used when DMRS types 1 and 2 are supported
   3-2. Redefining independently to terminal capability report which has been used when DMRS types 1 and 2 are supported Other additional functions may not be excluded.

Some or all of the functions may be defined as the basic functions, and the remaining functions other than the defined basic functions may be defined as additional functions. The functions may be functions commonly applied to PDSCH reception and PUSCH transmission, and may be functions divided and applied to each of PDSCH reception and PUSCH transmission.

For example, function 1-1 of [Function 1] above, function 2-1 (e.g., N=4) of [Function 2] above, and function 3-1 of [Function 3] above may be supported as basic functions commonly for PDSCH reception and PUSCH transmission, and the remaining functions other than the defined basic functions may be defined as additional functions. That is, the meaning of the terminal transmitting a basic terminal capability report to the base station may imply that the terminal supports only enhanced DMRS type 1 among enhanced DMRS types 1 and 2, supports PDSCH reception and PUSCH transmission from rank 1 to rank 4 by using enhanced DMRS type 1, and supports the number of front-loaded DMRS symbols and the number of additional DMRS symbols through a terminal capability report which has been used when conventional DMRS types 1 and 2 are supported.

Particularly, in a case of [Function 2] above, existence or absence of a scheme of dynamic switching between DMRS types mentioned in the above embodiment may be determined according to what maximum rank value supportable through a basic terminal capability is defined. There may be two main reasons why dynamic switching between DMRS types is needed. The first one is because enhanced DMRS types 1 and 2 are functions added to support multi-user MIMO and thus may not be suitable for supporting a single-user MIMO PDSCH and PUSCH having a high rank value, and in this case, dynamic switching between DMRS types may be required. For example, in a case where a base station schedules a particular terminal, when the base station changes to support single-user MIMO having a larger number of layers from multi-user MIMO having a small number of layers, dynamic switching between an enhanced DMRS type and a conventional DMRS type may be used. The other reason is because channel estimation performance in a channel with a large delay spread may be relatively deteriorated due to a longer FD-OCC being used for enhanced DMRS types 1 and 2 compared to conventional DMRS types 1 and 2. Therefore, in order to compensate for this deterioration, the base station may perform scheduling through dynamic switching between DMRS types to improve performance of the terminal in PDSCH reception or PUSCH transmission. [Function 2] above may be associated with the first reason why dynamic switching between DMRS types is needed.

The terminal may define a terminal capability for dynamic switching between DMRS types as mentioned in the above embodiment, and report same to the base station.

If the terminal supports PDSCH reception or PUSCH transmission up to rank 8 related to [Function 2] as a basic terminal capability, that is, if all terminals supporting an enhanced DMRS type have a non-standard implementation method enabling compensation related to a proper channel estimation performance required to support a maximum of 8-layer in a single-user MIMO transmission or reception scheme, the terminal is able to support up to rank 8 for PDSCH reception and PUSCH transmission at a low DMRS overhead by using enhanced DMRS types 1 and 2, that is, two codewords are available. Therefore, dynamic switching between DMRS types as mentioned in the above embodiment may not be needed. In this case, the base station is unable to configure, for the terminal, one scheme among a conventional DMRS type and an enhanced DMRS type for PDSCH reception or PUSCH transmission through higher layer signaling, and the terminal may support any value among ranks 1 to 8 by using a DMRS type configured by the base station through higher layer signaling. That is, the terminal may support a semi-static switching scheme instead of a scheme of dynamic switching between DMRS types described above. In this case, the terminal may not report a terminal capability for the dynamic switching between DMRS types to the base station. On the contrary, even if the terminal is able to support a maximum of rank 8 by using an enhanced DMRS type as a basic terminal capability, the terminal may report a terminal capability for dynamic switching between DMRS types to the base station for the possibility of flexible scheduling by the base station, and when scheduling of a PDSCH or PUSCH configured by two codewords is received from the base station, the terminal may receive a PDSCH, configured by two codewords, having rank 5 or greater or transmit a PUSCH by using a conventional DMRS type or an enhanced DMRS type in the scheme of dynamic switching between DMRS types.

If the terminal supports PDSCH reception or PUSCH transmission up to rank N for N of 4 or smaller in [Function 2] as a basic terminal capability, that is, if a terminal supporting an enhanced DMRS type does not consider implementation for supporting a maximum of 8-layer in a single-user MIMO transmission or reception scheme and some terminals have a non-standard implementation method enabling compensation related to a proper channel estimation performance required therefor, the terminal may be able to only PDSCH reception or PUSCH transmission configured by N-layer by using an enhanced DMRS type. When the terminal is to support a higher rank, the terminal may use a different DMRS type, or report an additional (optional) terminal capability to the base station so as to indicate that support of a rank greater than N is possible even through the enhanced DMRS types. For example, if the terminal has not reported support of rank 5 or higher for an enhanced DMRS type to the base station by using an additional terminal capability, the terminal may report a terminal capability for the dynamic switching between DMRS types to the base station. In this case, if the terminal receives scheduling of a PDSCH or PUSCH configured by two codewords from the base station, the terminal may receive a PDSCH, configured by two codewords, having rank 5 or greater, or transmit a PUSCH by using a conventional DMRS type in the scheme of dynamic switching between DMRS types. As another example, if the terminal has reported support of rank 5 or higher for an enhanced DMRS type to the base station by using an additional terminal capability, the terminal may not report a terminal capability for the dynamic switching between DMRS types to the base station. In this case, if the terminal receives scheduling of a PDSCH or PUSCH configured by two codewords from the base station, the terminal may support a semi-static switching scheme instead of the scheme of dynamic switching between DMRS types described above. Alternatively, even if the terminal has reported support of rank 5 or higher for an enhanced DMRS type to the base station by using an additional terminal capability, the terminal may report a terminal capability for the dynamic switching between DMRS types to the base station. In this case, if the terminal receives scheduling of a PDSCH or PUSCH configured by two codewords from the base station, the terminal may receive a PDSCH, configured by two codewords, having rank 5 or greater or transmit a PUSCH by using a conventional DMRS type in the scheme of dynamic switching between DMRS types.

Figure 23:
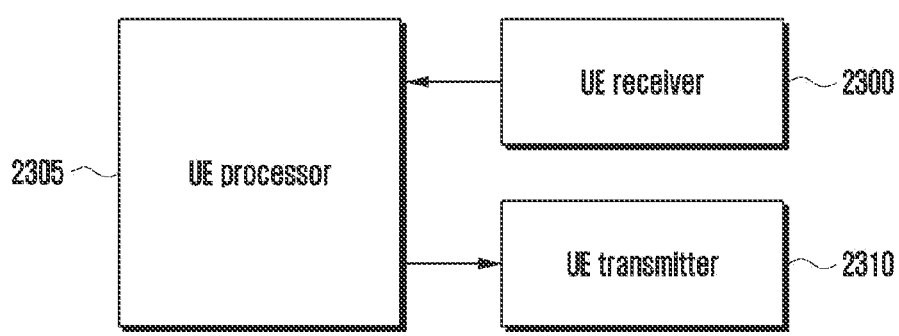
FIG. 23 illustrates a structure of the UE in a wireless communication system, according to an embodiment of the disclosure.

FIG. 23 illustrates a structure of a UE in a wireless communication system, according to an embodiment of the disclosure.

Referring to FIG. 23, the UE may include a transceiver including a UE receiver 2300 and a UE transmitter 2310, a memory, and a UE processor 2305 (or a UE controller or a processor). The transceiver is made up of the receiver 2300 and the UE transmitter 2310. The memory and the UE processor 2305 may operate according to the above-described communication method of the UE. However, the elements of the UE are not limited to the above example. For example, the UE may include more or fewer elements than the above elements. Also, the transmitter 2310, the memory, and the processor 2305 may be implemented in the form of a single chip.

The transceiver may transmit and receive a signal to and from the BS. The signal may include control information and data. To this end, the transceiver may include a radio frequency (RF) transmitter for up-converting and amplifying a frequency of the transmitted signal and an RF receiver for low-noise amplifying the received signal and down-converting the frequency. However, this is only an example of the transceiver, and elements of the transceiver are not limited to the RF transmitter and the RF receiver.

The transceiver may receive a signal through a radio channel, output the signal to the processor, and transmit the signal output from the processor through the radio channel.

The memory may store a program and data required for the operation of the UE. Further, the memory may store control information or data included in the signal transmitted and received by the UE. The memory may be configured by storage media such as a read only memory (ROM), a random access memory (RAM), a hard disc, a compact disc (CD)-ROM, and a digital versatile disc (DVD), or a combination of the storage media. The number of memories may be plural.

The processor 2305 may control a series of processes to allow the UE to operate according to the above embodiments. For example, the processor 2305 may control elements of the UE to receive DCI including two layers and simultaneously receive a plurality of PDSCHs. The number of processors 2305 may be plural, and the processor 2305 may perform an operation of controlling the elements of the UE by executing the program stored in the memory.

Figure 24:
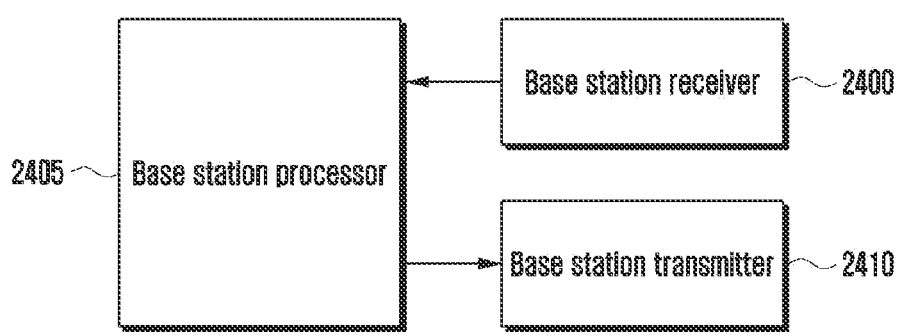
FIG. 24 illustrates a structure of the BS in a wireless communication system, according to an embodiment of the disclosure.

FIG. 24 illustrates a structure of a BS in a wireless communication system, according to an embodiment of the disclosure.

Referring to FIG. 24, the BS may include a transceiver including a BS receiver 2400 and a BS transmitter 2410, a memory, and a BS processor 2405 (or a BS controller or a processor). The transceiver may include the receiver 2400 and the transmitter 2410 of the BS, the memory, and the BS processor 2405 may operate according to the communication method of the BS. However, the elements of the BS are not limited to the above example. For example, the BS may include more or fewer elements than the above-described elements. Also, the transceiver 2410, the memory, and the processor 2405 may be implemented in the form of a single chip.

The transceiver 2410 may transmit and receive a signal to/from the UE. The signal may include control information and data. To this end, the transceiver 2410 may include an RF transmitter for up-converting and amplifying a frequency of the transmitted signal and an RF receiver for low-noise amplifying the received signal and down-converting the frequency. However, this is only an example of the transmitter 2410, and elements of the transceiver are not limited to the RF transmitter and the RF receiver.

The transceiver may receive a signal through a radio channel, output the signal to the processor 2405, and transmit the signal output from the processor through the radio channel.

The memory may store a program and data required for the operation of the BS. The memory may store control information or data included in a signal transmitted and received by the BS. The memory may be configured by storage media such as ROM, RAM, hard disc, CD-ROM, and DVD, or a combination of the storage media. The number of memories may be plural.

The processor 2405 may control a series of processes to allow the BS to operate according to the embodiments of the disclosure. For example, the processor may control each element of the base station to configure and transmit pieces of DCI for two types of layers, which include allocation information on multiple PDSCHs. The number of processors 2405 may be plural, and the processor 2405 may perform an operation of controlling the elements of the BS by executing the program stored in the memory.

According to an embodiment of the disclosure, an apparatus and a method for effectively providing a service in a wireless communication system is provided.

Further, according to an embodiment of the disclosure, data may be transmitted and received by applying the enhanced DMRS type.

Further, according to an embodiment of the disclosure, switching between an existing DMRS type and an enhanced DMRS type may be performed.

Effects that can be obtained in the disclosure are not limited to the above-described effects, and other unmentioned effects will be able to be clearly understood by those of ordinary skill in the art to which the disclosure pertains.

The methods according to various embodiments described in the claims or the specification of the disclosure may be implemented by hardware, software, or a combination of hardware and software.

When the methods are implemented by software, a computer-readable storage medium for storing one or more programs (software modules) may be provided. The one or more programs stored in the computer-readable storage medium may be configured for execution by one or more processors within the electronic device. The at least one program may include instructions that cause the electronic device to perform the methods according to various embodiments of the disclosure as defined by the appended claims and/or disclosed herein.

The programs (software modules or software) may be stored in non-volatile memories including a RAM and a flash memory, a ROM, an electrically erasable programmable read only memory (EEPROM), a magnetic disc storage device, a CD-ROM, DVDs, other type optical storage devices, or a magnetic cassette. Alternatively, any combination of some or all of the memory devices may form a memory in which the program is stored. Further, a plurality of such memories may be included in the electronic device.

In addition, the programs may be stored in an attachable storage device which may access the electronic device through communication networks such as the Internet, Intranet, a local area network (LAN), a wide LAN (WLAN), and a storage area network (SAN) or a combination thereof. Such a storage device may access the electronic device via an external port. Further, a separate storage device on the communication network may access a portable electronic device.

In the above-described detailed embodiments of the disclosure, an element included in the disclosure is expressed in the singular or the plural according to presented detailed embodiments. However, the singular form or plural form is selected appropriately to the presented situation for convenience of description, and the disclosure is not limited by elements expressed in the singular or the plural. Therefore, either an element expressed in the plural may also include a single element or an element expressed in the singular may also include multiple elements.

The embodiments of the disclosure described and shown in the specification and the drawings have been presented to easily explain the technical contents of the disclosure and help understanding of the disclosure, and are not intended to limit the scope of the disclosure. That is, it will be apparent to those skilled in the art that other modifications and changes may be made thereto on the basis of the technical idea of the disclosure. Further, the above respective embodiments may be employed in combination, as necessary. For example, one embodiment of the disclosure may be partially combined with other embodiments to operate a BS and a terminal. As an example, embodiments of the disclosure described herein may be combined with each other to operate a BS and a terminal. Further, although the above embodiments have been described on the basis of the FDD LTE system, other variants based on the technical idea of the embodiments may also be implemented in other communication systems such as TDD LTE, 5G, or NR systems.

In the drawings in which methods of the disclosure are described, the order of the description does not always correspond to the order in which steps of each method are performed, and the order or relationship between the steps may be changed or the steps may be performed in parallel.

Alternatively, in the drawings in which methods of the disclosure are described, some elements may be omitted and only some elements may be included therein without departing from the essential spirit and scope of the disclosure.

Further, in methods of the disclosure, some or all of the contents of each embodiment may be combined without departing from the essential spirit and scope of the disclosure.

Various embodiments of the disclosure have been described. The above description of the disclosure is used for exemplification, and the embodiments of the disclosure are not limited to the disclosed embodiments. Those skilled in the art would understand that the disclosure can be easily modified to other detailed forms without changing the technical idea or an essential feature thereof. The scope of the disclosure is represented by the claims to be described below rather than the detailed description, and it is to be interpreted that the meaning and scope of the claims and all the changes or modified forms derived from the equivalents thereof fall within the scope of the disclosure.

While the present disclosure has been particularly shown and described with reference to certain embodiments thereof, it will be understood by those of ordinary skill in the art that various changes in form and details may be made therein without departing from the spirit and scope of the disclosure as defined by the appended claims and their equivalents.

Although the present disclosure has been described with various embodiments, various changes and modifications may be suggested to one skilled in the art. It is intended that the present disclosure encompass such changes and modifications as fall within the scope of the appended claims.

What is claimed is:

1. A method performed by a terminal in a wireless communication system, the method comprising:
   receiving, from a base station, first information indicating at least one demodulation reference signal (DMRS) type, via a radio resource control (RRC) signaling;
   receiving, from the base station, second information indicating whether to activate an enhanced DMRS type corresponding to the at least one DMRS type, via a medium access control-control element (MAC-CE) signaling; and
   in case that the second information indicates activation of the enhanced DMRS type, receiving, from the base station, a physical downlink shared channel (PDSCH) or transmitting, to the base station, a physical uplink shared channel (PUSCH) based on the enhanced DMRS type.

2. The method of claim 1, wherein:
   the at least one DMRS type includes a DMRS type 1 or a DMRS type 2,
   in case that the first information indicates the DMRS type 1 and the second information indicates the activation of the enhanced DMRS type, a DMRS of the PDSCH or a DMRS of the PUSCH is based on an enhanced DMRS type 1, and
   in case that the first information indicates the DMRS type 2 and the second information indicates the activation of the enhanced DMRS type, the DMRS of the PDSCH or the DMRS of the PUSCH is based on an enhanced DMRS type 2.

3. The method of claim 1, wherein a length of an orthogonal cover code (OCC) associated with the enhanced DMRS type is 4 or 6.

4. The method of claim 1, further comprising:
   in case that the second information does not indicate the activation of the enhanced DMRS type, receiving, from the base station, the PDSCH or transmitting, to the base station, the PUSCH based on the at least one DMRS type.

5. The method of claim 1, further comprising transmitting, to the base station, capability information including information associated with a number of DMRS types supported by the terminal.

6. The method of claim 5, wherein:
   the information associated with the number of DMRS types supported by the terminal incudes a value obtained by subtracting 1 from the number of DMRS types supported by the terminal, and
   DMRS types supported by the terminal include at least a DMRS type 1.

7. A method performed by a base station in a wireless communication system, the method comprising:
   transmitting, to a terminal, first information indicating at least one demodulation reference signal (DMRS) type, via a radio resource control (RRC) signaling;
   transmitting, to the terminal, second information indicating whether to activate an enhanced DMRS type corresponding to the at least one DMRS type, via a medium access control-control element (MAC-CE) signaling; and
   in case that the second information indicates activation of the enhanced DMRS type, transmitting, to the terminal, a physical downlink shared channel (PDSCH) or receiving, from the terminal, a physical uplink shared channel (PUSCH) based on the enhanced DMRS type.

8. The method of claim 7, wherein:
   a length of an orthogonal cover code (OCC) associated with the enhanced DMRS type is 4 or 6,
   the at least one DMRS type includes a DMRS type 1 or a DMRS type 2,
   in case that the first information indicates the DMRS type 1 and the second information indicates the activation of the enhanced DMRS type, a DMRS of the PDSCH or a DMRS of the PUSCH is based on an enhanced DMRS type 1, and
   in case that the first information indicates the DMRS type 2 and the second information indicates the activation of the enhanced DMRS type, the DMRS of the PDSCH or the DMRS of the PUSCH is based on an enhanced DMRS type 2.

9. The method of claim 7, further comprising:
   in case that the second information does not indicate the activation of the enhanced DMRS type, transmitting, to the terminal, the PDSCH or receiving, from the terminal, the PUSCH based on the at least one DMRS type.

10. The method of claim 7, further comprising receiving, from the terminal, capability information including information associated with a number of DMRS types supported by the terminal, wherein:

the information associated with the number of DMRS types supported by the terminal incudes a value obtained by subtracting 1 from the number of DMRS types supported by the terminal, and DMRS types supported by the terminal include at least a DMRS type 1.

11. A terminal in a wireless communication system, the terminal comprising:

a transceiver; and a processor coupled with the transceiver and configured to:

receive, from a base station, first information indicating at least one demodulation reference signal (DMRS) type, via a radio resource control (RRC) signaling, receive, from the base station, second information indicating whether to activate an enhanced DMRS type corresponding to the at least one DMRS type, via a medium access control-control element (MAC-CE) signaling, and in case that the second information indicates activation of the enhanced DMRS type, receive, from the base station, a physical downlink shared channel (PDSCH) or transmit, to the base station, a physical uplink shared channel (PUSCH) based on the enhanced DMRS type.

12. The terminal of claim 11, wherein:

the at least one DMRS type includes a DMRS type 1 or a DMRS type 2, in case that the first information indicates the DMRS type 1 and the second information indicates the activation of the enhanced DMRS type, a DMRS of the PDSCH or a DMRS of the PUSCH is based on an enhanced DMRS type 1, and in case that the first information indicates the DMRS type 2 and the second information indicates the activation of the enhanced DMRS type, the DMRS of the PDSCH or the DMRS of the PUSCH is based on an enhanced DMRS type 2.

13. The terminal of claim 11, wherein the processor is further configured to transmit, to the base station, capability information including information associated with a number of DMRS types supported by the terminal.

14. The terminal of claim 11, wherein:

information associated with a number of DMRS types supported the terminal incudes a value obtained by subtracting 1 from the number of DMRS types supported by the terminal, and DMRS types supported by the terminal include at least a DMRS type 1.

15. The terminal of claim 11, wherein a length of an orthogonal cover code (OCC) associated with the enhanced DMRS type is 4 or 6.

16. The terminal of claim 11, wherein the processor is further configured to:

in case that the second information does not indicate the activation of the enhanced DMRS type, receive, from the base station, the PDSCH or transmit, to the base station, the PUSCH based on the at least one DMRS type.

17. A base station in a wireless communication system, the base station comprising:

a transceiver; and a processor coupled with the transceiver and configured to:

transmit, to a terminal, first information indicating at least one demodulation reference signal (DMRS) type, via a radio resource control (RRC) signaling, transmit, to the terminal, second information indicating whether to activate an enhanced DMRS type corresponding to the at least one DMRS type, via a medium access control-control element (MAC-CE) signaling, and in case that the second information indicates activation of the enhanced DMRS type, transmit, to the terminal, a physical downlink shared channel (PDSCH) or receive, from the terminal, a physical uplink shared channel (PUSCH) based on the enhanced DMRS type.

18. The base station of claim 17, wherein the processor is further configured to receive, from the terminal, capability information including information associated with a number of DMRS types supported by the terminal, wherein:

the information associated with the number of DMRS types supported by the terminal incudes a value obtained by subtracting 1 from the number of DMRS types supported by the terminal, and DMRS types supported by the terminal include at least a DMRS type 1.

19. The base station of claim 17, wherein:

a length of an orthogonal cover code (OCC) associated with the enhanced DMRS type is 4 or 6, the at least one DMRS type includes a DMRS type 1 or a DMRS type 2, in case that the first information indicates the DMRS type 1 and the second information indicates the activation of the enhanced DMRS type, a DMRS of the PDSCH or a DMRS of the PUSCH is based on an enhanced DMRS type 1, and in case that the first information indicates the DMRS type 2 and the second information indicates the activation of the enhanced DMRS type, the DMRS of the PDSCH or the DMRS of the PUSCH is based on an enhanced DMRS type 2.

20. The base station of claim 17, wherein the processor is further configured to:

in case that the second information does not indicate the activation of the enhanced DMRS type, transmit, to the terminal, the PDSCH or receive, from the terminal, the PUSCH based on the at least one DMRS type.

* * * * *